United States Patent
Tokita et al.

(10) Patent No.: US 7,920,124 B2
(45) Date of Patent: Apr. 5, 2011

(54) FORCE SENSE PRESENTATION DEVICE, MIXED REALITY SYSTEM, INFORMATION PROCESSING METHOD, AND INFORMATION PROCESSING APPARATUS

(75) Inventors: Toshinobu Tokita, Yokohama (JP); Atsushi Nogami, Tokyo (JP); Naoki Nishimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 11/846,133

(22) Filed: Aug. 28, 2007

(65) Prior Publication Data
US 2008/0059131 A1 Mar. 6, 2008

(30) Foreign Application Priority Data

Aug. 29, 2006 (JP) ................................. 2006-232813
Nov. 8, 2006 (JP) ................................. 2006-303379

(51) Int. Cl.
*G09G 5/00* (2006.01)
(52) U.S. Cl. ............ 345/156; 345/173; 700/245; 901/31
(58) Field of Classification Search .................. 345/156, 345/173; 600/387, 595; 703/5; 700/90, 700/245, 260, 264; 901/30–34
See application file for complete search history.

(56) References Cited

U.S. PATENT DOCUMENTS

| | | | | |
|---|---|---|---|---|
| 5,184,319 | A | 2/1993 | Kramer | 364/806 |
| 5,319,387 | A * | 6/1994 | Yoshikawa | 345/179 |
| 5,754,023 | A * | 5/1998 | Roston et al. | 318/561 |
| 6,225,987 | B1 * | 5/2001 | Matsuda | 345/179 |
| 2004/0174337 | A1 * | 9/2004 | Kubota et al. | 345/156 |
| 2004/0267406 | A1 * | 12/2004 | Jinno | 700/245 |
| 2005/0228540 | A1 * | 10/2005 | Moridaira | 700/245 |
| 2006/0132433 | A1 * | 6/2006 | Kramer et al. | 345/156 |
| 2006/0167589 | A1 * | 7/2006 | Jinno | 700/245 |
| 2006/0176272 | A1 * | 8/2006 | Rosenberg | 345/156 |

(Continued)

FOREIGN PATENT DOCUMENTS

JP 2002-304246 10/2002

(Continued)

OTHER PUBLICATIONS

T.M. Massie et al. "The Phantom Haptic Interface: A Device for Probing Virtual Objects", ASME Haptic Interface for Virutal Environment and Teleoperator Systems 1994, in Dynamic Systems and Control, vol. 1 , pp. 295-301.

(Continued)

*Primary Examiner* — Kimnhung Nguyen
(74) *Attorney, Agent, or Firm* — Fitzpatrick, Cella, Harper & Scinto

(57) ABSTRACT

A force sense presentation device for presenting a sense of force in virtual space to a user, comprises: a fixed unit which is gripped by the user; a force sense presentation unit which presents a sense of force; an actuator which supplies a driving force and operates the force sense presentation unit relative to the fixed unit; a joint unit which is provided between the fixed unit and the force sense presentation unit, and guides the relative operation of the force sense presentation unit; and a force sense rendering unit which controls the relative operation of the force sense presentation unit by the actuator, wherein the force sense presentation device simulates a device which is gripped and used by the user, and the force sense rendering unit controls the relative operation of the force sense presentation unit based on a position and orientation of the device in the virtual space.

16 Claims, 53 Drawing Sheets

U.S. PATENT DOCUMENTS

2007/0010913 A1* 1/2007 Miyamoto et al. ............ 700/264
2007/0013655 A1* 1/2007 Rosenberg et al. ........... 345/156
2007/0085820 A1* 4/2007 Suzuki et al. ................. 345/156

FOREIGN PATENT DOCUMENTS

JP            2005-190465           7/2005

OTHER PUBLICATIONS

Makoto Satoh et al., "Proposals of Space Interface Device SPIDAR", IEICE Transactions D-11 vol. J74-D-11, No. 7, pp. 887-894, Jul. 1997 (English abstract only).

P. J. Berkelman et al., "Design of Hemispherical Magnetic Levitation Haptic Interface Device", 1996 ASME International Mechanical Engineering Congress and Exposition, Atlanta, Nov. 1996, DSC-vol. 58, pp. 483-488.

Y. Yokokohji et al., "What You Can See Is What You Can Feel—Development of a Visual/Haptic Interface to Virtual Environment", in Proceedings of 1996 IEEE Virtual Reality Annual International Symposium (VRAIS'96), pp. 46-53 (1996).

N. Nakamura et al., "Development of a Force and Torque Hybrid Display GyroCubeStick", World Haptics 2005, Pisa, Italy, Mar. 18-20, 2005, pp. 633-634.

Kenneth Salisbury et al., "Haptic Rendering: Introductory Concepts", IEEE Computer Graphics and Applications, Jan./Feb. 2004, pp. 24-32.

* cited by examiner

TORQUE GENERATED BY INTERFERENCE WITH REAL OBJECT

TORQUE PRESENTED BY INTERFERENCE WITH VIRTUAL OBJECT

REACTION FORCE GENERATED BY INTERFERENCE WITH REAL OBJECT

REACTION FORCE PRESENTED
BY INTERFERENCE WITH VIRTUAL OBJECT

METHOD OF PROVIDING RING SERVING AS REFERENCE ON FIXED UNIT

METHOD OF CAUSING USER TO GRIP DEVICE ON
THE BASIS OF INITIAL DRIVING POSITION

GRIP BY ENTIRE PALM

PENCIL HOLDING STYLE

REAL MACHINE TOOL
(SCREWDRIVER) GRIP STATE

FORCE SENSE PRESENTATION
DEVICE GRIP STATE

ABOUT LONGITUDINAL AXIS (θ)

LONGITUDINAL DIRECTION

OSCILLATION DIRECTION WITH RESPECT TO LONGITUDINAL AXIS

PERPENDICULAR TO LONGITUDINAL AXIS

FIG. 17A
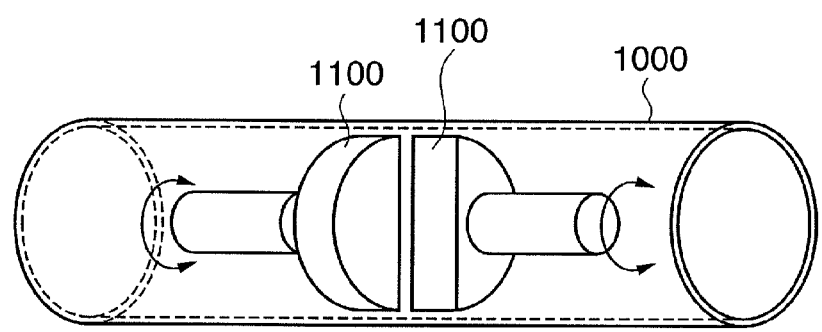
FIG. 17B
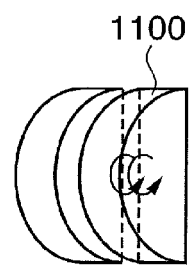
FOR VIBRATION PRESENTATION
FIG. 17C
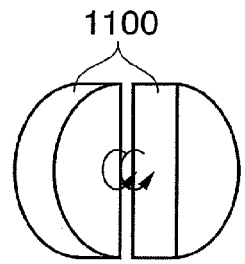
FOR TORQUE PRESENTATION
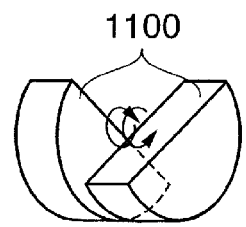
FOR FORCE SENSE PRESENTATION
FIG. 17D

GRIP BY ENTIRE PALM

GRIP BY ENTIRE PALM (WITH THUMB UP)

GRIP BY ENTIRE PALM (WITH END OF MACHINE TOOL PLACED AT PALM CENTER)

GRIP BY ENTIRE PALM

GRIP BY ENTIRE PALM (WITH THUMB UP)

GRIP BY ENTIRE PALM
(WITH END OF MACHINE TOOL PLACED AT PALM CENTER)

F I G. 22
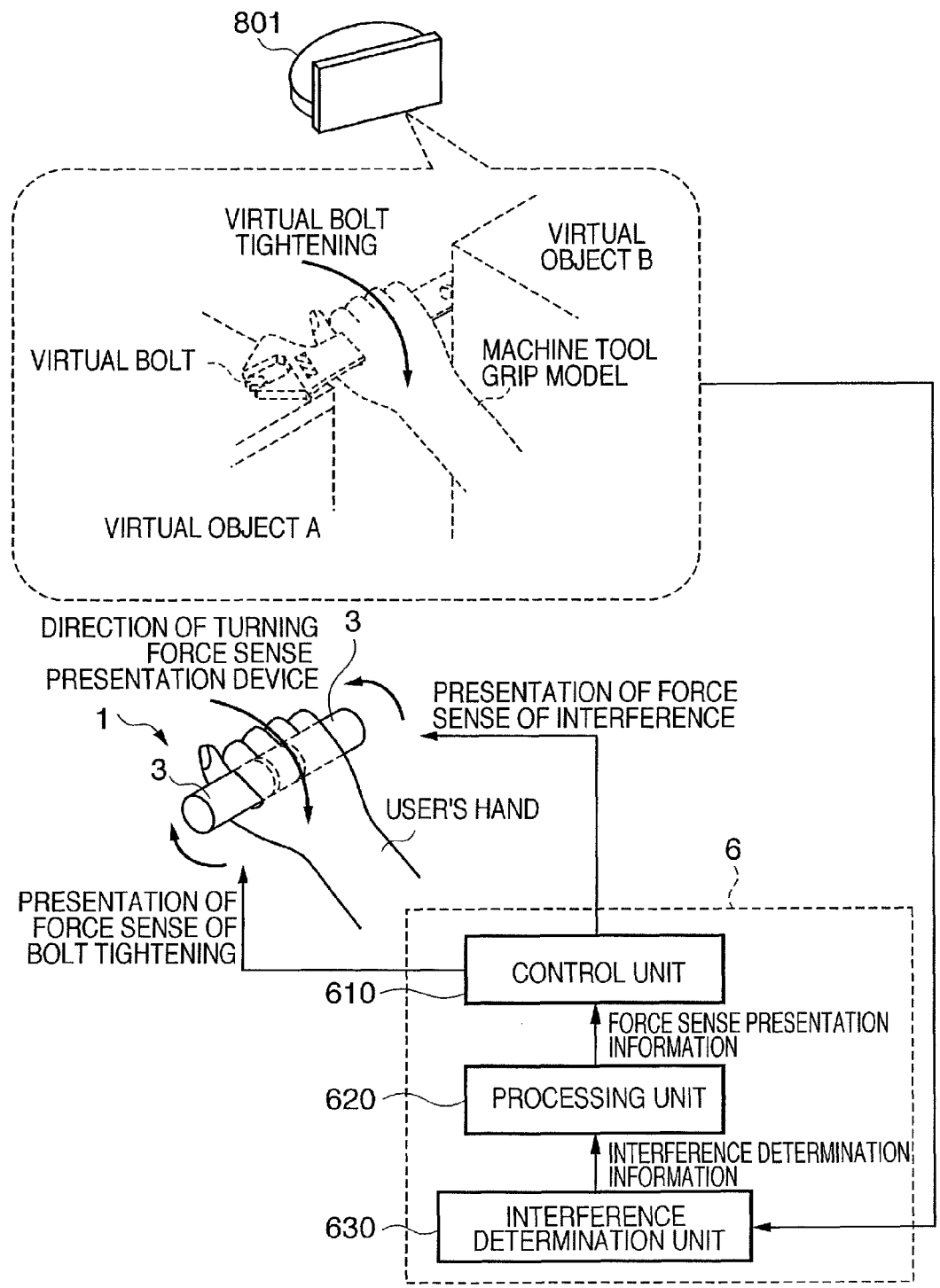

F I G. 25
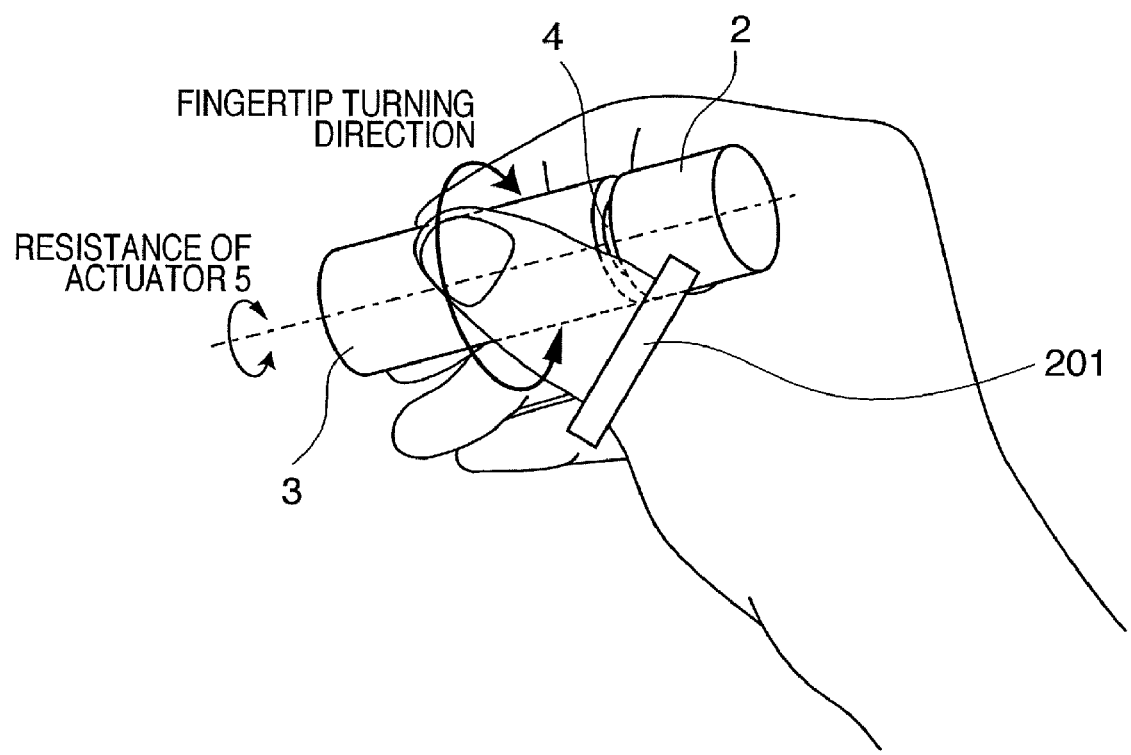

DC MOTOR

ULTRASONIC MOTOR

BRAKE

ER FLUID

- HEXAGON WRENCH
- HEXAGON SOCKET HEAD CAP SCREW
- INTERNAL THREAD

- VIRTUAL MACHINE TOOL
- MACHINE TOOL GRIP MODEL
- DRIVING DIRECTION OF ACTUATOR 5
- VIRTUAL HEXAGON SOCKET HEAD CAP SCREW
- VIRTUAL INTERNAL THREAD

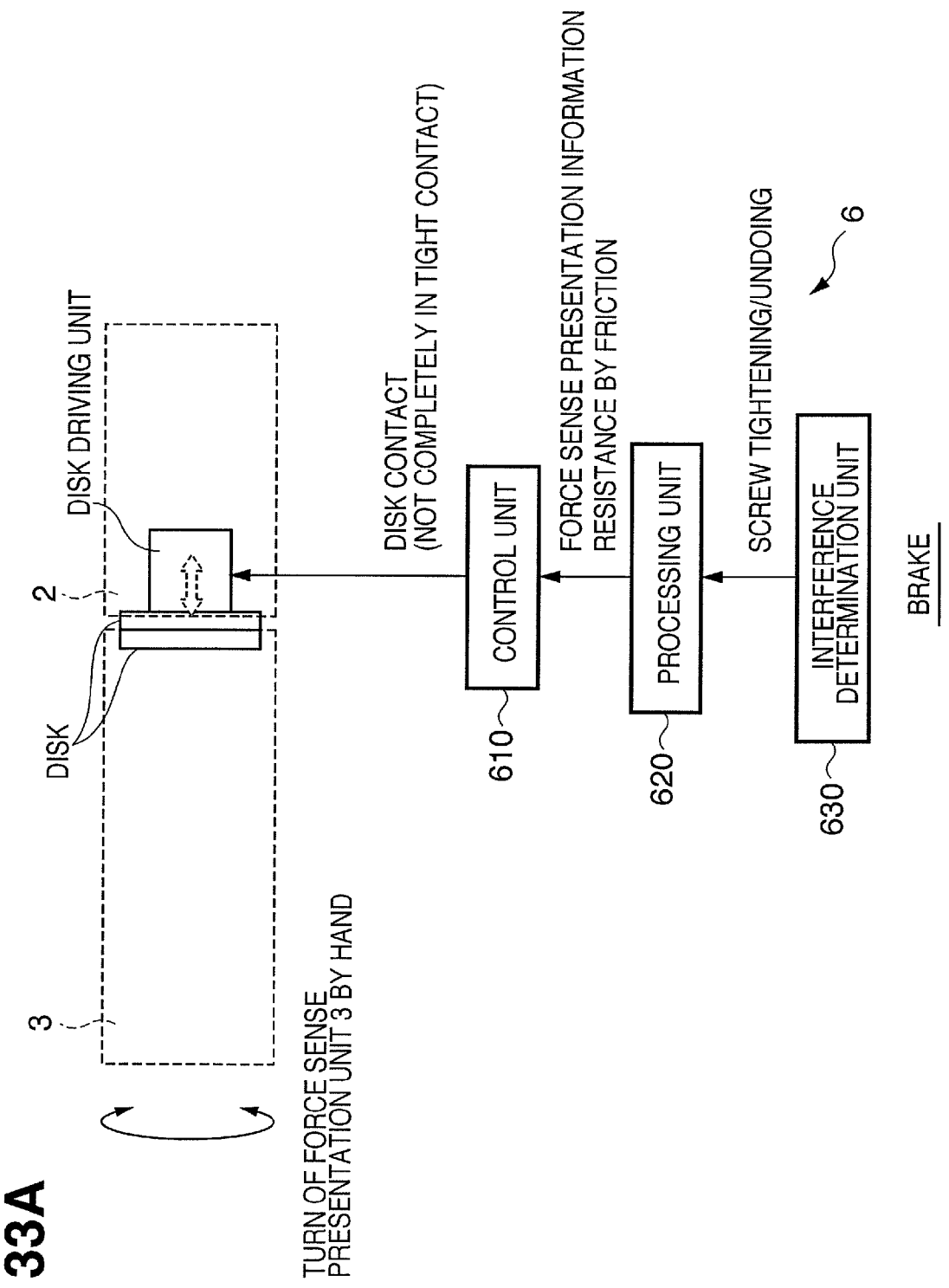

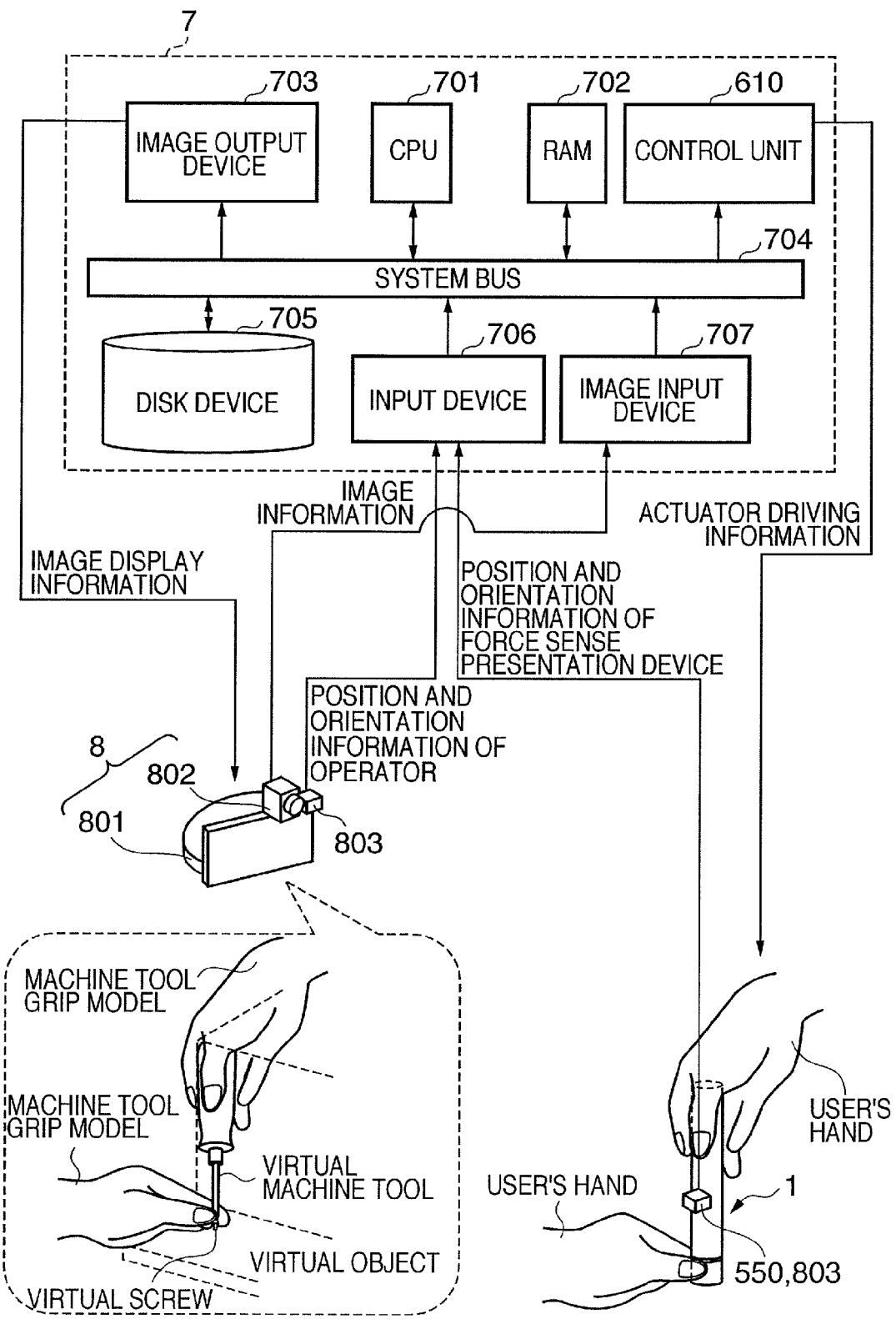

F I G. 36
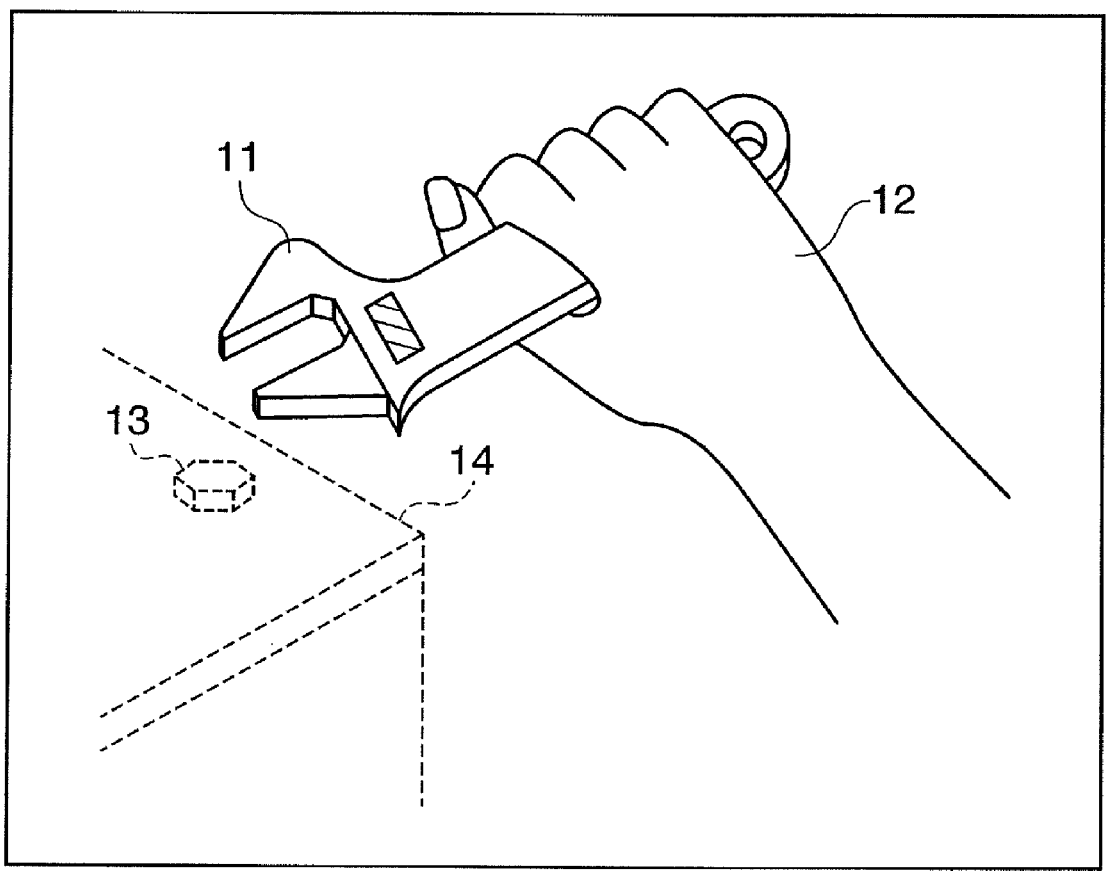

F I G. 37B
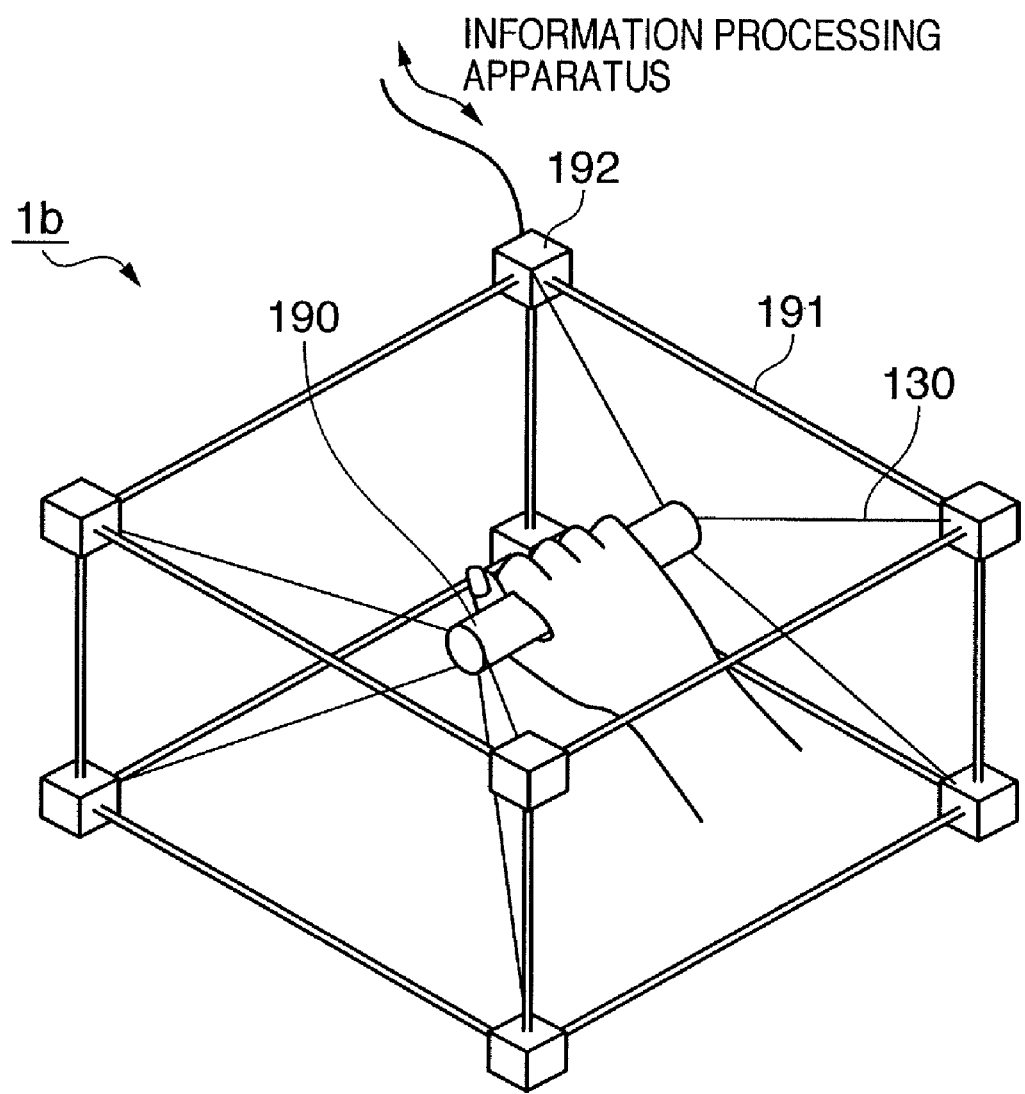

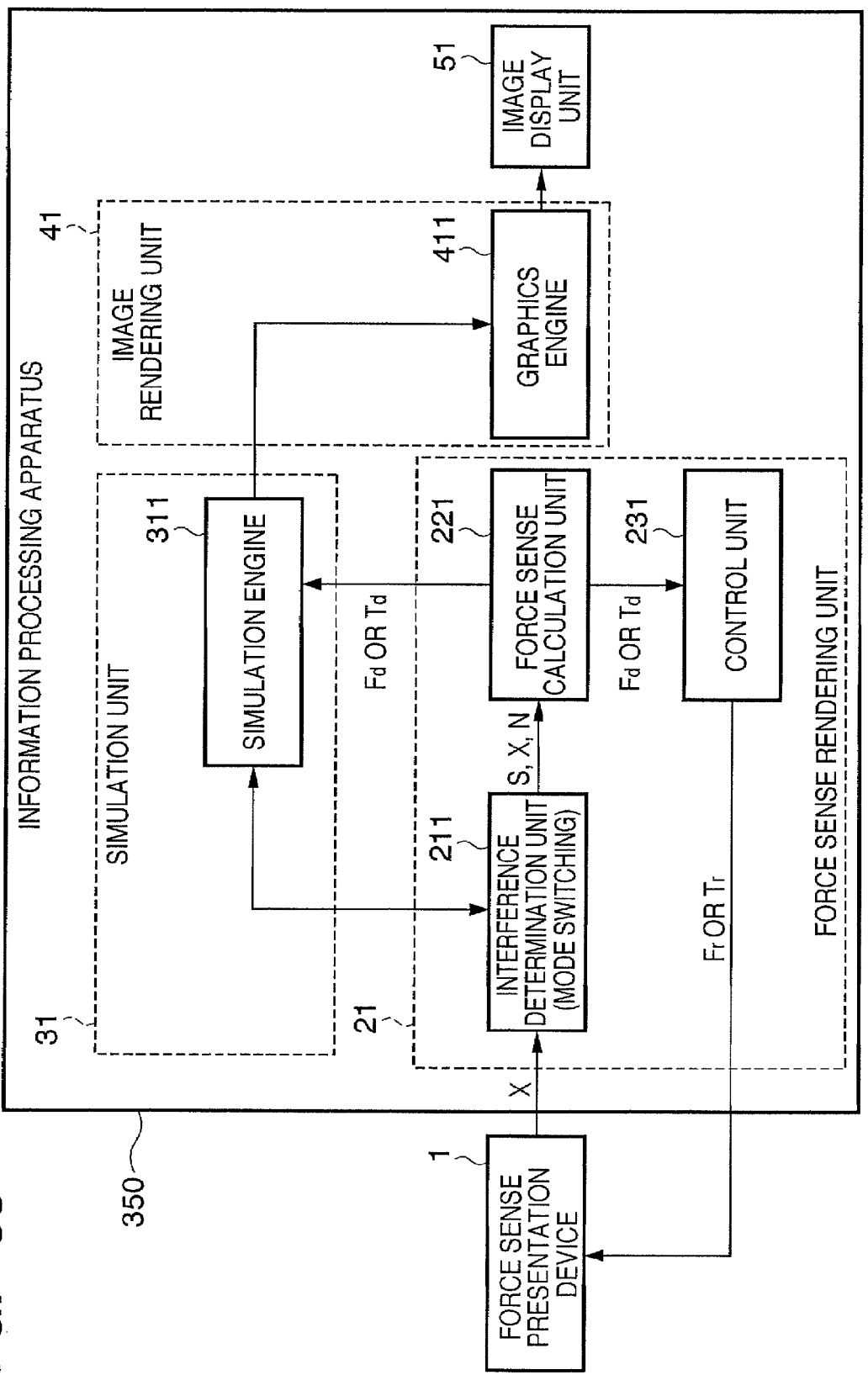
F I G. 38

FORCE SENSE PRESENTATION DEVICE, MIXED REALITY SYSTEM, INFORMATION PROCESSING METHOD, AND INFORMATION PROCESSING APPARATUS

BACKGROUND OF THE INVENTION

1. Field of the Invention

The present invention relates to a user interface technique, in particular to a technique of presenting a sense of force in the fields of virtual reality and mixed reality.

2. Description of the Related Art

As a kind of tactile sense presentation device, force sense presentation devices are known, which present a sense of force by stimulating deep sensations in humans.

In a known typical example of the force sense presentation device, a user grips a stylus pen at the end of a robot arm. The motor of the robot arm controls the output, thereby presenting a sense of force to the hand gripping the stylus pen (T. M. Massie, J. K. Salisbury, "The PHANTOM Haptic Interface: A Device for Probing Virtual Objects", ASME Haptic Interface for Virtual Environment and Teleoperator Systems 1994, In Dynamic Systems and Control, Vol. 1, pp. 295-301 (to be referred to as "Massie et al." hereinafter)). Another device is known which controls the tensile forces of several strings attached on a ball or fingerstalls, thereby presenting a sense of force to the hand gripping the ball or the fingers inserted into the fingerstalls (Makoto Satoh, Yukihiro Hirata, and Hiroshi Kawarada, "Proposals of Space Interface Device SPIDAR", IEICE Transactions D-II Vol. J74-D-II, No. 7, pp. 887-894, July (to be referred to as "Satoh et al." hereinafter)). Still another device is known which has a handle on a floater that is levitating magnetically and causes a user to grip the handle. The magnetic force between the stator and the floater is controlled to present a sense of force to the hand gripping the handle (P. J. Berkelman, Z. J. Butler, and R. L. Hollis, Design of Hemispherical Magnetic Levitation Haptic Interface Device", 1996 ASME International Mechanical Engineering Congress and Exposition, Atlanta, November 1996, DSC-Vol. 58, pp. 483-488). Still another technique measures the position of a human hand by using an LED. Upon detecting the human hand's approach to an object, a plate attached to a robot arm encounters the hand (Y. Yokokohji, R. L. Hollis, and T. Kanabe, "What You can See Is What You can Feel—Development of a Visual/Haptic Interface to Virtual Environment—", In Proceedings of 1996 IEEE Virtual Reality Annual International Symposium (VRAIS '96), pp. 46-53 (1996)). All devices above are ground based force sense presentation devices.

On the other hand, a body based force sense presentation device which has a ground point on a body and is called an exoskeleton type is known (U.S. Pat. No. 5,184,319). This exoskeleton type force sense presentation device fixes a wrist as a support point of force sense presentation. Driving media such as wires are arranged along the exoskeleton and driven to present, to the fingertips, a sense of force in gripping a virtual object.

A body based arrangement which is not of the exoskeleton type is also known (Japanese Patent Laid-Open No. 2002-304246). This device causes a user to grip a force sense presentation unit. A link mechanism is provided between the force sense presentation unit and a unit fixed to a wrist. An actuator arranged on the fixed unit presents a sense of force to the hand gripping the force sense presentation unit via the link mechanism.

This arrangement will be described with reference to FIG. 18. FIG. 18 is a view showing the arrangement of a prior art disclosed in Japanese Patent Laid-Open No. 2002-304246. This body based force sense presentation device causes a user to grip a grip unit 300 to present a sense of force. Support units 200 fix the wrist. Four variable length connection units 400 made of wires are provided between the grip unit 300 and the support units 200. The grip unit 300 is pushed, pulled, or rotated relative to the support units 200, thereby presenting a sense of force to the gripping hand. In addition, the position of the grip unit 300 is detected by measuring the lengths of the variable length connection units 400, thereby determining interference with a virtual object and calculating its insertion depth and speed. A presentation force is obtained based on the calculated insertion depth and speed, and the variable length connection units 400 are driven. The prior art also mentions an application which presents a sense of force in hitting a virtual object (ball) in the virtual environment, making the grip unit 300 gripped by the user simulate the grip of a tool (e.g., bat, golf club, and tennis racket) used in the real environment.

Still another arrangement is also known which causes a user to grip a force sense presentation unit and presents a sense of force to the hand gripping it (N. Nakamura, Y. Fukui, "Development of a Force and Torque Hybrid Display "GyroCubeStick"", world HAPTICS 2005, Pisa, Italy, Mar. 18-20, 2005, pp. 633-634, Japanese Patent Laid-Open No. 2005-190465). FIGS. 17A and 17B show the arrangement of this prior art. Referring to FIG. 17A, a grip unit 1000 to be gripped by a user has a tubular shape. Two eccentric rotors 1100 are placed coaxially on the rotation axis. FIGS. 17B, 17C, and 17D show the phase relationship between the eccentric rotors 1100. FIG. 17B shows the two eccentric rotors 1100 which are in phase and rotate in the same direction, thereby presenting vibration to the hand gripping the grip unit 1000. FIG. 17C shows the two eccentric rotors 1100 which have a fixed phase difference of 180° and rotate in the same direction. When the eccentric rotors 1100 rotate, they can present a torque to the hand gripping the grip unit in accordance with their angular velocities. FIG. 17D shows an arrangement capable of presenting a sense of force by rotating the eccentric rotors 1100 in opposite directions and controlling acceleration and deceleration.

However, the above-described prior arts have the following problems. Of the prior arts, the ground based force sense presentation devices disclosed in the references have a support point for force sense presentation or a force sense presentation mechanism outside the human body. The manipulation area is limited, and its narrowness poses a problem. Interference between the human and the robot arm or strings also impairs the reality.

The body based force sense presentation devices including the force sense presentation device of the exoskeleton type have a fixed portion serving as a support point on part of the human body. This solves the problem of narrow manipulation area in the ground based devices. However, since the support point for force sense presentation is provided on a body part such as a wrist, attachment/detachment is cumbersome, resulting in a sense of incongruity in mounting.

The force sense presentation device described with reference to FIG. 18 can present a sense of gripping a real tool by making the grip unit gripped by the user simulate the grip of a tool (e.g., bat, golf club, and tennis racket) used in the real environment. Additionally, since the wrist serves as the support point, cumbersomeness in attachment/detachment decreases. However, since the support point exists only on the wrist, the reaction of the force that acts to present the sense of force readily concentrates to the wrist, resulting in a larger sense of incongruity. The variable length connection units (wires) hinders a task requiring two-hand operation, and the other hand cannot grip the grip unit without the support point. That is, this force sense presentation device is unsuitable for a task requiring two-handed operation.

The force sense presentation device described with reference to FIGS. 17A to 17D can solve the problem of narrow manipulation area in the ground based force sense presentation devices. This device can also solve the cumbersomeness in attachment/detachment and the sense of incongruity in mounting in the body based force sense presentation device. However, the force sense presentable by the system shown in FIGS. 17A to 17D uses the human sensory characteristic and illusion. The actual force generation is intermittent. Since the user perceives the sense of vibration, the reality is impaired. Furthermore, the perceptible sense of force is small. In continuous use, the user gets used to it, and force sense perception further weakens.

FIG. 43 is a block diagram showing the functional arrangement of a conventional system for implementing force sense presentation in virtual reality (Kenneth Salisbury, Francois Conti, and Federico Barbagli, "Haptic Rendering: Introductory Concepts", IEEE Computer Graphics and Applications, January/February 2004, pp. 24-32).

Referring to FIG. 43, reference numeral 1 denotes a force sense presentation device. A typical example of the force sense presentation device 1 controls a robot arm with a stylus pen at the end. The motor of the robot arm controls the output, thereby presenting a sense of force to the hand gripping the stylus pen (Massie et al).

Another device controls the tensile forces of several strings attached on a ball or fingerstalls, thereby presenting a sense of force to the hand gripping the ball or the fingers inserted into the fingerstalls (Satoh et al).

There is also a device called an exoskeleton type (U.S. Pat. No. 5,184,319). This exoskeleton type force sense presentation device fixes a wrist as a support point of force sense presentation. Driving media such as wires are arranged along the exoskeleton and driven to present, to fingertips, a sense of force in gripping a virtual object.

A force sense rendering unit 20 includes a interference determination unit 210, force sense calculation unit 220, and control unit 230.

The interference determination unit 210 acquires, from the force sense presentation device 1, a position X of a virtual object (avatar) that simulates a machine tool as a manipulation target of the user and obtains an interference state by using the acquired position and the position of the object as the manipulation target of the machine tool. The interference state is an insertion depth S representing the degree of insertion of the avatar in the object.

The force sense calculation unit 220 calculates a force Fd acting on the avatar based on the insertion depth S.

The control unit 230 obtains a control value Fr to cause the force sense presentation device 1 to present the force Fd to the user and sends the obtained control value Fr to the force sense presentation device 1.

A simulation unit 30 has a simulation engine 310. The simulation unit 30 simulates deformation or movement of the object based on the force Fd calculated by the force sense calculation unit 220. The simulation result is sent to the interference determination unit 210 immediately. The interference determination unit 210 determines the interference between the object and the avatar according to the simulation result. The simulation result is also sent to a graphics engine 410 on the succeeding stage.

An image rendering unit 40 has the graphics engine 410. The graphics engine 410 generates an avatar image and an object image. The object moves or deforms based on the simulation result.

An image display unit 50 including a flat panel display or head mounted display (HMD) with a CRT or liquid crystal display panel displays an image generated by the graphics engine 410.

To present a sense of force of tightening a screw by the above-described conventional force sense presentation method, however, it is necessary to determine the interference between the thread ridge and root of an external thread and those of an internal thread, and the calculation is complex. Additionally, the reaction force and friction at multiple points need to be calculated. This makes the calculation more complex and largely increases the amount of calculation. Hence, real-time presentation or smooth and natural force sense presentation is impossible.

SUMMARY OF THE INVENTION

The present invention has been made in consideration of the above-described problems, and has as its object to provide a technique capable of presenting an appropriate sense of force to a user while improving the operability in virtual space.

It is another object of the present invention to provide a technique capable of continuously presenting a sense of force in a wide manipulation range without any cumbersomeness in attachment/detachment or sense of incongruity in mounting.

It is still another object of the present invention to provide a technique of more easily presenting a sense of force.

According to one aspect of the present invention, a force sense presentation device for presenting a sense of force in virtual space to a user, comprises:

a fixed unit which is gripped by the user;

a force sense presentation unit which presents a sense of force;

an actuator which supplies a driving force and operates the force sense presentation unit relative to the fixed unit;

a joint unit which is provided between the fixed unit and the force sense presentation unit, and guides the relative operation of the force sense presentation unit; and a force sense rendering unit which controls the relative operation of the force sense presentation unit by the actuator, wherein the force sense presentation device simulates a device which is gripped and used by the user, and the force sense rendering unit controls the relative operation of the force sense presentation unit based on a position and orientation of the device in the virtual space.

According to another aspect of the present invention, a mixed reality system includes a force sense presentation device for presenting a sense of force in virtual space to a user, an information processing apparatus, and a display, wherein the force sense presentation device comprises:

a fixed unit which is gripped by the user;

a force sense presentation unit which presents a sense of force;

an actuator which supplies a driving force and operates the force sense presentation unit relative to the fixed unit; and a joint unit which is provided between the fixed unit and the force sense presentation unit and guides the relative operation of the force sense presentation unit, the system comprises:

a force sense rendering unit which controls the relative operation of the force sense presentation unit by the actuator;

a measuring unit which measures a relative position and orientation in the virtual space between the device and a virtual object in the virtual space; and an image output unit which outputs, to the display, an image representing positions and orientations of the virtual object and the device in the virtual space based on the position and orientation measured by the measuring unit, wherein the force sense presentation device simulates a device which is gripped and used by the user, and the force sense rendering unit controls the relative operation of the force sense presentation unit based on the position and orientation measured by the measuring unit.

According to still another aspect of the present invention, an information processing method executed by an information processing apparatus for controlling a force sense presentation device which has an operation unit to operate a virtual machine tool object simulating a machine tool and presents a sense of force corresponding to a given control value, the method comprises:

the first determination step of determining whether the virtual machine tool object is interfering with a virtual thread object simulating a thread member;

the second determination step of determining whether the virtual thread object is interfering with a virtual threaded hole object simulating a threaded hole;

the mode control step of shifting a control mode of the force sense presentation device from a normal mode to a non-normal mode when the virtual machine tool object is interfering with the virtual thread object, and the virtual thread object is interfering with the virtual threaded hole object;

the calculation step of executing a calculation process of obtaining, based on a revolution count of the virtual thread object, a torque for the virtual machine tool object generated in accordance with interference between the virtual thread object and the virtual threaded hole object when the control mode is shifted to the non-normal mode; and the transmission step of obtaining a control value to make the force sense presentation device present a sense of force based on the torque obtained in the calculation step and transmitting the control value to the force sense presentation device.

According to yet another aspect of the present invention, an information processing method executed by an information processing apparatus for controlling a force sense presentation device which presents a sense of force in attaching a virtual thread object simulating a thread member to a virtual threaded hole object simulating a threaded hole, the method comprises:

the determination step of determining an interference state between the virtual thread object and the virtual threaded hole object;

the calculation step of obtaining a torque corresponding to a revolution count of the virtual thread object when it is determined in the determination step that the virtual thread object is interfering with the virtual threaded hole object; and the control step of controlling to make the force sense presentation device present a sense of force based on the torque obtained in the calculation step.

According to still yet another aspect of the present invention, an information processing apparatus for controlling a force sense presentation device which has an operation unit to operate a virtual machine tool object simulating a machine tool and presents a sense of force corresponding to a given control value, the apparatus comprises:

a first determination unit which determines whether the virtual machine tool object is interfering with a virtual thread object simulating a thread member;

a second determination unit which determines whether the virtual thread object is interfering with a virtual threaded hole object simulating a threaded hole;

a mode control unit which shifts a control mode of the force sense presentation device from a normal mode to a non-normal mode when the virtual machine tool object is interfering with the virtual thread object, and the virtual thread object is interfering with the virtual threaded hole object;

a calculation unit which executes a calculation process of obtaining, based on a revolution count of the virtual thread object, a torque for the virtual machine tool object generated in accordance with interference between the virtual thread object and the virtual threaded hole object when the control mode is shifted to the non-normal mode; and a transmission unit which obtains a control value to make the force sense presentation device present a sense of force based on the torque obtained by the calculation unit and transmits the control value to the force sense presentation device.

According to yet still another aspect of the present invention, an information processing apparatus for controlling a force sense presentation device which presents a sense of force in attaching a virtual thread object simulating a thread member to a virtual threaded hole object simulating a threaded hole, the apparatus comprises:

a determination unit which determines an interference state between the virtual thread object and the virtual threaded hole object;

a calculation unit which obtains a torque corresponding to a revolution count of the virtual thread object when it is determined by the determination unit that the virtual thread object is interfering with the virtual threaded hole object; and a control unit which controls to make the force sense presentation device present a sense of force based on the torque obtained by the calculation unit.

Further features of the present invention will become apparent from the following description of exemplary embodiments (with reference to the attached drawings).

BRIEF DESCRIPTION OF THE DRAWINGS

FIGS. 17A to 17D are views showing the arrangement of a prior art;

FIG. 22 is a schematic view showing an arrangement for presenting a sense of force when a virtual machine tool interferes with a virtual object;

FIG. 25 is a view showing a force sense presentation device grip state;

FIGS. 33A and 33B are views schematically showing a passive control actuator;

FIG. 34 is a view schematically showing the configuration of a mixed reality system incorporating a force sense presentation device;

FIG. 36 is a view showing a state wherein a user tightens a virtual screw by using a virtual machine tool;

FIG. 37B is a view showing the outer appearance of another force sense presentation device;

FIG. 38 is a view showing a functional arrangement of a system according to the fifth embodiment of the present invention;

DESCRIPTION OF THE EMBODIMENTS

Embodiments of the present invention will now be described in detail in accordance with the accompanying drawings. Note that each element in the following embodiments is not intended to limit the scope of the invention, but is merely an example.

First Embodiment

This embodiment relates to a user interface and more particularly, to a device and system which increase the reality by adding a user interface to present not only a visual sense but also a sense of force in the fields of virtual reality and mixed reality. In this embodiment, in particular, operation verification is assumed as an example of a virtual reality or mixed reality application. In the operation verification, a designed industrial product or device is visually displayed as a virtual object. Then, a sense of force is presented to increase the reality to determine whether assembly or maintenance is easy. For assembly or maintenance of an industrial product or device, it is necessary to verify whether a hand can enter a narrow internal space or whether an operation such as assembly or maintenance can be done by inserting a jig or tool. In this embodiment, a user interface and a system usable for such operation verification will be described.

However, the application purpose of the arrangement of this embodiment is not limited to the operation verification. For example, a walking navigation system mainly for a visually handicapped person can be implemented by causing a user to carry the force sense presentation device of the embodiment and presenting a sense of force to the user's hand gripping the device based on of his/her position information, as will be described later.

(Torque and Reaction Force)

Figure 1:
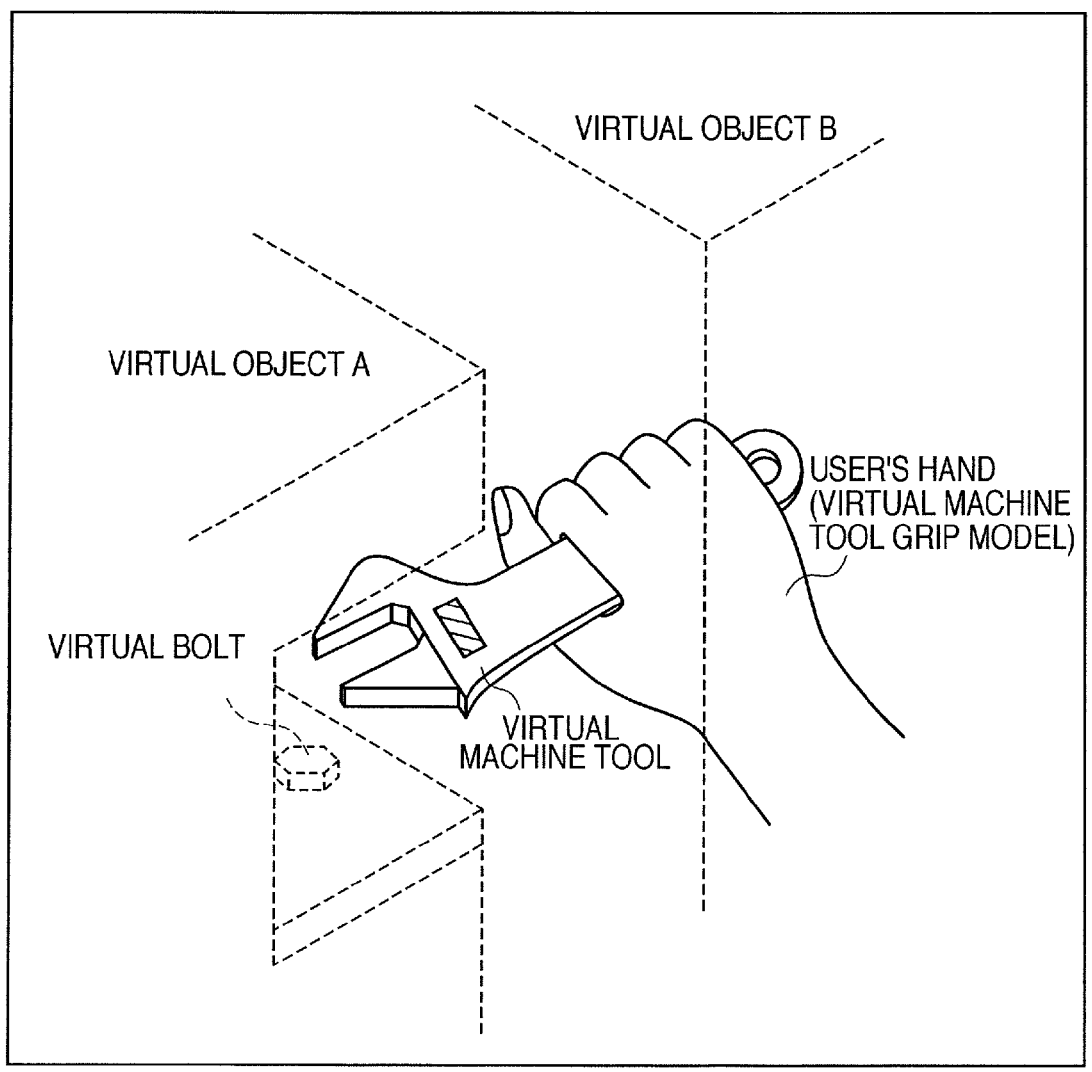
FIG. 1 is a view showing the images of virtual objects displayed by virtual reality or mixed reality and a hand gripping a virtual machine tool.

Verifying whether an operation such as assembly or maintenance can be done by inserting a jig or tool into a virtually displayed product in operation verification of an industrial product or device by virtual reality or mixed reality will be described with reference to FIG. 1. FIG. 1 is a view showing the images of virtual objects displayed by virtual reality or mixed reality and a hand (virtual grip model) gripping a virtual machine tool. For example, assume that the user tightens a virtual bolt in a virtual object A. In this case, it is difficult to grasp, based only on the displayed virtual object images, the degree of influence of the narrow clearance between the virtual object A and a virtual object B on the operability. However, when actual bolt tightening is simulated by using a virtual machine tool, the operability can be evaluated and verified. Additionally, a virtual machine tool having a force sense presentation function makes it possible to more accurately verify whether a machine tool can enter or whether there is sufficient space to allow bolt tightening. As a main characteristic feature, the arrangement according to this embodiment enables to present the sense of operation in using a machine tool, as will be described later.

Figure 2A:
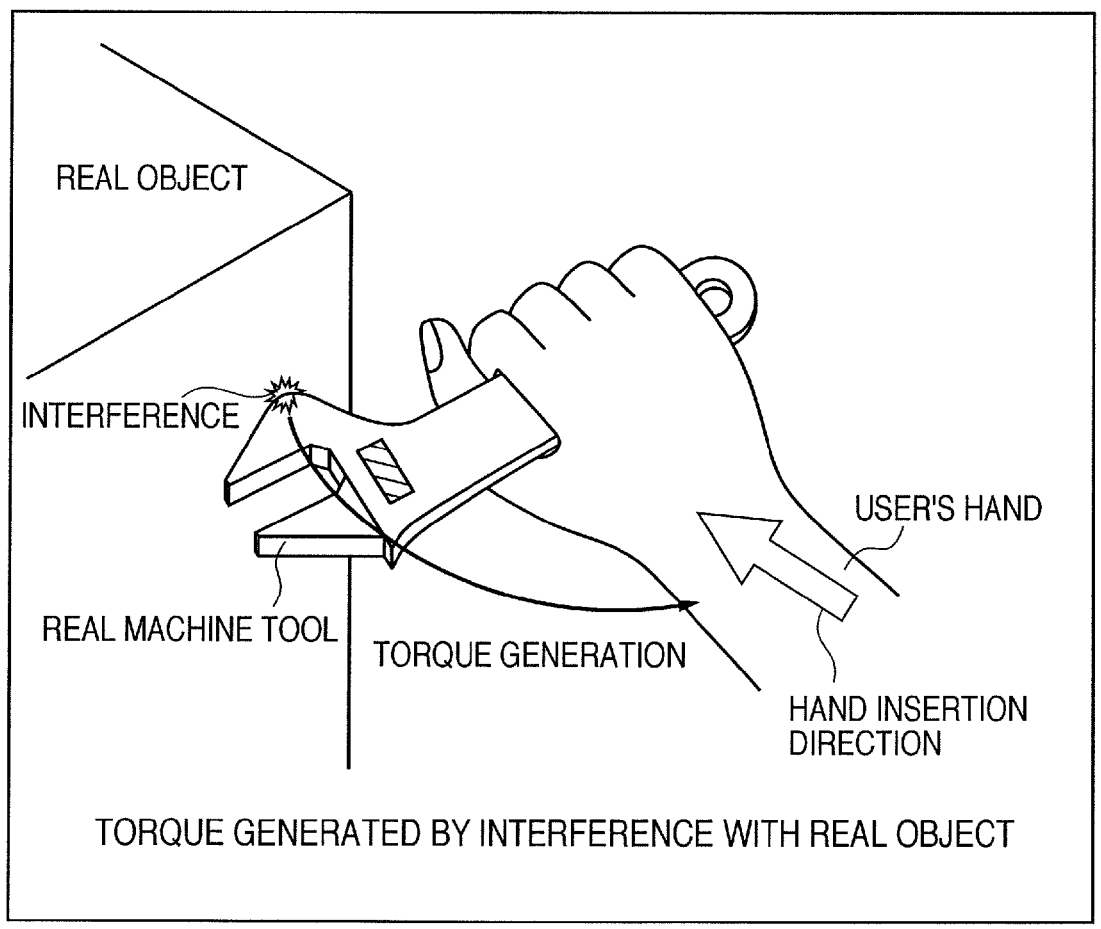
FIGS. 2A and 2B are views schematically showing a state wherein the interference between real objects and a real machine tool generates a torque.
Figure 2B:
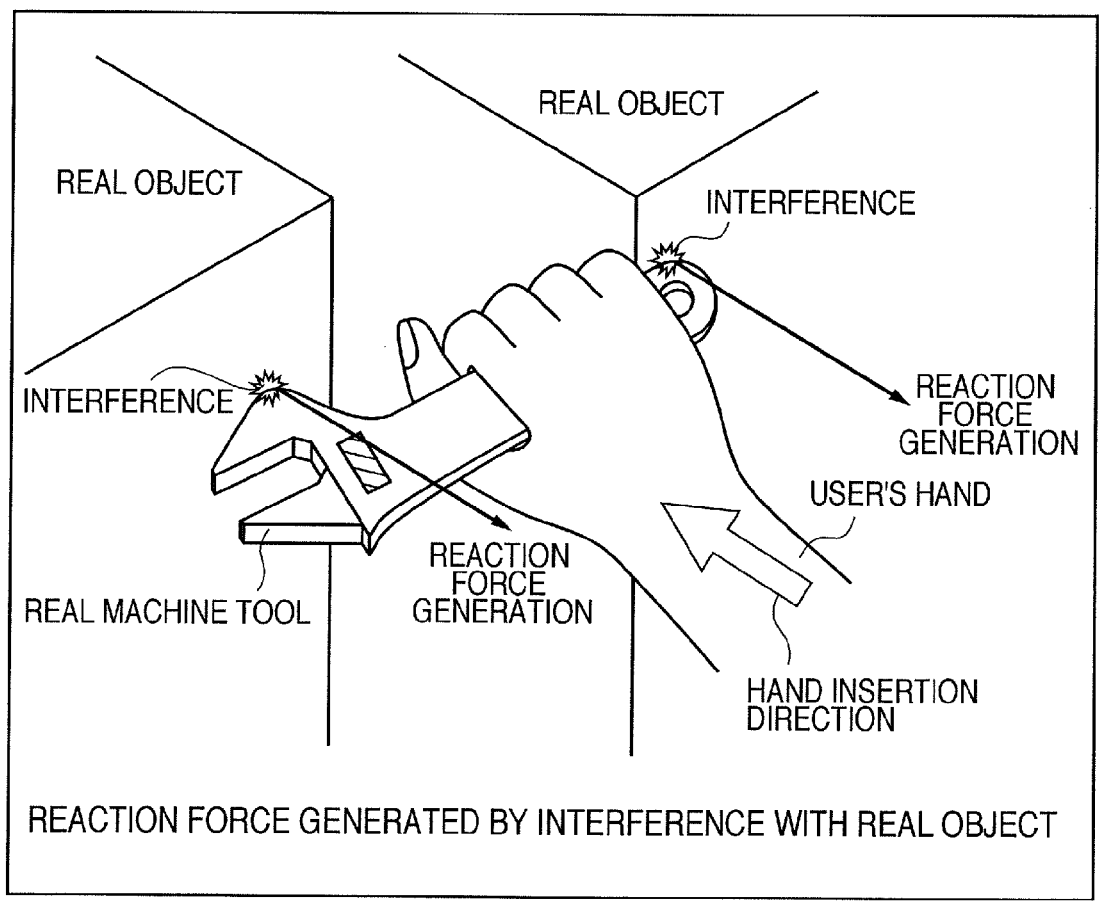

In force sense presentation to a hand, when a real object contacts a real machine tool, a torque or force is generated, as shown in FIGS. 2A and 2B. FIGS. 2A and 2B are views schematically showing a state wherein the interference between real objects and a real machine tool generates a torque. The functions of the force sense presentation device according to this embodiment will be described below by comparison to torque or reaction force generation in using a real machine tool.

When the user grips an actual machine tool, and an edge of it hits a real object, as shown in FIG. 2A, a torque is generated in a direction to rotate the machine tool about the hand gripping it. The magnitude of the torque is obtained by multiplying the force upon hand insertion and the distance from the interference position to the rotation center. When the user grips an actual machine tool, and the machine tool interferes with real objects parallel to it, as shown in FIG. 2B, a reaction force is generated in a direction opposite to the direction of hand insertion.

Figure 3A:
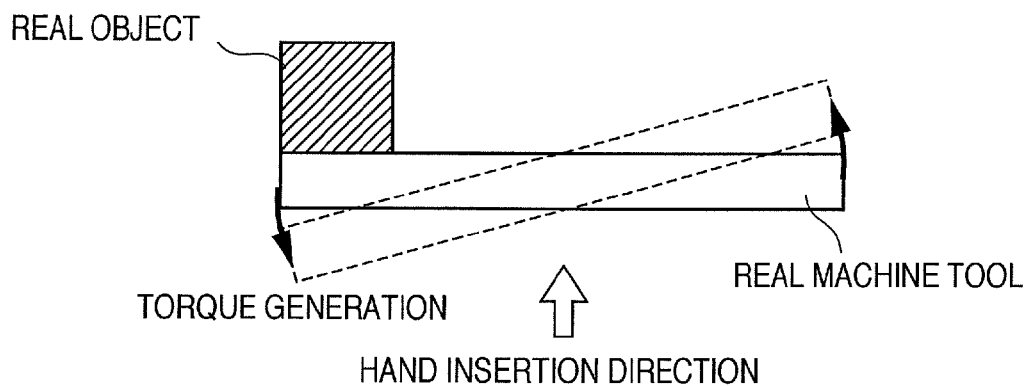
FIGS. 3A and 3B are views schematically showing a state wherein an edge of a machine tool hits an object and generates a torque.
Figure 3B:
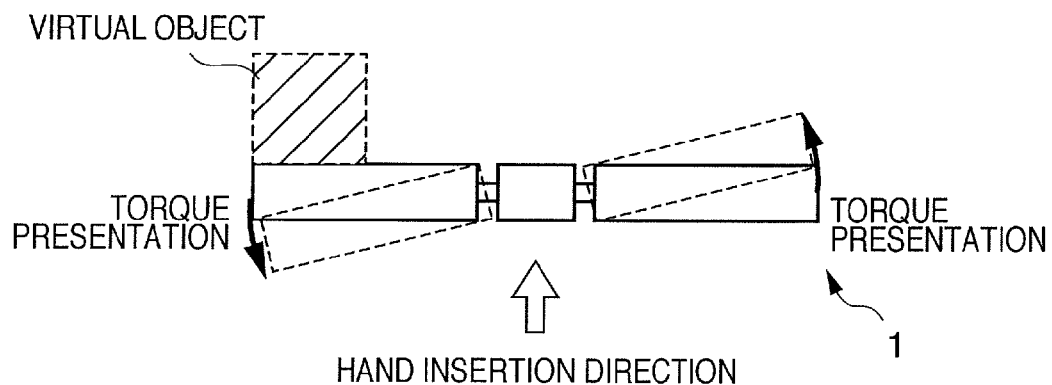
Figure 4A:
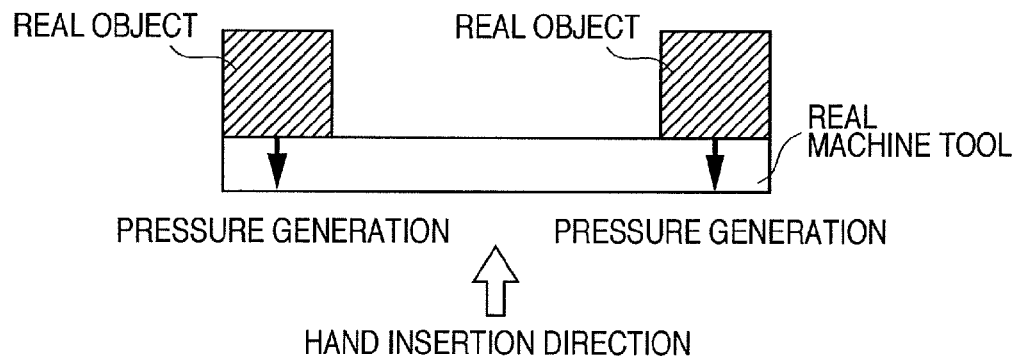
FIGS. 4A and 4B are views schematically showing a state wherein a machine tool parallelly interferes with objects and generates a reaction force.
Figure 4B:
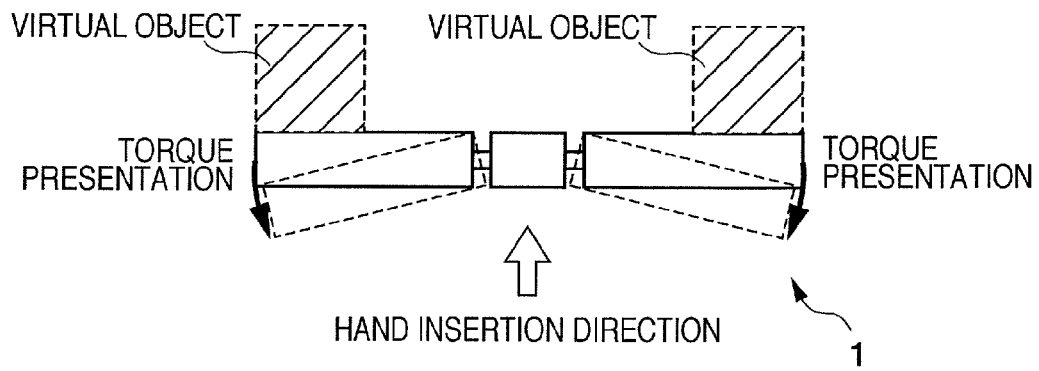

To complement FIGS. 2A and 2B, a more detailed description will be made with reference to FIGS. 3A, 3B, 4A, and 4B. FIGS. 3A and 3B are views schematically showing a state wherein an edge of a machine tool hits an object and generates a torque. FIGS. 4A and 4B are views schematically showing a state wherein a machine tool parallelly interferes with objects and generates a reaction force. FIGS. 3A, 3B, 4A, and 4B do not illustrate the gripping hand.

FIG. 3A schematically shows a state wherein an edge of a real machine tool hits a real object and generates a torque, as shown in FIG. 2A. The solid line in FIG. 3A indicates the state of the gripped real machine tool before interference, and the broken line indicates torque generation. It is possible to present a similar force sense by using a force sense presentation device 1 of this embodiment. More specifically, the force sense presentation device 1 shown in FIG. 3B is driven to the position indicated by the broken line. A torque is presented so that the gripping hand can perceive a similar sense of force.

FIG. 4A shows a state wherein a machine tool parallelly interferes with objects and generates a reaction force, as shown in FIG. 2B. The solid line in FIG. 4A indicates the state of the gripped real machine tool before interference, and the arrows indicate reaction force generation. When the force sense presentation device 1 of this embodiment is used and driven to the position indicated by the broken lines, as shown in FIG. 4B, to present a torque, the gripping hand can perceive a similar sense of force.

(Force Sense Presentation Device)

Figure 5:
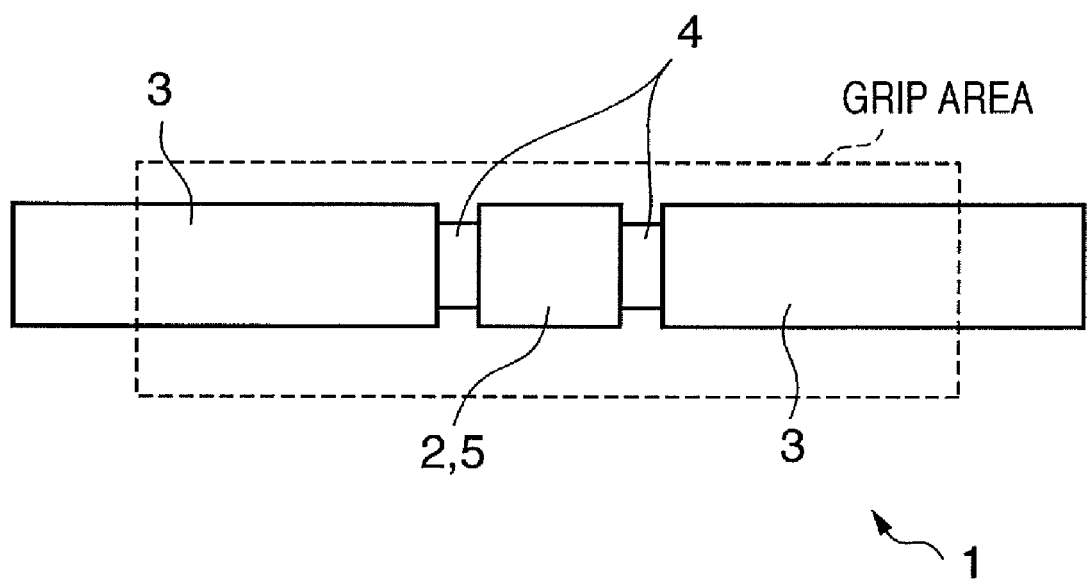
FIG. 5 is a view schematically showing the arrangement of a force sense presentation device.

The arrangement of the force sense presentation device 1 according to this embodiment schematically described with reference to FIGS. 3B and 4B will be described next with reference to FIG. 5. FIG. 5 is a view schematically showing the arrangement of the force sense presentation device 1 of this embodiment.

Figure 6:
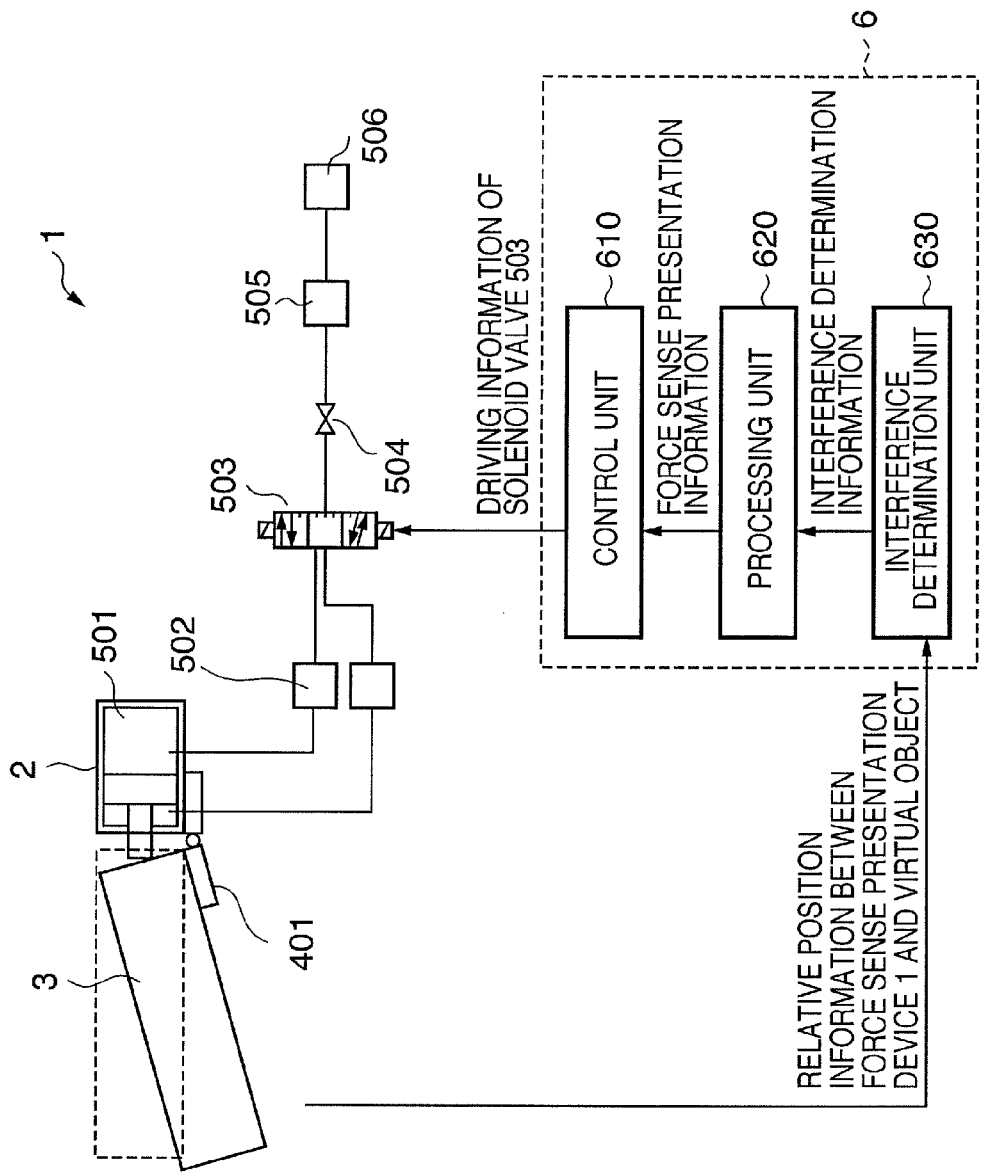
FIG. 6 is a view schematically showing a force sense presentation device formed by using an air cylinder.
Figure 7:
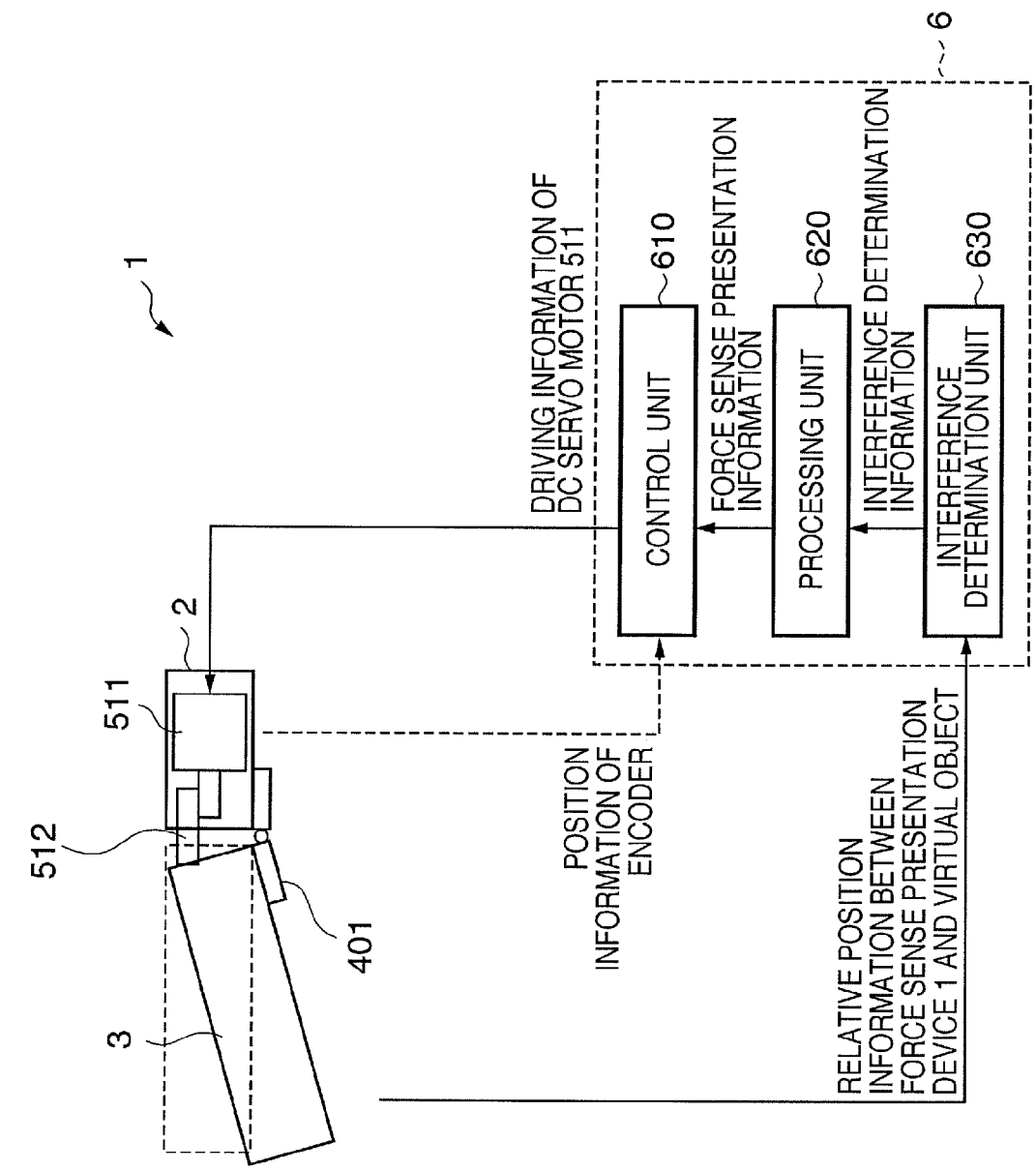
FIG. 7 is a view schematically showing a force sense presentation device formed by using a DC servo motor.

Referring to FIG. 5, a fixed unit 2 serves as a reference when the user (operator) grips the device. Force sense presentation units 3 present a force sense to the hand actually gripping the device in torque generation described with reference to FIG. 3B or 4B. Joints 4 are provided between the fixed unit 2 and the force sense presentation units 3 to guide the driving directions of the force sense presentation units 3. It is effective to use a guide, bearing, hinge, and link mechanism in the joint 4. An actuator 5 drives the force sense presentation units 3 relative to the fixed unit 2. At least one of the fixed unit 2 and force sense presentation units 3 preferably incorporates the actuator 5. In this embodiment, the fixed unit 2 incorporates the actuator 5, as shown in FIGS. 6 and 7. However, the present invention is not limited to this. For example, the actuator 5 may exist outside the fixed unit 2 or force sense presentation unit 3. Drive of the actuator 5 may be guided via mechanical elements such as a link mechanism and gears to drive the force sense presentation device 1.

The user grips an area of the force sense presentation device 1 indicated by the dotted line, that is, the joint 4 and at least a partial area of the force sense presentation units 3 relative to the fixed unit 2. When the user grips the force sense presentation device 1 in this way, a force sense can be presented to the palm gripping the device only by driving it as in FIG. 3B or 4B. Hence, there is no cumbersomeness in mounting or attachment/detachment, unlike the exoskeleton type force sense presentation device. The sense of incongruity in mounting can also be eliminated. When the actuator 5 is kept driven, the skin of the palm gripping the device is distorted to continuously stimulate the nerves. It is therefore possible to continuously perceive a strong sense of force. The device shown in FIG. 3B is point-symmetrical with respect to the center of the fixed unit 2. The device shown in FIG. 4B is bilaterally symmetrical with respect to the center of the fixed unit 2. However, the shape is not limited to bilateral symmetry.

(Actuator)

The actuator 5 will be described next in detail. The actuator 5 which drives the fixed unit 2 and force sense presentation units 3 of the force sense presentation device 1 relative to each other uses a hydraulic/pneumatic cylinder, solenoid, shape memory alloy, various kinds of motors, or polymer actuator.

An example in which an air cylinder is used as a force sense presentation driving force will be described with reference to FIG. 6. FIG. 6 is a view schematically showing the force sense presentation device 1 formed by using an air cylinder. FIG. 6 shows only part of the force sense presentation device 1 on the left side of the fixed unit 2 in FIG. 5, for the descriptive convenience.

The actuator 5 incorporates an air cylinder 501 in the fixed unit 2. The distal end of the air cylinder 501 contacts part of the force sense presentation unit 3 and operates it. The driving direction of the joint 4 including a hinge 401 is restricted. If the air cylinder 501 is a double acting cylinder, two driving air lines are necessary. Each air line has a speed controller 502 to adjust the responsiveness of the air cylinder. The air line also includes a solenoid valve 503 to control push and pull of the air cylinder 501, and an air supply compressor 506. A valve 504 and a regulator 505 are preferably provided between the solenoid valve 503 and the compressor 506.

A force sense rendering unit 6 controls drive of the force sense presentation units 3. A control unit 610 gives the driving information of the solenoid valve 503. A processing unit 620 gives force sense information to the control unit 610. An interference determination unit 630 determines interference based on the relative position information between a virtual object and the force sense presentation device 1 or virtual machine tool. The interference determination unit 630 calculates interference or noninterference between the force sense presentation device 1 and the virtual object. In accordance with the calculation result, the processing unit 620 sends ON/OFF control information for force sense presentation to the control unit 610. The control unit 610 drives the solenoid valve 503.

In this example, it is assumed that the force sense presentation unit 3 is operated by ON/OFF-driving the air cylinder 501. However, the present invention is not limited to this. For example, an electro-pneumatic regulator or a mass flow controller may be provided in place of or before/after the speed controller 502. In this case, the interference determination unit 630 calculates the insertion depth of the force sense presentation device 1 in a virtual object. The processing unit 620 calculates the sense of force to be presented based on the depth. The control unit 610 not only drives the solenoid valve 503 but also causes the electro-pneumatic regulator to control the pressure or the mass flow controller to control the flow rate based on the calculated sense of force to present the sense of force calculated by the processing unit 620.

FIG. 6 shows the double acting air cylinder 501. However, a single acting cylinder may be used. The fixed unit 2 incorporates the air cylinder 501. However, the present invention is not limited to this. The force sense presentation unit 3 may incorporate the air cylinder. The solenoid valve 503 is a three position solenoid valve. However, the present invention is not limited to this. A two position solenoid valve may be used. An air cylinder, nitrogen gas cylinder, tank, or accumulator may be used in place of the compressor 506.

The interference determination unit 630 calculates interference or insertion depth based on the relative position information between the force sense presentation device 1 and a virtual object, as described above. However, the present invention is not limited to this. As described with reference to FIG. 1, the force sense presentation device 1 simulates a machine tool. Machine tools to be simulated include a monkey wrench, wrench, hexagon wrench, and ratchet wrench, which have different shapes and sizes. It is therefore more preferable to calculate interference with a virtual object and insertion depth based on the shape or size of the virtual object and transmit the interference information to the processing unit 620.

If a solenoid is used as the actuator 5, it is mounted in the place where the air cylinder 501 in FIG. 6 is incorporated. The control unit 610 directly sends driving information to the solenoid.

When the direct acting actuator is used, the force sense presentation device 1 with a simple arrangement can be operated at a low cost. A direct acting hydraulic/pneumatic cylinder has been described above. Instead, a rotary hydraulic/pneumatic actuator or a small balloon which deforms along with a pressure change is also usable.

An example in which a DC servo motor is used as the actuator 5 will be described with reference to FIG. 7. FIG. 7 is a view schematically showing the force sense presentation device 1 formed by using a DC servo motor. FIG. 7 shows only part of the force sense presentation device 1 on the left side of the fixed unit 2 in FIG. 5, for the descriptive convenience.

Referring to FIG. 7, the actuator 5 is a DC servo motor 511. A mechanical element component 512 to transmit the power from the DC servo motor 511 to the force sense presentation unit 3 relative to the fixed unit 2 is incorporated in the fixed unit. An example of the mechanical element component 512 is a gear.

The interference determination unit 630 executes interference determination and insertion depth calculation based on the relative position information between a virtual object and the force sense presentation device 1 or virtual machine tool and sends the information to the processing unit 620. The processing unit 620 calculates the force sense to be presented based on the insertion depth and gives the result to the control unit 610. The control unit 610 determines the output of the DC servo motor 511 based on the force sense to be presented and drives the DC servo motor 511. At this time, an encoder incorporated in the DC servo motor 511 may feed back the rotation position information of the DC servo motor 511 to the control unit 610 or acquire the position and orientation information of the force sense presentation device 1 and feed back it to the interference determination unit 630. The controlled variable of the control unit 610 may be either a driving amount, driving torque, or driving force.

In the example shown in FIG. 7, the fixed unit 2 incorporates the DC servo motor 511 and mechanical element component 512. However, the present invention is not limited to this. For example, the force sense presentation unit 3 may incorporate them. Any other motor such as a DC motor, AC motor, stepping motor, linear motor, electrostatic motor, or ultrasonic motor is also applicable. When a motor and a mechanical element component are used, the resolving power for force sense presentation increases so that more real force sense presentation can be done.

Figure 8:
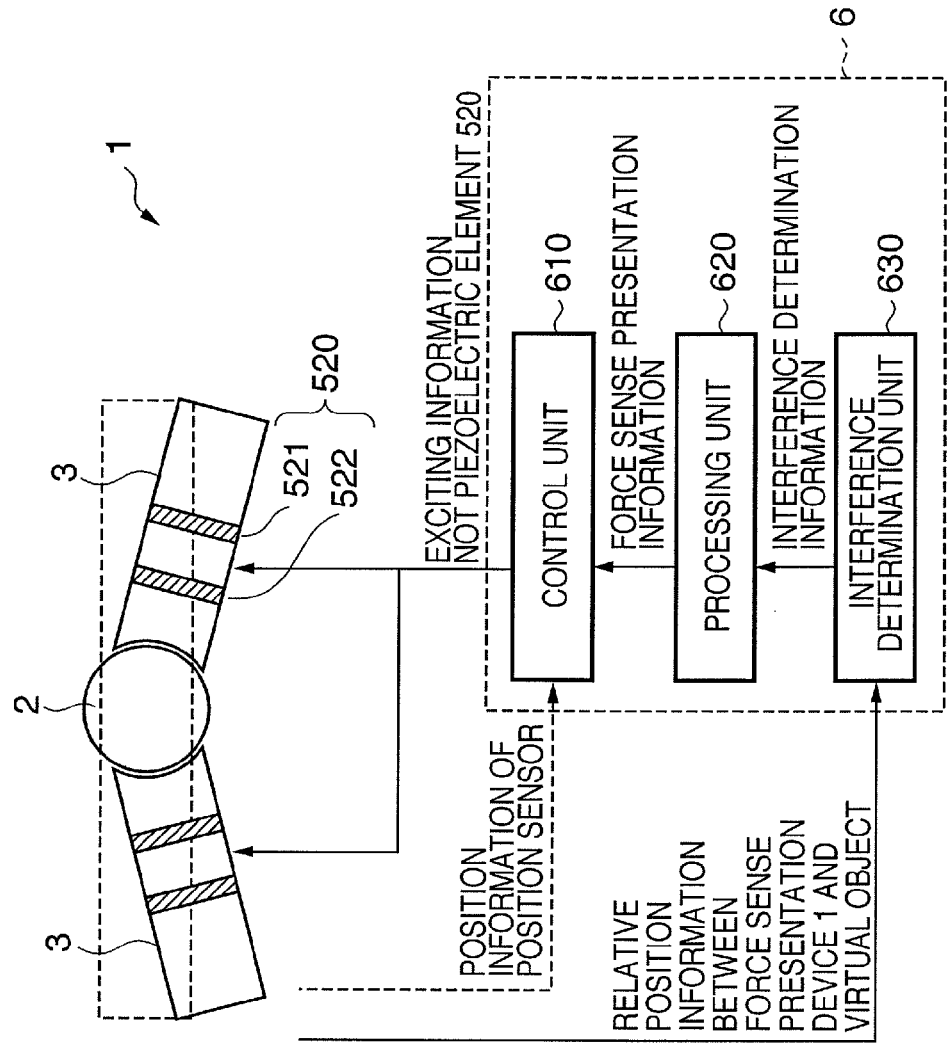
FIG. 8 is a view schematically showing a force sense presentation device implemented by using a multi-degree-of-freedom ultrasonic motor.

An example in which the force sense presentation device 1 is implemented by using a multi-degree-of-freedom ultrasonic motor will be described next with reference to FIG. 8. FIG. 8 is a view schematically showing the force sense presentation device 1 implemented by using a multi-degree-of-freedom ultrasonic motor.

Referring to FIG. 8, the fixed unit 2 is a spherical rotor. The force sense presentation units 3 are rod-shaped stators. Piezoelectric elements 520 are embedded in the force sense presentation units 3. The piezoelectric elements 520 include a longitudinal vibration exciting piezoelectric element 521 that vibrates in the longitudinal direction of the force sense presentation unit 3, and a bending vibration exciting (stacked) piezoelectric element 522 that vibrates in the bending direction. When the piezoelectric elements 520 excite the force sense presentation units 3, they can be driven relative to the fixed unit 2, as indicated by the broken lines and solid lines in FIG. 8. The fixed unit 2 and force sense presentation units 3 are connected via magnets so that the force sense presentation units 3 are slidably driven against the friction generated between them. That is, the force sense presentation device 1 can integrate the joints 4 having a bearing function with the actuator 5.

In the example shown in FIG. 8, the piezoelectric elements 520 are used as elements to excite the force sense presentation units 3. However, the present invention is not limited to this, and any other similar elements are also usable.

The interference determination unit 630 executes interference determination and insertion depth calculation based on the relative position information between a virtual object and the force sense presentation device 1 or virtual machine tool and sends the information to the processing unit 620. The processing unit 620 calculates the force sense to be presented based on the insertion depth and gives the result to the control unit 610. The control unit 610 determines the torque output of the force sense presentation units 3 based on the sense of force to be presented and drives the force sense presentation units 3 by causing the piezoelectric elements 520 to vibrate them. At this time, a position sensor which measures the relative position between the fixed unit 2 and the force sense presentation units 3 may feed back the position information to the control unit 610 or acquire the position and orientation information of the force sense presentation device 1 and feed back it to the interference determination unit 630, although the sensor is not illustrated. The controlled variable of the control unit 610 may be either a driving amount, driving torque, or driving force.

Figure 9:
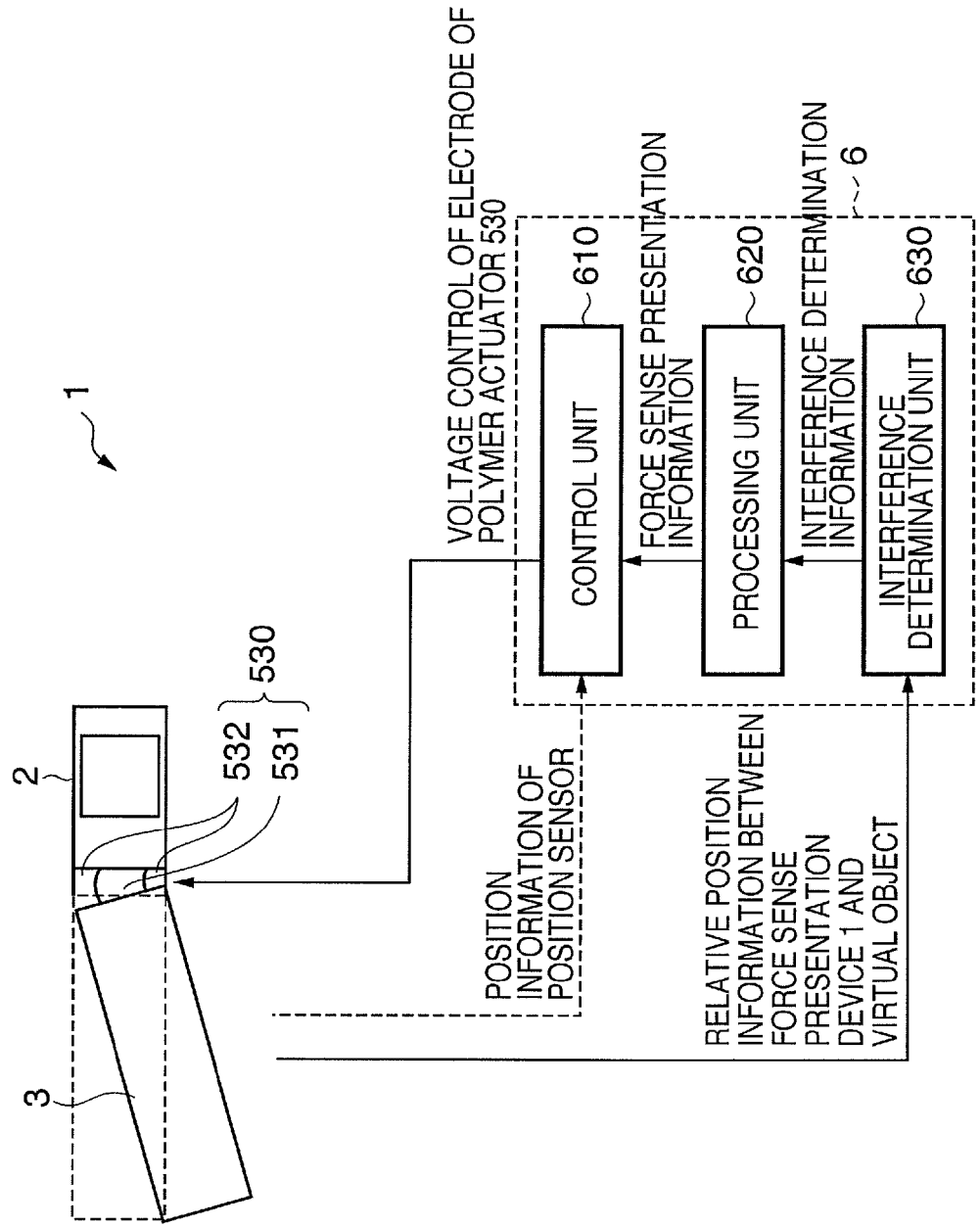
FIG. 9 is a view schematically showing a force sense presentation device implemented by using a polymer actuator.

A polymer actuator may be used as the actuator. Examples of the polymer actuator are an EAP (Electro Active Polymer) which creates distortion by electrical stimulation and an ionic polymer actuator represented by ICPF. This will be described with reference to FIG. 9. FIG. 9 is a view schematically showing the force sense presentation device 1 implemented by using a polymer actuator. FIG. 9 shows only part of the force sense presentation device 1 on the left side of the fixed unit 2 in FIG. 5, for the descriptive convenience.

For example, an ionic polymer actuator 530 sandwiches an ion-exchange resin 531 between electrodes 532. Ions in the ion-exchange resin 531 are moved by controlling the voltage between the electrodes 532 so that a swelling difference is generated in the ion-exchange resin 531 to drive the force sense presentation device. When the ionic polymer actuator 530 is arranged between the fixed unit 2 and the force sense presentation unit 3, the ionic polymer actuator 530 can be used as the actuator 5 which also serves as the joint 4.

The interference determination unit 630 executes interference determination and insertion depth calculation based on the relative position information between a virtual object and the force sense presentation device 1 or virtual machine tool and sends the information to the processing unit 620. The processing unit 620 calculates the sense of force to be presented based on the insertion depth and gives the result to the control unit 610. The control unit 610 determines voltage control of the ionic polymer actuator 530 based on the sense of force to be presented and drives the force sense presentation units 3. At this time, a position sensor which measures the relative position between the fixed unit 2 and the force sense presentation units 3 may feed back the position information to the control unit 610 or acquire the position and orientation information of the force sense presentation device 1 and feed back it to the interference determination unit 630, although the sensor is not illustrated. The controlled variable of the control unit 610 may be either a driving amount, driving torque, or driving force.

When a shape memory alloy is used as the actuator 5, an energization heating unit and a cooling unit to drive the shape memory alloy are provided. The control unit 610 controls the energization heating unit and cooling unit based on the force sense presentation information of the processing unit 620.

As described above, use of an actuator such as a multi-degree-of-freedom ultrasonic motor, polymer actuator, or shape memory alloy capable of direct driving enables force sense presentation with high responsiveness. Additionally, no mechanical element components such as a gear need be used. That is, since a delay component such as the backlash or hysteresis characteristic of a mechanical element component can be removed, a force sense can be presented with high responsiveness. In particular, the multi-degree-of-freedom ultrasonic motor is capable of abrupt acceleration/deceleration driving and is therefore excellent in presenting the sense of "clunk" at the time of interference. When a hydraulic/pneumatic actuator, solenoid, or motor and a mechanical element component are used, actuators equal in number to the degrees of freedom to be presented are necessary. However, when the multi-degree-of-freedom ultrasonic motor or polymer actuator is used, a force sense can be presented in the directions of multiple degrees of freedom by using only one actuator. Hence, the force sense presentation device 1 can be made compact or simple.

(Mixed Reality System)

Figure 10:
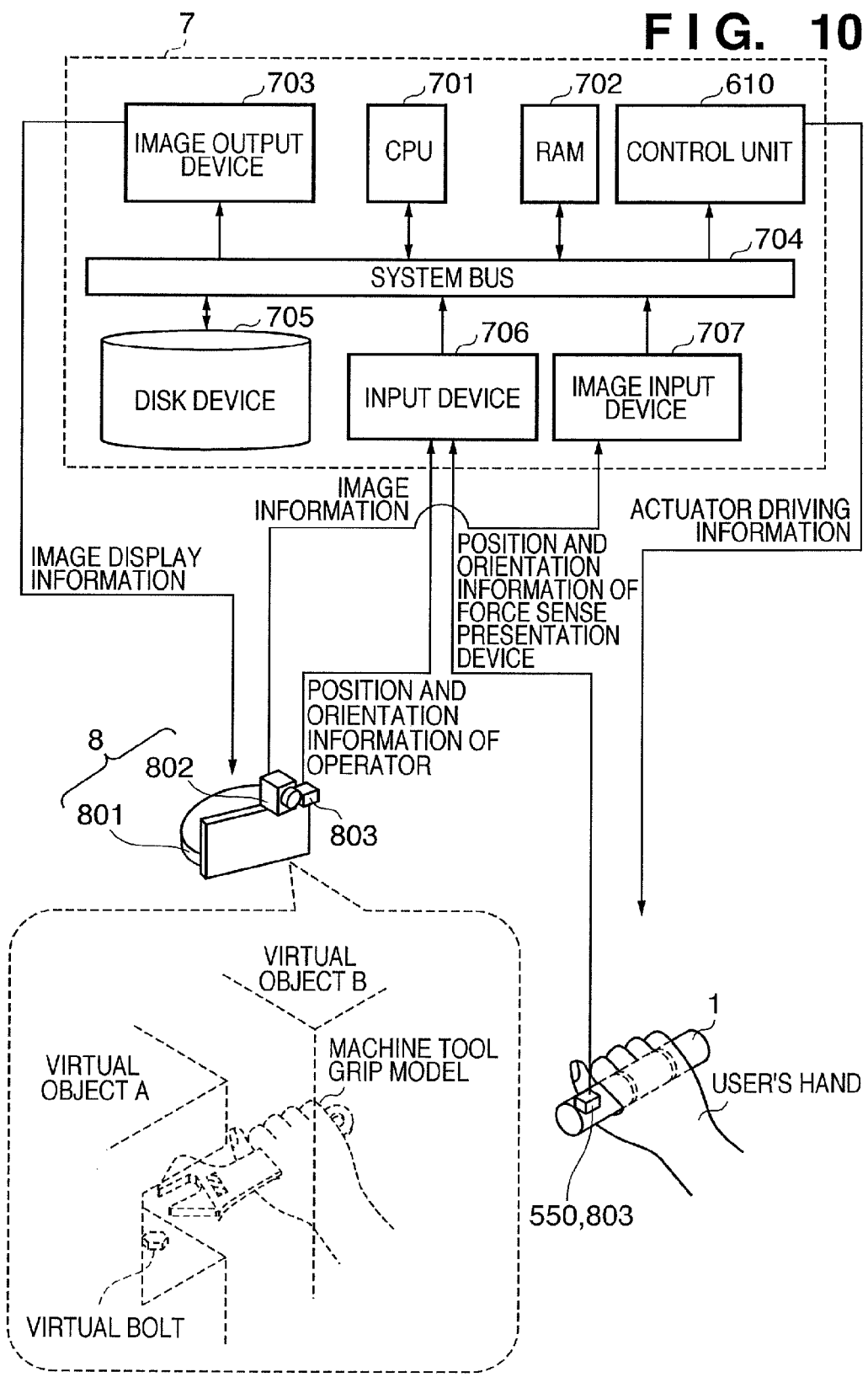
FIG. 10 is a block diagram schematically showing the configuration of a mixed reality system.

The force sense presentation device 1 and the control method thereof have been described above. The configuration of a mixed reality system incorporating the force sense presentation device 1 will be described next with reference to FIG. 10. FIG. 10 is a block diagram schematically showing the configuration of a mixed reality system.

Referring to FIG. 10, an arithmetic processing unit 7 is formed from a calculator such as a computer. The arithmetic processing unit 7 includes a CPU 701, RAM 702, image output device 703, system bus 704, disk device 705, input device 706, and image input device 707.

The CPU 701 has the interference determination unit 630 (not shown) for force sense presentation, the processing unit 620 (not shown) to calculate a sense of force, and a function of controlling image processing. The CPU 701 connected to the system bus 704 can communicate with the control unit 610 to control the actuator for force sense presentation, and also with the RAM 702, image output device 703, disk device 705, input device 706, and image input device 707.

The control unit 610 for force sense presentation is a functional element to transmit the driving information of the actuator of the force sense presentation device 1. Information from the interference determination unit 630 (not shown) and processing unit 620 (not shown) executed on the CPU 701 is transmitted to the control unit 610 via the system bus 704.

The RAM 702 is implemented by a main storage device such as a memory. The RAM 702 temporarily holds, via the system bus 704, the program codes of an interference determination program, force sense calculation program, and image processing program, the control information of the programs, and real image data input from the image input device 707. The RAM 702 also temporarily holds various kinds of data, including virtual space data such as CG models and layout information, sensor measurement values, and sensor calibration data. The virtual space data includes virtual object models, machine tool grip models, and virtual index CG models. Position and orientation information laid out in virtual space is also included in the virtual space data.

The image output device 703 is implemented by a device such as a graphics card. Generally, the image output device 703 holds a graphics memory (not shown). Image information generated by a program executed on the CPU 701 is written in the graphics memory held by the image output device 703 via the system bus 704. The image output device 703 converts the image information written in the graphics memory into an appropriate image signal and sends it to a display device 801. The graphics memory need not always be held by the image output device 703. The RAM 702 may implement the function of the graphics memory.

The system bus 704 serves as a communication path which connects to the devices included in the arithmetic processing unit 7 and enables them to communicate with each other.

The disk device 705 is implemented by an auxiliary storage device such as a hard disk or ROM. The disk device 705 stores program codes for force sense rendering, the program codes of the image processing program, control information of each program, virtual space data, sensor calibration data, virtual object models, and machine tool grip models. The program codes for force sense rendering include, for example, the interference determination program and force sense calculation program.

The input device 706 is implemented by various kinds of interface devices. The input device 706 receives, as data, signals from an external device connected to the arithmetic processing unit 7 and writes the data in the RAM 702 via the system bus 704. The input device 706 is also implemented by a device such as a keyboard or a mouse and receives operation inputs from the user (operator) of this device.

The image input device 707 is implemented by a device such as a capture card. The image input device 707 receives a real image sent from an image sensing device 802 and writes the image data in the RAM 702 via the system bus 704. When the display device 801 is an optical see-through display device, the image input device 707 need not be provided.

The control unit 610 for force sense presentation can be either incorporated in the force sense presentation device 1 itself, as shown in FIGS. 6 to 9, or implemented by the arithmetic processing unit 7 generally provided outside the force sense presentation device 1, as shown in FIG. 10.

When the force sense presentation device 1 incorporates the control unit 610, the arithmetic processing unit 7 sends, to the force sense presentation device 1, information necessary for controlling the drive of the actuator such as relative position information between the force sense presentation device 1 and a virtual object and information representing the presence/absence of interference. The control unit 610 incorporated in the force sense presentation device 1 controls to calculate actuator driving information based on the received information, to drive the actuator based on the calculated driving information, and to present a sense of force. On the other hand, if the control unit 610 is implemented by the arithmetic processing unit 7, the arithmetic processing unit 7 sends driving information calculated by the control unit 610 to the force sense presentation device 1. The force sense presentation device 1 controls the drive of the actuator based on the received driving information. This also applies to arrangements and embodiments to be described later.

In the mixed reality system, the force sense presentation device 1 and arithmetic processing unit 7 communicate with each other. This communication can be implemented by a wired communication interface such as a USB (Universal Serial Bus) or a wireless communication interface such as wireless LAN or WUSB (Wireless USB). However, the arithmetic processing unit 7 may be incorporated in the force sense presentation device 1. That is, the force sense presentation device 1 may include the constituent elements of the arithmetic processing unit 7. This also applies to arrangements and embodiments to be described later.

A head mounted unit 8 is implemented by, for example, a video see-through HMD which the user of the device wears on the head to experience the system of the embodiment. The head mounted unit 88 includes the display device 801, image sensing device 802, and position and orientation sensor 803. In this embodiment, the user is assumed to wear the device of the head mounted unit 8 on the head. However, the user need not always wear the head mounted unit 8 if he/she can experience mixed reality.

The display device 801 is implemented by the display provided on the video see-through HMD. The display device 801 is used to display an image signal sent from the image output device 703 and present a mixed reality image to the user of the device. The display device 801 is included in the head mounted unit 8, though the user need not always wear the display device 801. If the user can confirm the image, for example, a tabletop or handheld display device may be used as the display device 801.

The image sensing device 802 is implemented by at least one image sensing device such as a CCD camera. The image sensing device 802 is used to sense a real image of the physical world seen from the viewpoint of the user of the device. For this purpose, the user preferably wears the image sensing device 802 on a part of the head close to the viewpoint position. However, the present invention is not limited to this if an image seen from the viewpoint of the user can be acquired. The optical axis of the image sensing device 802 may be made to coincide with the central axis of the display device 801 by using a half mirror or a prism. A real image (including an analog signal or a digital signal of IEEE1394 standard) sensed by the image sensing device 802 is sent to the image input device 707 as an image signal. If an optical see-through display device is used as the display device 801, the user of the device directly observes the physical world through the display device 801. Hence, the image sensing device 802 need not be provided.

The position and orientation sensor 803 measures the viewpoint (position and orientation sensor 803) of the user who uses the device and the position and orientation of the force sense presentation device 1 and sends the measured data to the input device 706 of the arithmetic processing unit 7. The position and orientation sensor 803 is implemented by a position and orientation measurement device including, for example, a magnetic sensor, or an acceleration sensor and gyro. The position and orientation sensor 803 can also serve as a sensor to measure the angular velocity (speed) of rotation of the force sense presentation device 1.

The user uses the force sense presentation device 1 by gripping it. A positioning sensor 550 in the force sense presentation device 1 is implemented by, for example, an encoder. The positioning sensor 550 measures the relative position and orientation between the fixed unit 2 and the force sense presentation units 3 and sends the measured position and orientation information to the input device 706 of the arithmetic processing unit 7.

Figure 11A:
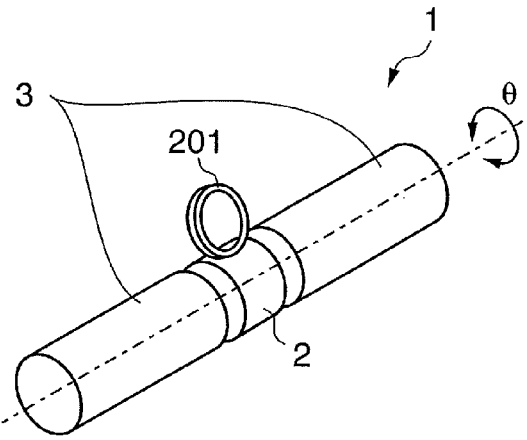
FIGS. 11A to 11C are views schematically showing a method of obtaining the position reference of the force sense presentation device.
Figure 11B:
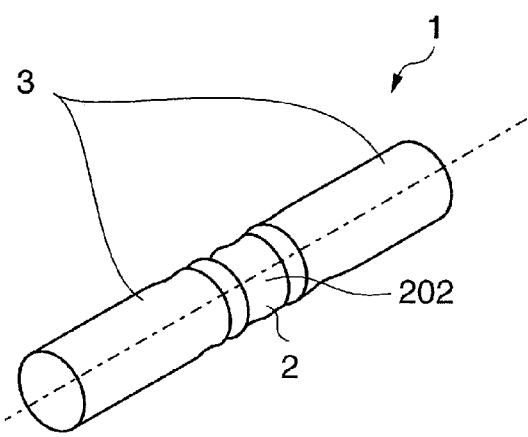
Figure 11C:
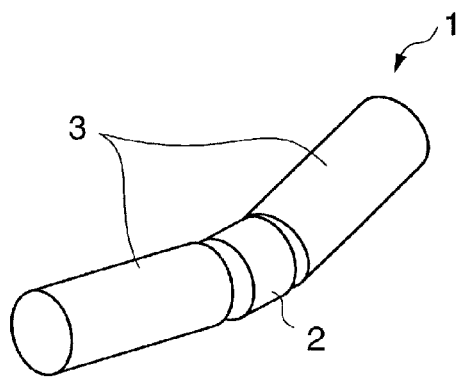

The system described above with reference to FIG. 10 can measure the position of the force sense presentation device 1 in the real space but not the position about the longitudinal axis ($\theta$ in FIG. 11A) of the force sense presentation device 1. Since the $\theta$-direction of gripping of the force sense presentation device 1 is indefinite, the control unit 610 cannot determine the driving direction of the actuator. A method of determining the position reference of the force sense presentation device 1 in the system configuration will be described with reference to FIGS. 11A to 11C. FIGS. 11A to 11C are views schematically showing a method of obtaining the position reference of the force sense presentation device 1.

FIG. 11A schematically shows a method of providing a ring 201 on the fixed unit 2 and using the finger put in it as a reference. When the user inserts a finger in the ring 201 and grips the force sense presentation device 1, the relative positional relationship between the force sense presentation device 1 and the gripping hand can be restricted. That is, the driving direction of the force sense presentation units 3 relative to the fixed unit 2 is determined based on the ring 201 so that the force sense presentation direction in the real space can be determined. In FIG. 10, the position and orientation sensor 803 mounted on the force sense presentation device 1 is provided on the user's hand. The reference is set on the force sense presentation device 1 so that the position of the force sense presentation device 1 can match the gripping hand. It is possible to measure the position and orientation of the force sense presentation device 1 in the real space by measuring the hand position.

The arrangement for providing a reference on the force sense presentation device 1 and matching its position with the gripping hand can be implemented without using the ring 201. For example, the surface of the fixed unit 2 or force sense presentation unit 3 is formed into a three-dimensional pattern 202 conforming to fingers, as shown in FIG. 11B, so that the user can grip the device by fitting the fingers to the pattern. Alternatively, a mark (guide) is put on the surface of the fixed unit 2 or force sense presentation unit 3 so that the user can grip the device with the mark in contact with the bases of, for example, the index finger and middle finger.

Alternatively, the force sense presentation device 1 is initially driven by the actuator before grip, as shown in FIG. 11C. The user grips the force sense presentation device 1 while making, for example, one of the force sense presentation units 3 contact the bases of the thumb and index finger and the other contact with the base of the little finger.

Figure 12A:
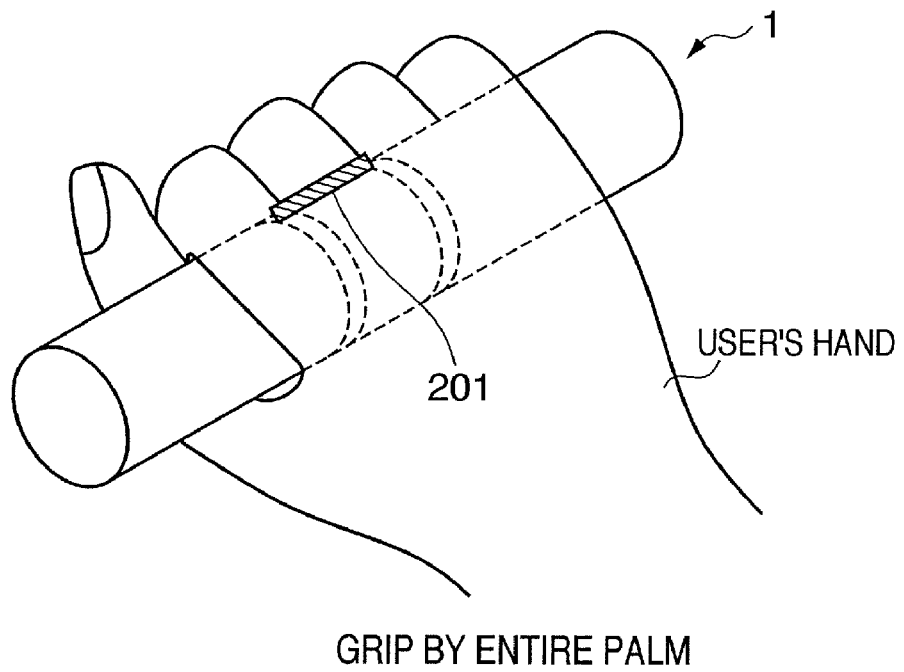
FIGS. 12A and 12B are views schematically showing the grip styles of the force sense presentation device.
Figure 12B:
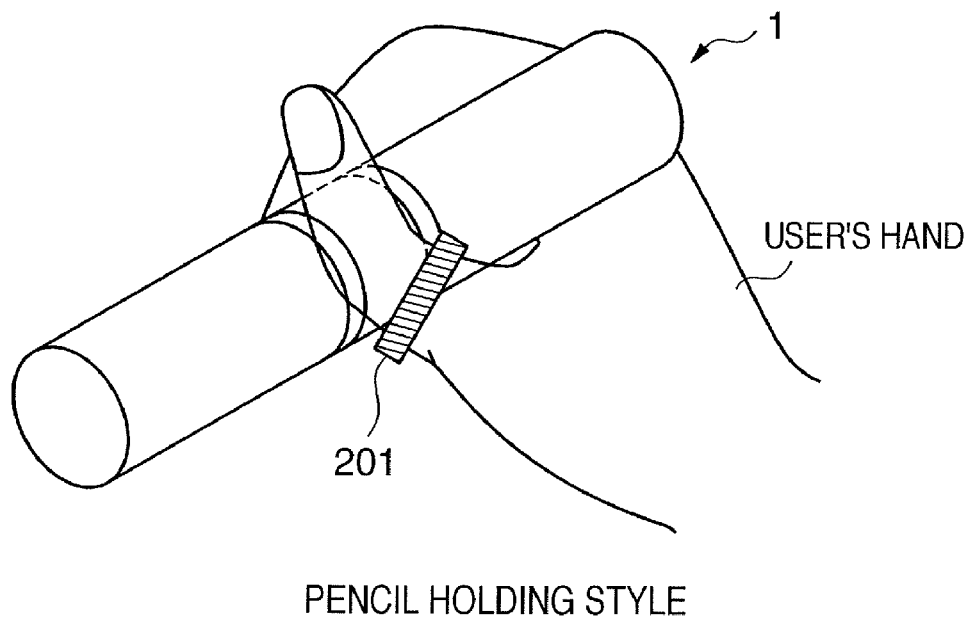

The force sense presentation device 1 and a system configuration using it have been described above. The above-described figures show the force sense presentation device 1 grabbed by the user. However, the present invention is not limited to this. The present invention is applicable not only to the system that makes the user grab the force sense presentation device 1, as shown in FIG. 12A, but also to a system that makes the user hold the device in a pencil holding style, as shown in FIG. 12B. FIGS. 12A and 12B are views schematically showing the grip styles of the force sense presentation device.

As described above, the force sense presentation device according to this embodiment presents a force sense by operating the force sense presentation units relative to the fixed unit. This widens the manipulation range as compared to the prior art and eliminates the cumbersomeness in attachment/detachment and the sense of incongruity in mounting. It is also possible to present a grip-type force sense presentation device capable of continuously presenting a strong force sense.

Arrangement Example 1

Specific examples of the above arrangement will be described in detail. In Arrangement Example 1, machine tools to be virtually handled include a monkey wrench, wrench, hexagon wrench, and ratchet wrench, which are grabbed by the user. In the following description, a monkey wrench will be exemplified as a representative machine tool.

Figure 19A:
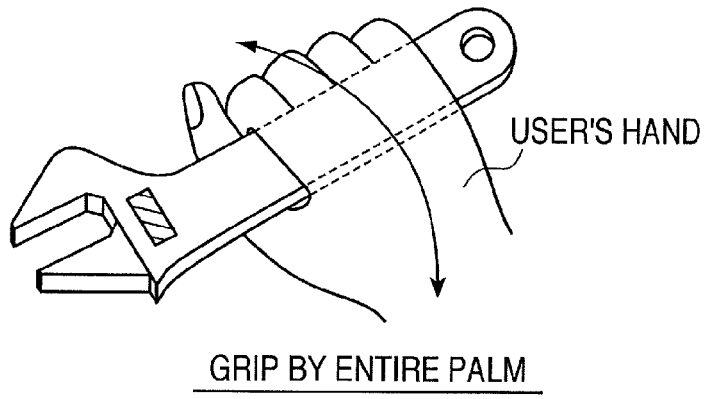
FIGS. 19A to 19C are schematic views showing user's styles of gripping a machine tool by hand.
Figure 19B:
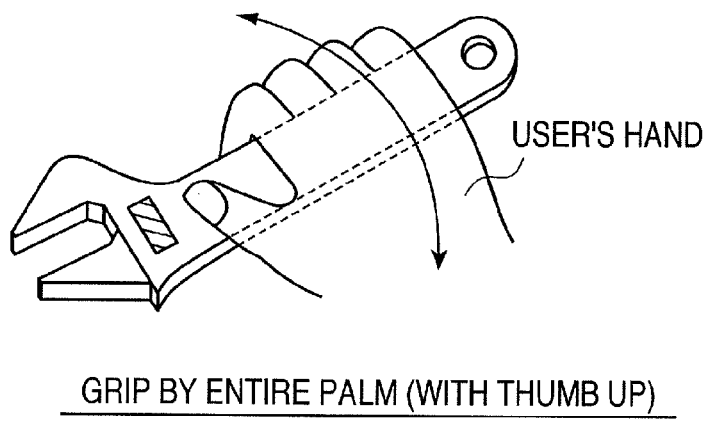
Figure 19C:
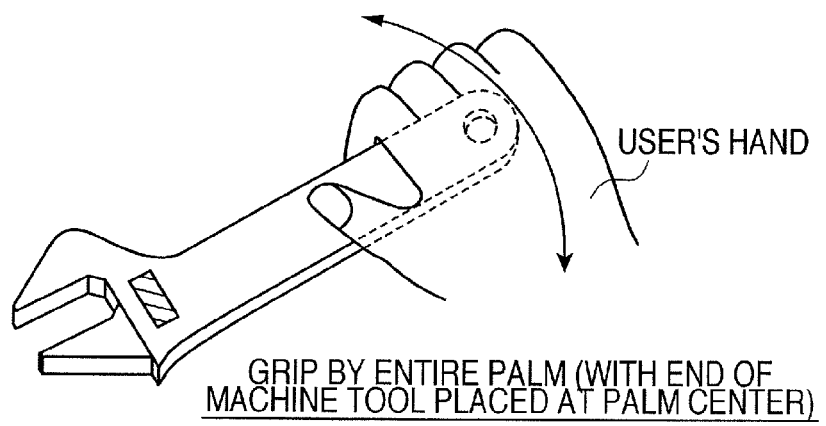

Gripping conditions such as a force applied to a hand in use of a machine tool will be described with reference to FIGS. 19A to 19C. FIGS. 19A to 19C are schematic views showing user's styles of gripping a machine tool by hand.

FIG. 19A shows a grip style of grabbing a monkey wrench by the entire palm. FIG. 19B shows a grip style of grabbing the monkey wrench by the entire palm, as shown in FIG. 19A, with the thumb up. FIG. 19C shows a grip style of placing the end of the monkey wrench at the center of the palm. When the user actually tightens a screw member such as a hexagon head bolt or a nut by using a monkey wrench or a wrench held by the right hand (in the direction of the wedge-shaped arrows in FIGS. 19A to 19C), or when the user tightens a hexagon socket head cap screw by using a hexagon wrench, the side of the bases of the little finger and index finger of the palm receives a large force. To undo them (in the direction of the triangular arrows in FIGS. 19A to 19C), the base of the thumb of the palm receives a large force. If the user uses the left hand, conversely, the base of the thumb of the palm receives a large force in tightening while the side of the bases of the little finger and index finger of the palm receives a large force in undoing.

In tightening and undoing, the force is applied to different positions of the palm. The position also changes between the right-hand operation and the left-hand operation. In addition, the force strength changes depending on the strength of the tightening force, that is, whether the user tightens the screw with a strong or weak force, and also on the initial tightened state before tightening.

Arrangement Example 1 makes it possible to present a more real sense of operation by changing the force distribution on the palm, the magnitude of the force, and the difference between the left and right hands in accordance with the virtual state. The presentation method also changes depending on the type and holding style of the machine tool, as will be described later. Hence, when appropriate driving and presentation methods are used in accordance with the operation state or grip state, the device can cope with machine tools in a wide range and their use forms. The arrangement of such a presentation device and driving and presentation methods thereof will be described below.

Figure 20A:
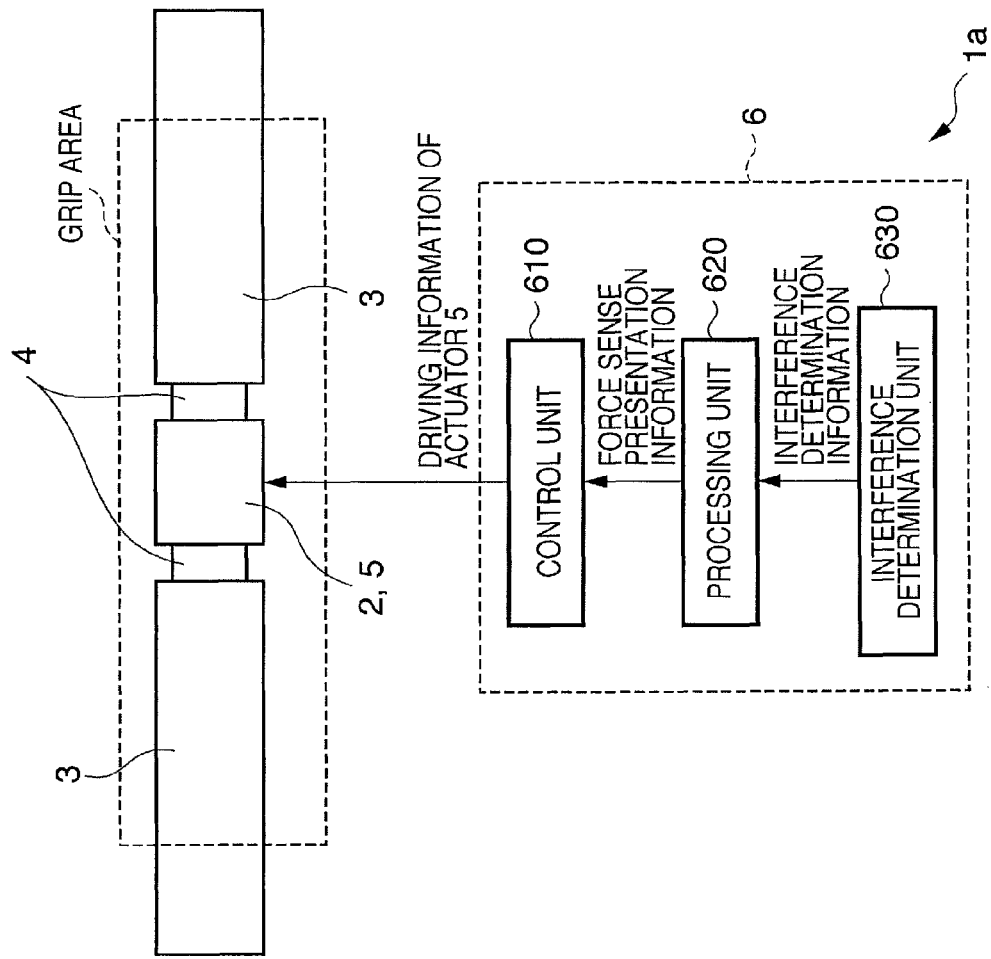
FIGS. 20A and 20B are schematic views showing the arrangement of a force sense presentation device designed in accordance with the grip style.
Figure 20B:
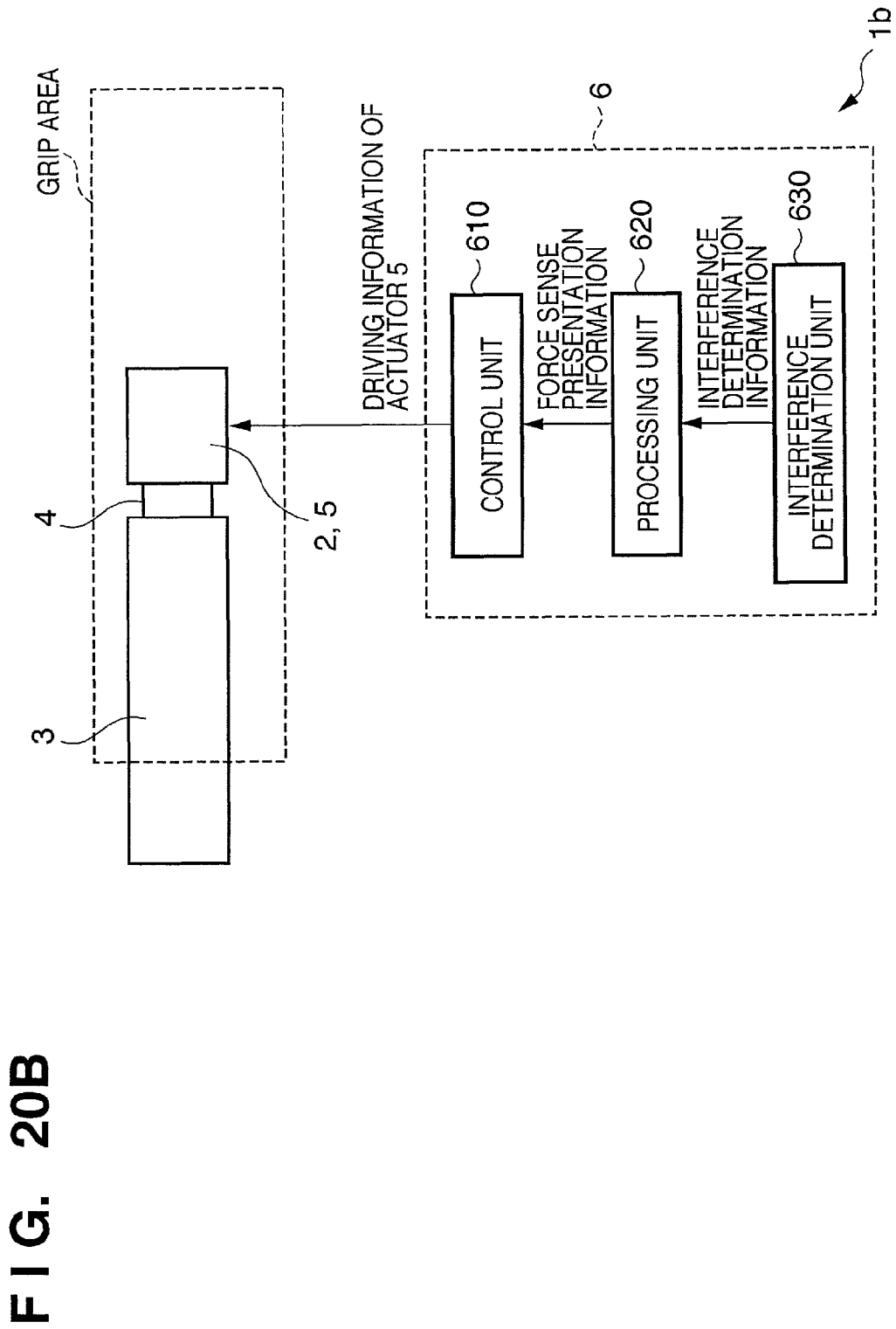

A force sense presentation device which presents a force sense in tightening or undoing a bolt in the machine tool grip styles shown in FIGS. 19A to 19C will be described next with reference to FIGS. 20A and 20B. FIGS. 20A and 20B are schematic views showing the arrangement of a force sense presentation device 1 designed in accordance with the grip style.

Referring to FIGS. 20A and 20B, the force sense presentation device 1 simulates the above-described machine tool. A fixed unit 2 serves as a reference when the operator grips the device by hand. Force sense presentation units 3 present a sense of force to the palm based on the fixed unit 2. Joints 4 are provided between the fixed unit 2 and the force sense presentation units 3 to guide the driving directions of the force sense presentation units 3. An actuator 5 drives the force sense presentation units 3 relative to the fixed unit 2. At least one of the fixed unit 2 and force sense presentation units 3 preferably incorporates the actuator 5. The actuator 5 is effective even when it is not incorporated in the fixed unit 2 or force sense presentation unit 3, as described above. More specifically, for example, the actuator 5 may be provided outside the fixed unit 2 or force sense presentation unit 3, and the driving force of the actuator 5 may be transmitted via mechanical elements such as a link mechanism and gears to drive the force sense presentation units 3. Reference numeral 6 denotes a force sense rendering unit. The force sense rendering unit 6 includes a control unit 610 to drive the actuator 5, a processing unit 620 which calculates force sense presentation information such as a driving force, torque, driving speed, and driving amount, and an interference determination unit 630 which determines interference and calculates the interference depth. The interference determination unit of Arrangement Example 1 determines the interference between a virtual bolt (virtual nut) and a virtual machine tool simulated by the force sense presentation device 1.

The user grips a position of the force sense presentation device 1 indicated by the dotted line, that is, the joint 4 and at least a partial area of the force sense presentation units 3 relative to the fixed unit 2. In a force sense presentation device 1a shown in FIG. 20A, the two force sense presentation units 3 sandwich the fixed unit 2. On the other hand, a force sense presentation device 1b shown in FIG. 20B has one force sense presentation unit 3 corresponding to the fixed unit 2.

Referring to FIGS. 20A and 20B, the joint 4 of the force sense presentation device 1 uses at least one of a guide, bearing, hinge, and link mechanism. The actuator 5 uses at least one of a hydraulic/pneumatic actuator, solenoid, DC motor, AC motor, stepping motor, linear motor, electrostatic motor, ultrasonic motor, polymer actuator, and shape memory alloy. The actuator has been described above in detail. The driving axis including the joints 4 and actuator 5 requires at least an axis in an oscillation direction with respect to the longitudinal axis of the force sense presentation device 1 and/or an axis in a direction perpendicular to the longitudinal axis of the force sense presentation device 1.

To define the reference of the driving direction of the force sense presentation units 3, as described above, the fixed unit 2 can have a ring, a three-dimensional pattern for easy grip of the gripping region, or a mark serving as a guide for grip, though none are illustrated in FIGS. 20A and 20B. Alternatively, the force sense presentation units 3 may be driven in advance to the position of the reference for grip.

Figure 21A:
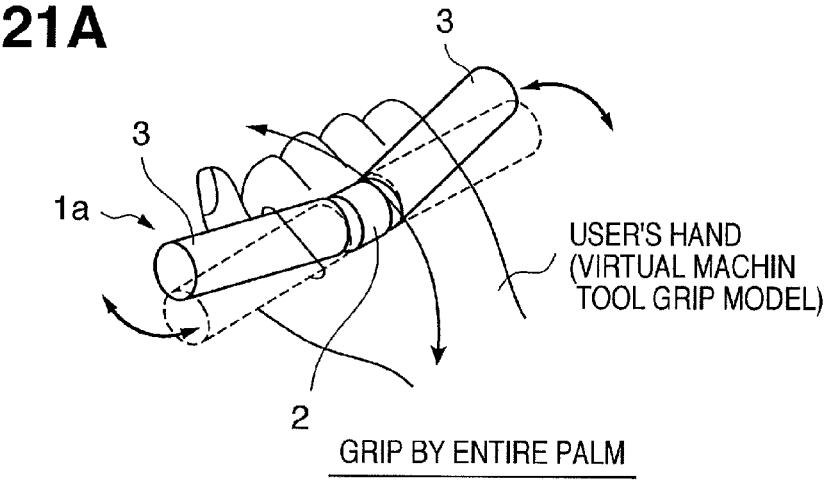
FIGS. 21A to 21C are schematic views showing force sense presentation states corresponding to the respective grip styles.
Figure 21B:
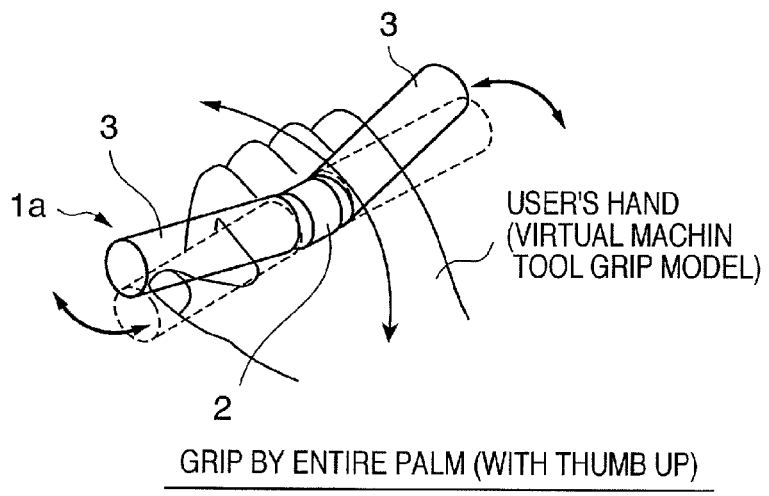
Figure 21C:
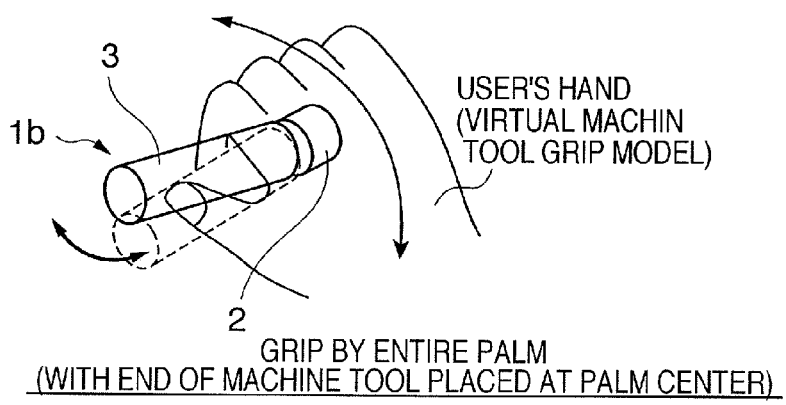

Force sense presentation methods using the force sense presentation devices 1 shown in FIGS. 20A and 20B in tightening or undoing a bolt by the machine tool grip styles shown in FIGS. 19A to 19C will be described next with reference to FIGS. 21A to 21C. FIGS. 21A to 21C are schematic views showing force sense presentation states corresponding to the respective grip styles. The force sense rendering unit 6 executes control and processes for force sense presentation. In FIGS. 21A to 21C, the driving axis of the force sense presentation device 1 is set to the axis in the oscillation direction with respect to the longitudinal axis of the force sense presentation device. However, the present invention is not limited to this. The axis may be the axis in the direction perpendicular to the longitudinal direction of the force sense presentation device 1.

FIG. 21A shows a grip style of grabbing a machine tool by the palm. FIG. 21B shows a grip style of grabbing the machine tool by the palm with the thumb up. Both styles use the force sense presentation device 1a shown in FIG. 20A. In tightening the bolt by the right hand, the force sense presentation units 3 are driven in a direction reverse to the moving direction of the force sense presentation device 1a (in the direction of the wedge-shaped arrows). Even in undoing the bolt, the force sense presentation units 3 are driven in a direction reverse to the moving direction of the force sense presentation device 1a (in the direction of the triangular arrows). More specifically, in tightening the bolt, the two force sense presentation units 3 are driven to at least one of the little finger base side and the index finger base side. In undoing the bolt, the force sense presentation unit 3 on the thumb side is driven to the thumb base side.

FIG. 21C shows a grip style of placing the end of the machine tool at the center of the palm. In this case, the force sense presentation device 1b shown in FIG. 20B is used. In tightening the bolt by the right hand, the force sense presentation unit 3 is driven in a direction reverse to the moving direction of the force sense presentation device 1b (in the direction of the wedge-shaped arrows). Even in undoing the bolt, the force sense presentation unit 3 is driven in a direction reverse to the moving direction of the force sense presentation device 1b (in the direction of the triangular arrows). More specifically, in tightening the bolt, the force sense presentation unit 3 is driven to the index finger base side. In undoing the bolt, the force sense presentation unit 3 is driven to the thumb base side.

The driving direction of the force sense presentation unit 3 in tightening or undoing the bolt by the right hand has been described above. Even in the left-hand operation, the force sense presentation unit 3 is driven in a direction reverse to the moving direction of the force sense presentation device 1. More specifically, in tightening the bolt, the force sense presentation unit 3 on the thumb side is driven to the thumb base side. In undoing the bolt, the force sense presentation units 3 are driven to at least one of the little finger base side and the index finger base side. With this operation, the user can perceive the torque received in tightening or undoing the bolt.

The driving speed of the force sense presentation units 3 is synchronized with the angular velocity (speed) of the hand that turns the force sense presentation device 1. Preferably, in, for example, FIG. 21A, the force sense presentation unit 3 (left side) on the rotation center side and the force sense presentation unit 3 (right side) outside the rotation can be driven in synchronism with the angular velocity (speed) of the hand. On the other hand, the driving amount of the outer force sense presentation unit 3 (right side) can be adjusted to be larger than that of the inner force sense presentation unit 3 (left side). At this time, driving the force sense presentation units 3 in synchronism with the angular velocity (speed) of the hand turning the force sense presentation device 1 does not always mean driving them at the same angular velocity (speed). For example, the respective force sense presentation units 3 may be driven at angular velocities (speeds) obtained by multiplying the angular velocity (speed) of the hand turning the force sense presentation device 1 by different constants. Alternatively, at least one of the force sense presentation units 3 may be driven. This operation control can further improve the reality of the torque virtually perceived by the user. The angular velocity (speed) of the hand turning the force sense presentation device 1 can be measured by processing information from an acceleration sensor or a gyro or processing an image sensed by a camera.

A system configuration that incorporates the above-described force sense presentation device and its force sense presentation method in mixed reality (MR) is shown in FIG. 10. A description of FIG. 10 has already been given above and will not be repeated.

The force sense presentation device 1 and its force sense presentation method explained in Arrangement Example 1 allow force sense presentation in a wide manipulation range. The force sense presentation device eliminates the cumbersomeness in attachment/detachment and the sense of incongruity in operation. The device can also be compact and light-weighted. A mixed reality system incorporating the device can present a sense of force in actually tightening or undoing a bolt or a nut using a machine tool. Combined with image display, the reality increases. This also increases the efficiency in verifying the operability in assembly or maintenance by inserting a jig or tool in a virtually displayed product. Even when the arrangement is applied not to mixed reality but to virtual reality (VR), the same effect can be obtained.

Arrangement Example 2

In Arrangement Example 1, an arrangement that synchronizes the driving speed of the force sense presentation units 3 with the angular velocity (speed) of the hand turning the force sense presentation device 1 and adjusting the driving amounts of the two force sense presentation units 3 has been described. However, a more real experience can be provided to the user by changing the driving amount and driving angular velocity (speed) of each force sense presentation unit 3 depending on whether the hand turning the force sense presentation device 1 is the right hand or left hand. In Arrangement Example 2, the configuration of a system that determines which hand is gripping a force sense presentation device 1, the right hand or left hand, and controls force sense presentation based on the determination result, and the determination method of the system will be described.

Which hand is gripping the force sense presentation device 1, the right hand or left hand, can be determined by processing an image from an image sensing device 802 shown in FIG. 10 by, for example, template matching. Alternatively, the gripping hand may be input from a user interface (not shown in FIG. 10) to an input device 706. When the hand gripping the force sense presentation device 1 is determined in this way, an image output device 703 in FIG. 10 refers to a machine tool grip model corresponding to the determination in a disk device 705 and displays the machine tool grip model on a display device 801.

An inner force sense presentation unit 3 and outer force sense presentation unit 3 in turning the force sense presentation device 1 can accurately be grasped from the gripping hand and the positional relationship between the machine tool grip model and a virtual bolt or a virtual nut. Hence, the force sense presentation unit 3 on the rotation center side and the force sense presentation unit 3 outside the rotation are driven in synchronism with the angular velocity (speed) of the hand. The driving amount of the outer force sense presentation unit 3 (right side) is adjusted to be larger than that of the inner force sense presentation unit 3 (left side). As described above, Arrangement Example 2 allows determining which hand is gripping the force sense presentation device 1, the right hand or left hand. This makes it possible to more accurately adjust the driving amount and driving angular velocity (speed) of each force sense presentation unit 3 and more accurately present a sense of force.

Arrangement Example 3

In Arrangement Example 1 or 2, a force sense presentation device which presents a sense of force in virtually tightening or undoing a bolt or a nut and a force sense presentation method thereof have been described. In Arrangement Example 3, a force sense presentation method when the user cannot turn a machine tool because there is insufficient space to turn it in virtually tightening or undoing a bolt or a nut will be described.

FIG. 22 is a schematic view showing an arrangement for presenting a force sense when a virtual machine tool interferes with a virtual object. The upper part of FIG. 22 shows a display device 801 which displays an image of virtual bolt tightening using a virtual machine tool. FIG. 22 shows a state wherein the handle portion of the virtual machine tool interferes with a virtual object B so the user cannot turn the virtual machine tool any more. At this time, an interference determination unit 630 determines not only the interference between the virtual machine tool and the virtual bolt (virtual nut) but also the interference between the machine tool grip model and the virtual object, as shown on the lower side of FIG. 22. More specifically, the interference determination unit 630 determines the interference between the virtual object B and the handle portion of the virtual machine tool and calculates the interference depth.

Based on the interference determination information from the interference determination unit 630, a processing unit 620 calculates at least one of pieces of force sense presentation information such as the driving speed, driving force, driving torque, and driving amount of each force sense presentation unit 3. Based on the force sense presentation information calculated by the processing unit 620, a control unit 610 drives an actuator 5 (not shown) to operate the force sense presentation units 3. When the force sense presentation unit 3 to tighten the virtual bolt exists on the left side of the gripping hand while the force sense presentation unit 3 on the right side interferes with the virtual object B, as shown in FIG. 22, the left force sense presentation unit 3 presents a sense of bolt tightening force, and the right force sense presentation unit 3 presents a sense of interference force. To present the sense of bolt tightening force, the driving speed of the force sense presentation unit 3 is synchronized with the angular velocity (speed) of the hand turning the force sense presentation device 1, as described in Arrangement Example 1. To present the sense of interference force, the driving speed of the force sense presentation unit 3 is made higher than that of bolt tightening force sense presentation. The driving speed need not always be synchronous with the angular velocity (speed) of the hand turning the force sense presentation device 1. For example, pulse-like abrupt driving is also possible.

The direction of bolt tightening has been described above. However, the present invention is not limited to this. The above description also applies to the direction of bolt undoing. The sense of interference force may be presented not by controlling the driving speed but by making the driving torque (driving force) of the force sense presentation unit 3 stronger than that of bolt tightening force sense presentation. Alternatively, the sense of interference force may be presented by making the driving amount of the force sense presentation unit 3 larger than that of bolt tightening force sense presentation.

Figure 23:
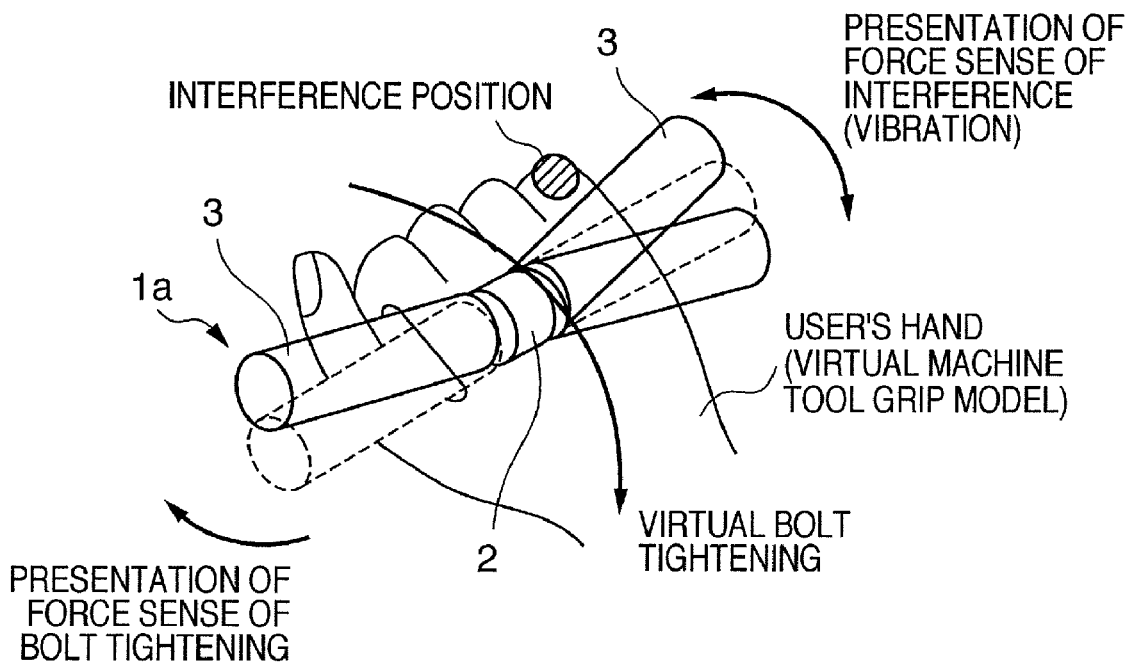
FIG. 23 is a view schematically showing a state wherein a sense of force is presented when a hand interferes a virtual object.

Interference between the hand and a virtual object will be described next. When the hand interferes with a virtual object, no force sense presentation device to present a sense of force (reaction force) is available. The force sense presentation device 1 presents the sense of force alternatively. To distinguish the sense of force of interference with the hand from that presented upon interference with a virtual machine tool, the force sense presentation units 3 are vibrated when the hand interferes with a virtual object. FIG. 23 is a view schematically showing a state wherein a sense of force is presented when the hand interferes with a virtual object. Vibration occurs in the direction of the interference position based on the longitudinal direction of the force sense presentation device 1. The amplitude or/and frequency are controlled in accordance with the interference depth.

In another arrangement, the force sense presentation units 3 are driven along a different driving axis. The driving axis for force sense presentation described so far is the axis in the oscillation direction with respect to the longitudinal axis of the force sense presentation device 1 and/or the axis in a direction perpendicular to the longitudinal direction of the force sense presentation device 1. Hence, the force sense presentation units may be driven about or along the longitudinal axis of the force sense presentation device 1. The driving amount is changed in accordance with the interference depth.

Force sense presentation for hand interference by vibration or force sense presentation for hand interference by different driving axes generates a sense different from that in actual interference. Hence, when the user trains before use to perceive the alternative presentation, the effect of the arrangement of this embodiment can further be enhanced.

As described above, the force sense presentation method described in Arrangement Example 3 allows presentation of a force sense in tightening or undoing a virtual bolt or a virtual nut and a sense of force of interference with another virtual object. This further increases the reality. This also increases the efficiency in verifying the operability in assembly or maintenance by inserting a jig or tool in a virtually displayed product.

Second Embodiment

Figure 13:
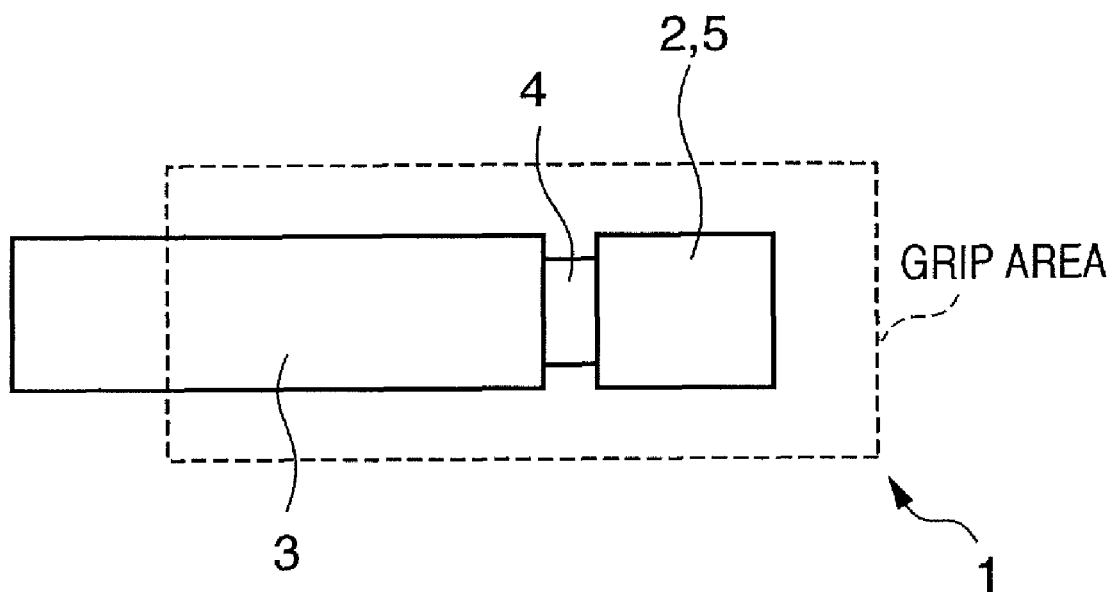
FIG. 13 is a view showing the arrangement of a force sense presentation device.

In the force sense presentation device 1 according to the first embodiment, two force sense presentation units 3 sandwich the fixed unit 2. However, the present invention is not limited to this. The grip style has been described as a style of gripping the device by the entire palm or holding the device like a pencil, and a monkey wrench, wrench, hexagon wrench, and ratchet wrench have been exemplified as the virtual machine tool. In the second embodiment, an arrangement will be described, in which a single force sense presentation unit 3 and a single joint 4 are provided in correspondence with a fixed unit 2. FIG. 13 is a view showing the arrangement of a force sense presentation device 1. The same reference numerals as in the first embodiment denote the same parts in the second embodiment, and a description thereof will not be repeated.

Figure 14A:
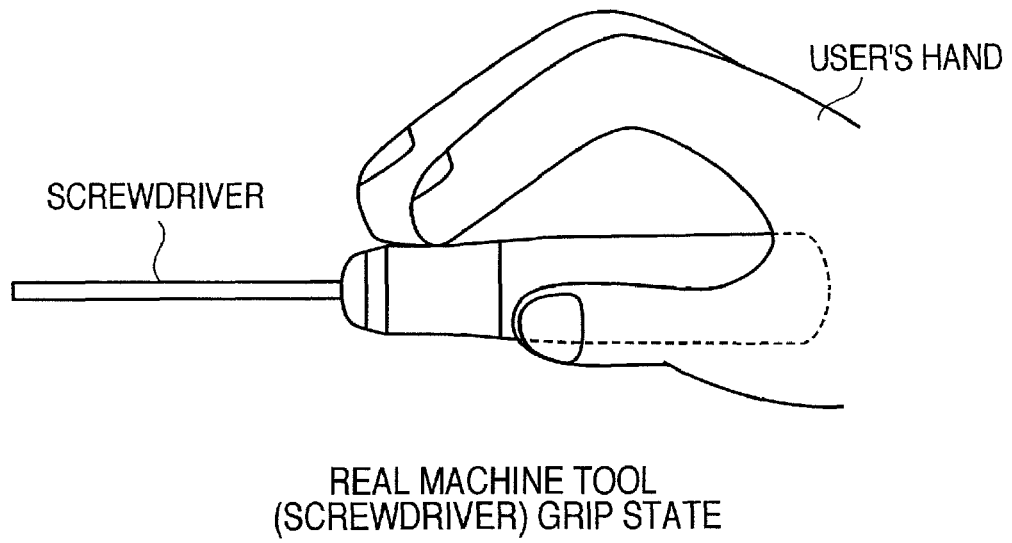
FIGS. 14A and 14B are views showing a screwdriver grip state and a force sense presentation device grip state.
Figure 14B:
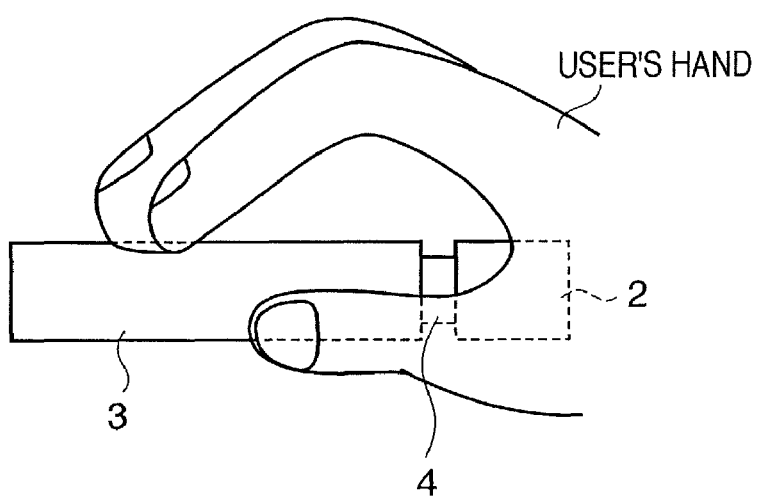

The force sense presentation device 1 is effective when the virtual machine tool is, for example, a screwdriver. FIGS. 14A and 14B are views showing a screwdriver grip state (FIG. 14A) and a state wherein the user grips the force sense presentation device 1 (FIG. 14B). The user grips the screwdriver with its handle pressed against the palm. Similarly, the user wraps the grip area in FIG. 13 with a plurality of fingers while pressing the fixed unit 2 of the force sense presentation device 1 against the palm.

The function of a force sense rendering unit 6 (not shown) and the arrangement applied to a mixed reality system are the same as those described in the first embodiment, and a description thereof will not be repeated here.

As described above, when the force sense presentation unit 3 is provided on only one side of the fixed unit 2, a sense of force in gripping the screwdriver can be presented. When the device is combined with the force sense presentation device 1 described in the first embodiment, a sense of force in a variety of machine tool grip states can be presented.

Arrangement Example 4

Figure 24:
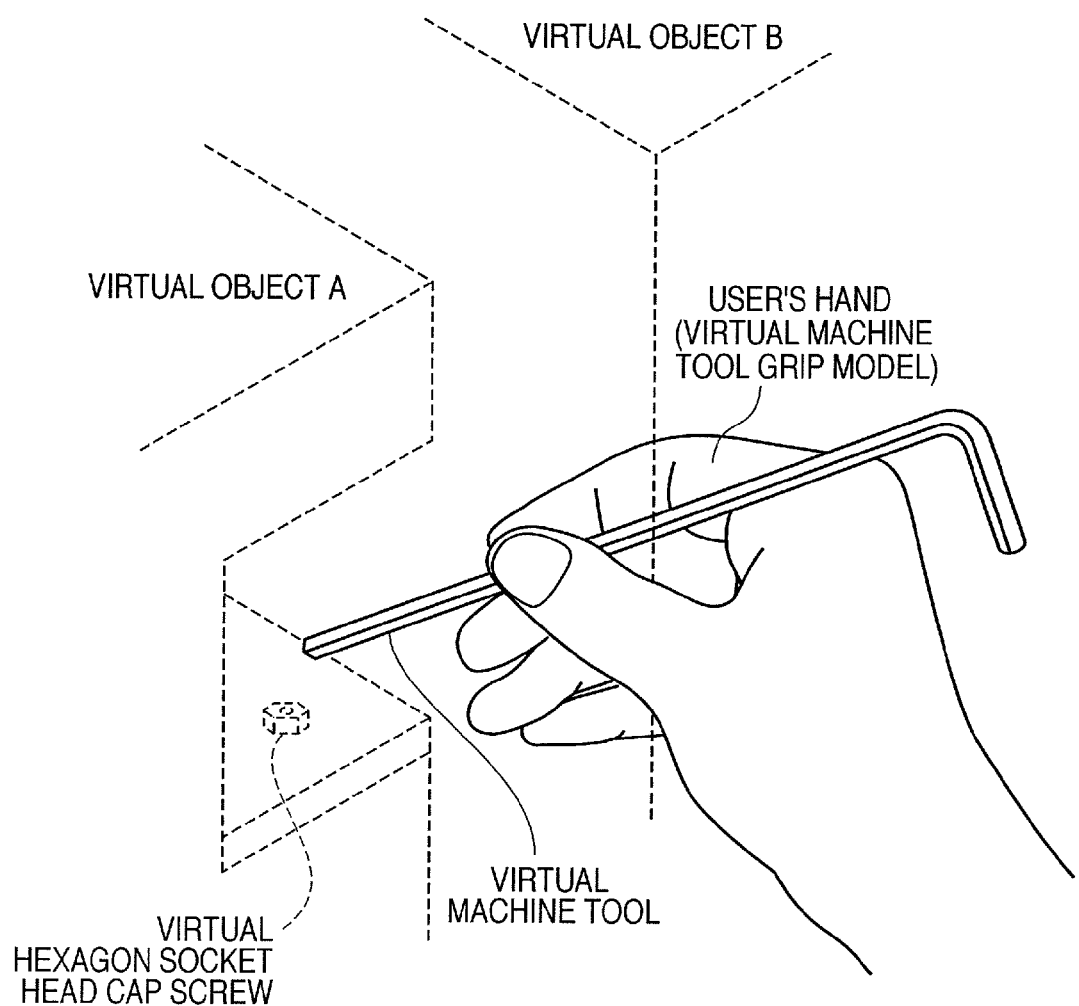
FIG. 24 is a view showing the images of virtual objects displayed by virtual reality or mixed reality and a hand gripping a virtual machine tool.

As described above, in operation verification of an industrial product or device by virtual reality or mixed reality, it is sometimes verified by inserting a jig or tool into a virtually displayed product whether an operation such as assembly or maintenance is possible. This will be described with reference to FIG. 24. FIG. 24 is a view showing the images of virtual objects displayed by virtual reality or mixed reality and a hand (virtual grip model) gripping a virtual machine tool. Arrangement Example 4 assumes that the user tightens or undoes a virtual hexagon socket head cap screw in a virtual object A using a hexagon wrench. In this case, it is difficult to grasp, based only on the displayed virtual object images, the degree of influence of the narrow clearance between the virtual object A and a virtual object B on the operability.

However, when actual bolt tightening is simulated by using a virtual machine tool, the operability can be evaluated and verified. Additionally, a virtual machine tool having a force sense presentation function makes it possible to present the sense of bolt tightening operation and more accurately verify whether a machine tool can enter or whether there is sufficient space to allow bolt tightening. As a main characteristic feature, Arrangement Example 4 enables presentation of a sense of operation in actual use of a machine tool.

In Arrangement Example 4, the machine tool to be virtually handled indicates a machine tool such as a hexagon wrench or a screwdriver which is held by the user in a pencil holding style (FIG. 24). The pencil holding style here indicates a style of gripping a rod-shaped object by the thumb, index finger, and middle finger and turning the rod-shaped object about the longitudinal axis by moving the fingers.

The force sense presentation device according to Arrangement Example 4 has the same arrangement as the force sense presentation device 1b shown in FIG. 20B referred to in Arrangement Example 1. A description of the same components as in Arrangement Example 1 will not be repeated. Only different parts will be described.

Referring to FIGS. 20A and 20B, the driving axis including a joint 4 and an actuator 5 requires at least an axis about the longitudinal axis of a force sense presentation device 1. The device presents a sense of resistance in moving a force sense presentation unit 3 by using the actuator 5. The actuator 5 executes active control (generates a force or a torque by itself). However, the present invention is not limited to this. The actuator 5 may execute passive control (uses a force from the user as a reaction force). In passive control, the control may be controlled by a clutch or a brake or by using an MR fluid or an ER fluid.

To enhance the force of restricting the fixed unit 2 with respect to the hand or palm, the fixed unit 2 may have a ring. The user grips a position of the force sense presentation device 1 indicated by the dotted line, that is, the joint 4 and at least a partial area of the force sense presentation units 3 relative to the fixed unit 2. FIG. 25 is a view showing a state wherein the user grips the force sense presentation device grip 1 of Arrangement Example 4. The user can holds the fixed unit 2 between the base of the thumb and the base of the index finger. If the fixed unit 2 has a ring 201, the user has the ring 201 on, for example, the thumb, as shown in FIG. 25 to further restrict the fixed unit 2 to the hand or palm. Hence, the sense of incongruity generated when the fixed unit 2 moves can be reduced.

There are the following two situations in using the force sense presentation device 1 in a virtual reality or mixed reality environment as shown in FIG. 24. In the first situation, no operation such as bolt tightening is executed. In the second situation, a bolt is tightened or undone. The former situation aims at evaluating whether a machine tool (virtual machine tool) can be inserted up to a predetermined bolt (virtual bolt). The latter situation aims at evaluating whether there is sufficient space to allow manipulation of a machine tool (virtual machine tool). To recognize this, an interference determination unit 630 determines the interference between the virtual machine tool and the virtual bolt. If the tip of the virtual machine tool is not in contact with the virtual bolt, a process can be done assuming that an operation such as bolt tightening should not be executed. If the tip of the virtual machine tool is in contact with the virtual bolt, a process can be done assuming that an operation such as bolt tightening should be executed. If the object (virtual bolt) on which the machine tool acts interferes with the force sense presentation unit 3 of the force sense presentation device 1, a process can be done assuming that an operation such as bolt tightening should be executed.

Figure 26A:
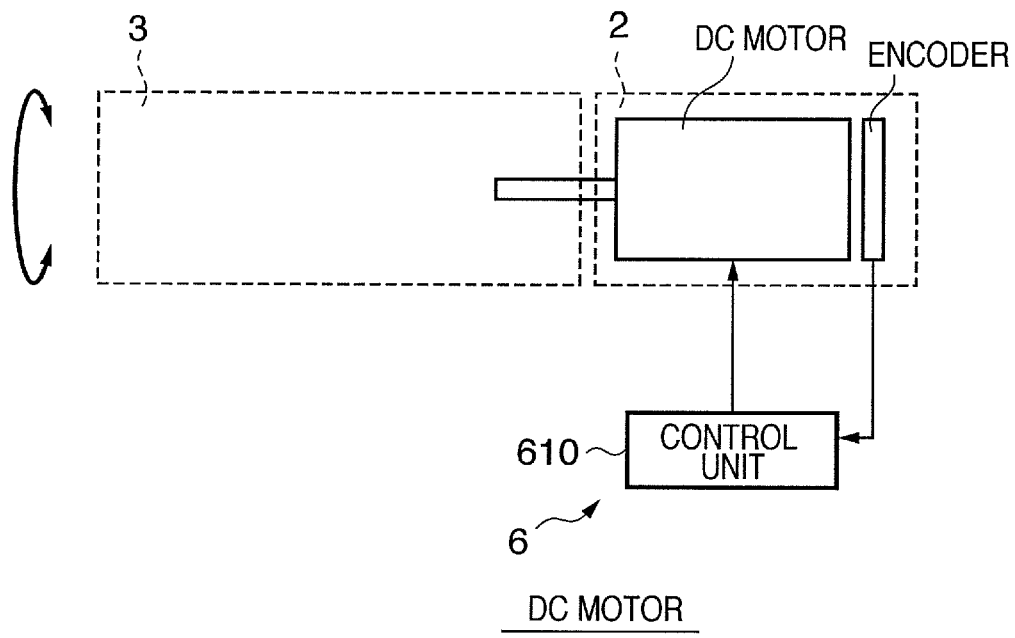
FIGS. 26A and 26B are views schematically showing an active control actuator.
Figure 26B:
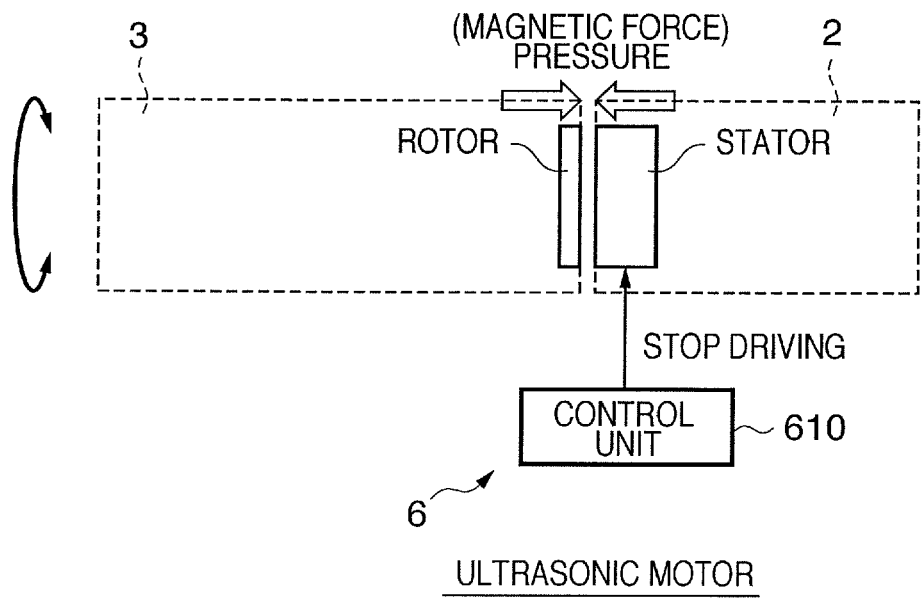
Figure 27A:
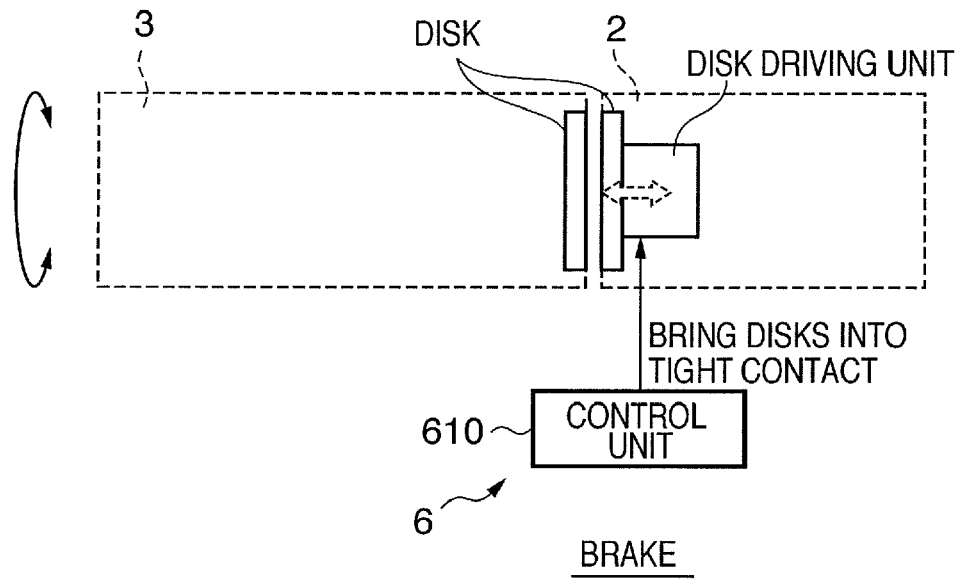
FIGS. 27A and 27B are views schematically showing a passive control actuator.
Figure 27B:
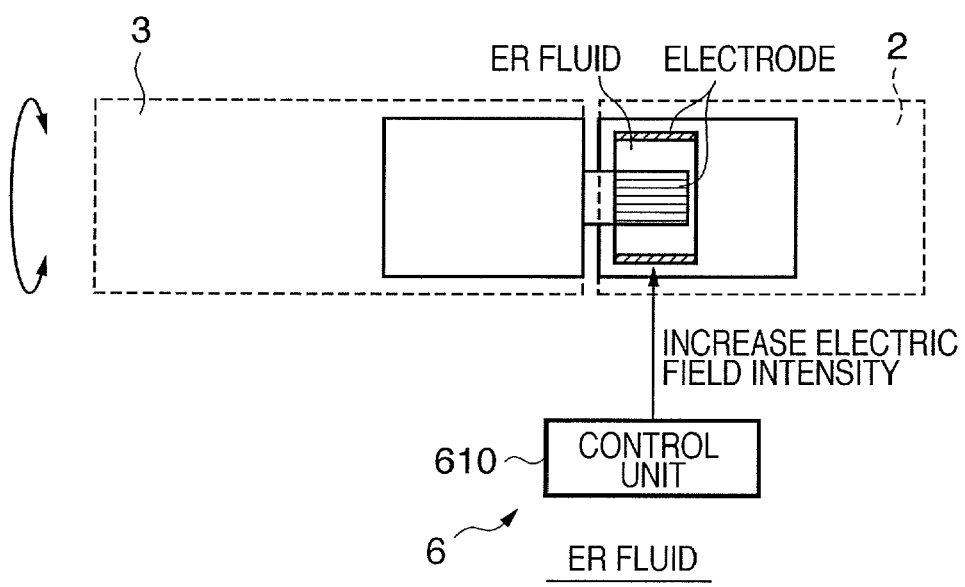

This force sense presentation method will be described with reference to FIG. 25. Force sense presentation in the situation wherein no operation such as bolt tightening should be executed, that is, whether a machine tool can be inserted up to a predetermined bolt is evaluated will be described. When the interference determination unit 630 has calculated and determined that the virtual object does not interfere with the virtual machine tool, the force sense rendering unit 6 controls the actuator 5 not to move the force sense presentation unit 3 relative to the fixed unit 2, thereby presenting a force sense of noninterference. For example, FIGS. 26A and 26B show cases wherein the actuator 5 uses a DC motor and an ultrasonic motor. FIGS. 27A and 27B show cases wherein the actuator 5 uses a brake and an ER fluid. Mechanical elements to mount the actuator 5 in the fixed unit 2 or force sense presentation unit 3 and mechanical elements such as a gear are not illustrated for the convenience of description of the functions. However, the mechanical elements should be mounted. The arrangement of the actuator 5 is not limited to FIGS. 26A, 26B, 27A, and 27B. For example, FIGS. 26A, 26B, 27A, and 27B illustrate arrangements with the actuator 5 mounted on, for example, the side of the fixed unit 2. However, the present invention is not limited to this. The actuator 5 may be mounted in the force sense presentation unit 3. The ultrasonic motor shown in FIGS. 26A and 26B is effective even when the position of a stator with a vibration exciting piezoelectric element and the position of a rotor traveling on the stator are reversed. FIGS. 26A and 26B are views schematically showing an active control actuator. FIGS. 27A and 27B are views schematically showing a passive control actuator.

Drive control of the force sense rendering unit 6 in each actuator will be described below with reference to FIGS. 26A, 26B, 27A, and 27B. For example, when the actuator 5 uses a DC motor, AC motor, or stepping motor, an encoder is mounted. Servo control is executed such that the output value of the encoder is held within a predetermined tolerance, thereby making the force sense presentation unit 3 immovable relative to the fixed unit 2. When the actuator 5 uses an electrostatic motor, a pressure is applied between the electrodes. When an ultrasonic motor is used, a pressure is applied between the stator and the rotor. The pressure is generated by a magnet which is provided on part of the stator. In this case, the force of the fingers turning the force sense presentation unit 3 can be larger than the frictional force generated by the pressure and the contact area. When driving stops, the frictional force can make the force sense presentation unit 3 immovable relative to the fixed unit 2. When the actuator 5 uses a brake or a clutch, the disks are brought into tight contact with each other to increase the frictional force, thereby making the force sense presentation unit 3 immovable relative to the fixed unit 2.

When the actuator 5 uses an ER fluid, the electric field intensity between the electrodes is increased. When the actuator 5 uses an MR fluid, the magnetic field intensity is increased. The intensities are determined by the type of the ER fluid or MR fluid or the gap between the electrodes. In this case, an electric field intensity or a magnetic field intensity to make the resistance larger than the force of the fingers turning the force sense presentation unit 3 is set. This increases the shearing force which the ER fluid or MR fluid generates on, for example, the wall surface of the electrode so that the force sense presentation unit 3 can be made immovable relative to the fixed unit 2.

When the interference determination unit 630 has calculated and determined that the virtual object interferes with the virtual machine tool, although not in an operation such as bolt tightening, the actuator 5 is driven to present a sense of interference force. At this time, the actuator 5 must be capable of active control. Hence, for example, at least one of a hydraulic/pneumatic actuator, solenoid, DC motor, AC motor, stepping motor, linear motor, electrostatic motor, ultrasonic motor, polymer actuator, and shape memory alloy is usable as the actuator. The interference determination unit 630 of the force sense rendering unit 6 calculates the interference and the reaction force corresponding to the interference depth. A processing unit 620 calculates force sense presentation information to drive the actuator 5. If the driving axis includes only the axis about the longitudinal axis of the force sense presentation device 1, the force sense presentation information drives the force sense presentation unit 3 at a speed and driving amount more than the speed and amount of the fingertips turning the force sense presentation unit 3. Alternatively, the force sense presentation unit 3 is driven at a force and torque more than the force and torque of the fingertips turning the force sense presentation unit 3. The driving amount is controlled in accordance with the interference depth. The force sense presentation unit 3 may be reciprocally moved (oscillated) about the longitudinal axis of the force sense presentation device 1. The amplitude or/and frequency of the reciprocal movement (oscillation) are controlled in accordance with the interference depth. The direction of the force sense actually perceived in interference may be different from the direction of the virtually presented force sense. Hence, the user needs training before use to perceive the alternative presentation.

To tighten the virtual bolt, the user turns the force sense presentation unit 3 in the wedge-shaped arrow in FIG. 25 with the fingertips. Conversely, to undo the virtual bolt, the user turns the force sense presentation unit 3 in the triangular arrow with the fingertips. Force sense presentation in machine tool manipulation will be explained below assuming virtual bolt tightening. In undoing the bolt, the direction is reversed. For example, the actuator 5 uses a DC motor, the force sense presentation information calculated by the processing unit 620 drives the force sense presentation unit 3 in the same direction as the direction in which the fingertips turn it at a speed lower than the turning speed. This makes it possible to present a force sense of bolt tightening in the direction of the wedge-shaped arrow in FIG. 25 by the resistance generated by the actuator 5. This also applies to an arrangement using an AC motor, stepping motor, electrostatic motor, or ultrasonic motor. Alternatively, the force sense presentation information calculated by the processing unit 620 may drive the force sense presentation unit 3 in a direction reverse to the direction in which the fingertips turn it at a force and torque smaller than the force and torque of the fingertips turning the force sense presentation unit 3 to output a resistance, thereby presenting a sense of bolt tightening force.

When the actuator 5 uses a brake or a clutch, the tight contact between the disks is loosened so that the user can turn the force sense presentation unit 3 relative to the fixed unit 2 with the fingers, thereby presenting a resistance by friction. When the actuator 5 uses an ER fluid, the electric field intensity between the electrodes is decreased. When the actuator 5 uses an MR fluid, the magnetic field intensity is decreased. This relaxes the shearing force which the ER fluid or MR fluid generates on, for example, the wall surface of the electrode so that the user can turn the force sense presentation unit 3 relative to the fixed unit 2 with the fingers. The resistance by friction may be output to present a sense of bolt tightening force.

Figure 28:
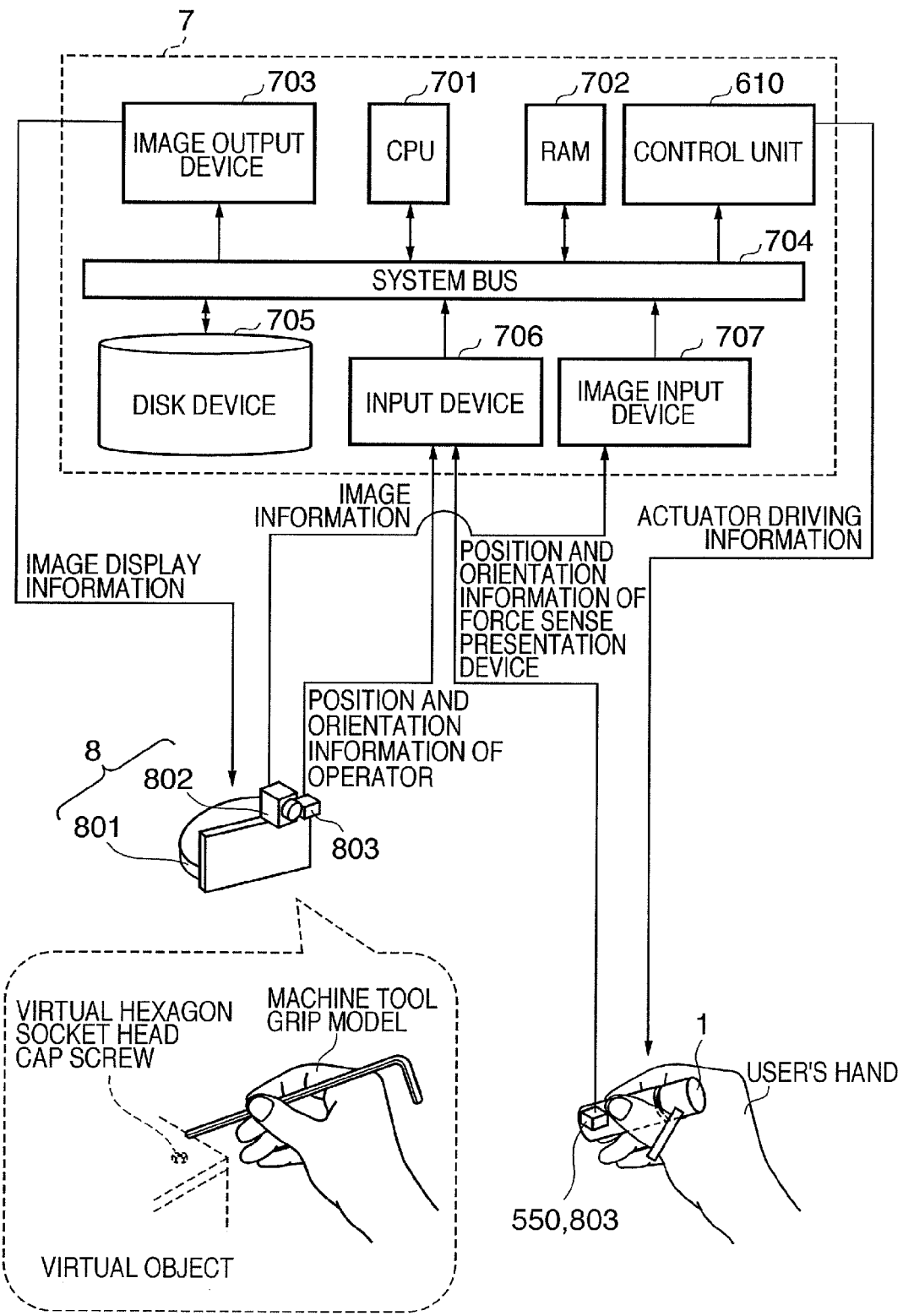
FIG. 28 is a view schematically showing the configuration of a mixed reality system incorporating a force sense presentation device.

The configuration of a system that incorporates, in mixed reality (MR), the above-described force sense presentation device and a force sense presentation method thereof will be described with reference to FIG. 28. FIG. 28 is a block diagram schematically showing the configuration of a mixed reality system incorporating the force sense presentation device according to Arrangement Example 4.

Referring to FIG. 28, an arithmetic processing unit 7 is formed from a calculator such as a computer. The arithmetic processing unit 7 includes a CPU 701, RAM 702, image output device 703, system bus 704, disk device 705, input device 706, and image input device 707. The CPU 701 has the interference determination unit 630 (not shown) for force sense presentation, the processing unit 620 (not shown) to calculate a sense of force, and a function of controlling image processing. The CPU 701 connected to the system bus 704 can communicate with the control unit 610 to control the actuator 5 for force sense presentation, and also with the RAM 702, image output device 703, disk device 705, input device 706, and image input device 707.

The control unit 610 for force sense presentation transmits the driving information of the actuator 5 of the force sense presentation device 1. Information from the interference determination unit 630 (not shown) and processing unit 620 (not shown) executed on the CPU 701 is transmitted to the control unit 610 via the system bus 704. The RAM 702 is implemented by a main storage device such as a memory. The RAM 702 temporarily holds, via the system bus 704, the program codes of an interference determination program, force sense calculation program, and image processing program, the control information of the programs, and real image data input from the image input device 707. The RAM 702 also temporarily holds various kinds of data, including virtual space data such as CG models and layout information, sensor measurement values, and sensor calibration data. The virtual space data includes virtual object models, machine tool grip models, and virtual index CG models. Position and orientation information laid out in virtual space is also included in the virtual space data.

The image output device 703 is implemented by a device such as a graphics card. Generally, the image output device 703 holds a graphics memory (not shown). Image information generated by a program executed on the CPU 701 is written in the graphics memory held by the image output device 703 via the system bus 704. The image output device 703 converts the image information written in the graphics memory into an appropriate image signal and sends it to a display device 801. The graphics memory need not always be held by the image output device 703. The RAM 702 may implement the function of the graphics memory.

The system bus 704 serves as a communication path which connects to the devices included in the arithmetic processing unit 7 and enables them to communicate with each other. The disk device 705 is implemented by an auxiliary storage device such as a hard disk or ROM. The disk device 705 stores program codes for force sense rendering, the program codes of the image processing program, control information of each program, virtual space data, sensor calibration data, virtual object models, and machine tool grip models. The program codes for force sense rendering include, for example, the interference determination program and force sense calculation program.

The input device 706 is implemented by various kinds of interface devices. The input device 706 receives, as data, signals from an external device connected to the arithmetic processing unit 7 and writes the data in the RAM 702 via the system bus 704. The input device 706 also includes a device such as a keyboard or a mouse and receives operation inputs from the user (operator) of this device.

The image input device 707 is implemented by a device such as a capture card. The image input device 707 receives a real image sent from an image sensing device 802 and writes the image data in the RAM 702 via the system bus 704. When the display device 801 is an optical see-through display device, the image input device 707 need not be provided.

A head mounted unit 8 is implemented by, for example, a video see-through HMD which the user of the device wears on the head to experience the system of the embodiment. The head mounted unit 88 includes the display device 801, image sensing device 802, and position and orientation sensor 803. In this embodiment, the user is assumed to wear the device of the head mounted unit 8 on the head. However, the user need not always wear the head mounted unit 8 if he/she can experience mixed reality.

The display device 801 is implemented by the display provided on the video see-through HMD. The display device 801 is used to display an image signal sent from the image output device 703 and present a mixed reality image to the user of the device. The display device 801 is included in the head mounted unit 8, though the user need not always wear the display device 801. If the user can confirm the image, for example, a tabletop or handheld display device may be used as the display device 801.

The image sensing device 802 is implemented by at least one image sensing device such as a CCD camera. The image sensing device 802 is used to sense a real image of the physical world seen from the viewpoint of the user of the device. For this purpose, the user preferably wears the image sensing device 802 on a part of the head close to the viewpoint position. However, the present invention is not limited to this if an image seen from the viewpoint of the user can be acquired. The optical axis of the image sensing device 802 may be made to coincide with the central axis of the display device 801 by using a half mirror or a prism. A real image (including an analog signal or a digital signal of IEEE1394 standard) sensed by the image sensing device 802 is sent to the image input device 707 as an image signal. If a optical see-through display device is used as the display device 801, the user of the device directly observes the physical world through the display device 801. Hence, the image sensing device 802 need not be provided.

The position and orientation sensor 803 measures the viewpoint (position and orientation sensor 803) of the user who uses the device and the position and orientation of the force sense presentation device 1 and sends the measured data to the input device 706 of the arithmetic processing unit 7. The position and orientation sensor 803 is implemented by a position and orientation measurement device including, for example, a magnetic sensor, an acceleration sensor and gyro, or an optical sensor including an infrared sensor. The position and orientation sensor 803 can also serve as a sensor to measure the angular velocity (speed) of rotation of the force sense presentation device 1.

The user uses the force sense presentation device 1 by gripping it. A positioning sensor 550 in the force sense presentation device 1 is implemented by, for example, an encoder. The positioning sensor 550 measures the relative position and orientation between the fixed unit 2 and the force sense presentation units 3 and sends the measured position and orientation to the input device 706 of the arithmetic processing unit 7.

The force sense presentation device 1 and its force sense presentation method explained in Arrangement Example 4 allow force sense presentation in a wide manipulation range. The force sense presentation device eliminates the cumbersomeness in attachment/detachment and the sense of incongruity in operation. The device can also be compact and light-weight. A mixed reality system incorporating the device can present a sense of force in actually tightening or undoing a bolt using a machine tool. Combined with image display, the reality increases. This also increases the efficiency in verifying the operability in assembly or maintenance by inserting a jig or tool in a virtually displayed product. Even when the arrangement is applied not to mixed reality but to virtual reality (VR), the same effect can be obtained.

Arrangement Example 5

Figure 29A:
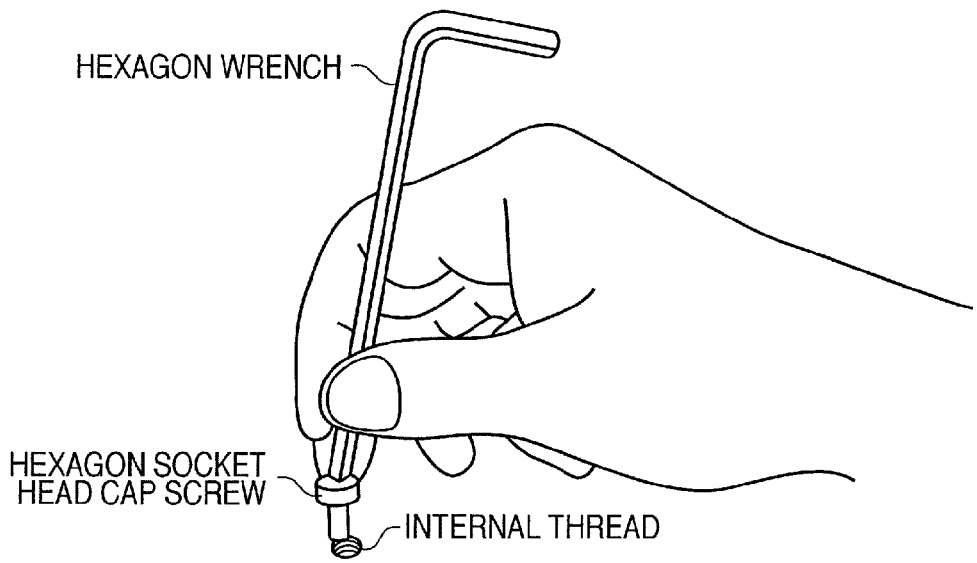
FIGS. 29A and 29B are views showing a method of operability verification and force sense presentation.
Figure 29B:
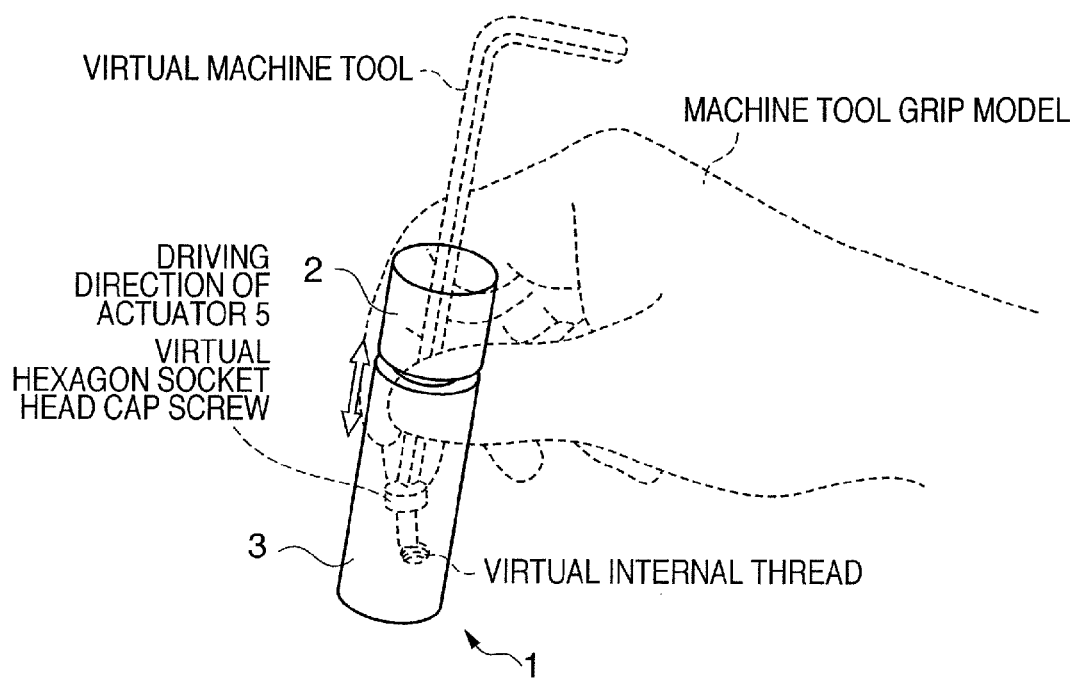

In Arrangement Example 4, a force sense presentation device which presents a force sense when a machine tool (virtual machine tool) interferes with a virtual object and a virtual machine tool in virtually tightening or undoing a bolt and a force sense presentation method thereof have been described. In Arrangement Example 5, a force sense presentation method assuming operability verification shown in FIG. 29A will be described as another form. FIG. 29A shows an operation in which the user holds a hexagon wrench in a pencil holding style, gropes for the position of an internal thread and inserts the hexagon wrench into the thread while holding a hexagon socket head cap screw with the middle finger. When the hexagon socket head cap screw fits in the internal thread, the operator feels the sense of "clunk". Arrangement Example 5 presents a sense in such an operation. FIGS. 29A and 29B are views showing a method of operability verification and force sense presentation. The hexagon socket head cap screw is also included in thread members.

A force sense presentation device 1 drives a force sense presentation unit 3 relative to a fixed unit 2. When the driving axis of the force sense presentation device 1 includes only the axis about the longitudinal axis of the force sense presentation device 1, the force sense presentation unit 3 is driven in that direction. At this time, an actuator 5 must be capable of active control. Hence, for example, at least one of a hydraulic/pneumatic actuator, solenoid, DC motor, AC motor, stepping motor, linear motor, electrostatic motor, ultrasonic motor, polymer actuator, and shape memory alloy is used as the actuator. An interference determination unit 630 calculates the timing of insertion of the hexagon socket head cap screw into the virtual internal thread. A processing unit 620 calculates force sense presentation information. The presentation of the sense of "clunk" should be abrupt. Hence, the force sense presentation information preferably contains driving information with a pulse-shaped driving pattern, force, or torque.

More preferably, the driving axis of the force sense presentation device 1 also includes the longitudinal axis of the force sense presentation device 1, as shown in FIG. 29B. As described above, at this time, the actuator 5 must be capable of active control. Hence, for example, at least one of a hydraulic/pneumatic actuator, solenoid, DC motor, AC motor, stepping motor, linear motor, electrostatic motor, ultrasonic motor, polymer actuator, and shape memory alloy is used as the actuator. The interference determination unit 630 calculates the timing of insertion of the hexagon socket head cap screw into the virtual internal thread. The processing unit 620 calculates force sense presentation information. The presentation of the sense of "clunk" should be abrupt. Hence, the force sense presentation information preferably contains driving information with a pulse-shaped driving pattern, force, or torque.

A case wherein the driving axis includes the axis about the longitudinal axis of the force sense presentation device 1 and a case wherein the driving axis includes the longitudinal axis of the force sense presentation device 1 have been described above. The force sense presentation device can have a driving axis of any other degree of freedom. The force sense presentation information calculated by the processing unit 620 preferably represents a pulse-shaped driving pattern, force, or torque. The direction of the sense of force actually perceived in interference may be different from the direction of the virtually presented sense of force. To solve this, the user needs training before use to perceive the alternative presentation.

As described above, Arrangement Example 5 can present not only the sense of interference force between a virtual object and a virtual machine tool but also the sense of "clunk" perceived in inserting a bolt. Hence, more real force sense presentation is possible. This also increases the efficiency in verifying the operability in assembly or maintenance by inserting a jig or tool in a virtually displayed product.

Arrangement Example 6

Figure 30:
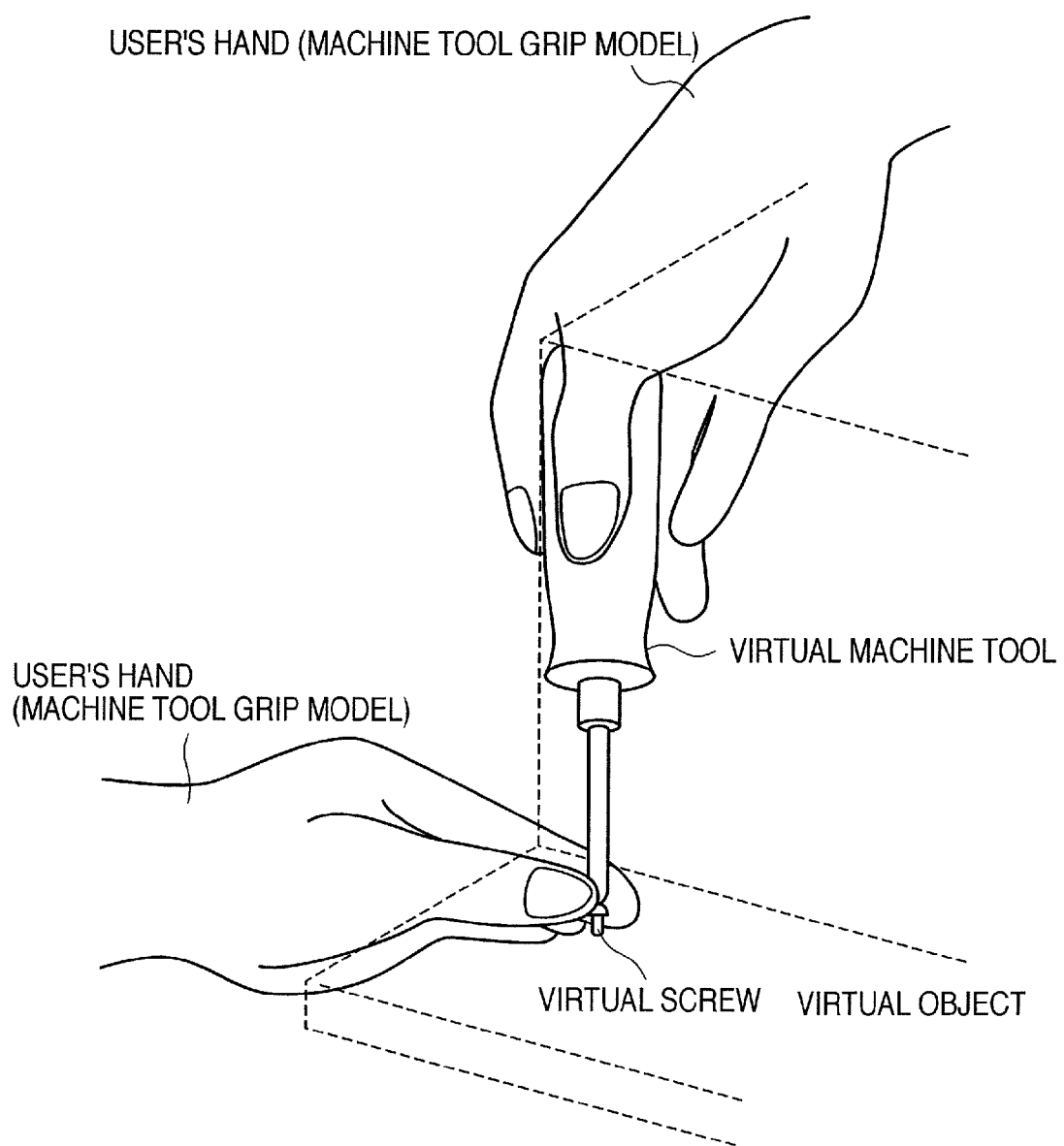
FIG. 30 is a view showing the images of virtual objects displayed by virtual reality or mixed reality and hands gripping a virtual machine tool.

FIG. 30 is a view showing the images of virtual objects displayed by virtual reality or mixed reality and hands (machine tool grip models) gripping a virtual machine tool. This example assumes that the user tightens or undoes a screw at the tip of a screwdriver with respect to an internal thread on a virtual object. In this case, it is difficult to grasp the operability based only on the displayed virtual object images. However, when actual bolt tightening is simulated by using a virtual machine tool, the operability can be evaluated and verified. Additionally, a virtual machine tool having a force sense presentation function makes it possible to present the sense of bolt tightening operation and more accurately verify whether a machine tool can enter or whether there is sufficient space to allow bolt tightening. As a main characteristic feature, Arrangement Example 6 enables to present a sense of operation in actual use of a machine tool.

In Arrangement Example 6, the machine tool to be virtually handled indicates a machine tool such as a screwdriver. The user wraps multiple fingers of one hand around the machine tool while holding a screw with the other hand. A force sense presentation device simulating such a machine tool has the same arrangement as a force sense presentation device 1b shown in FIG. 20B as in Arrangement Example 1. A description of the same components as in Arrangement Example 1 will not be repeated. Only different parts will be described.

Referring to FIGS. 20A and 20B, the interference determination unit of Arrangement Example 6 determines the interference (insertion) between a virtual internal thread and a virtual screw at the tip of a virtual machine tool simulated by a force sense presentation device 1. In force sense presentation to be described below, the virtual screw at the tip of the virtual machine tool interferes with (is inserted into) the virtual internal thread. Alternatively, the object (virtual screw) on which the machine tool acts interferes with a fixed unit 2 of the force sense presentation device 1. That is, it is assumed that screw tightening/undoing is possible.

Figure 31:
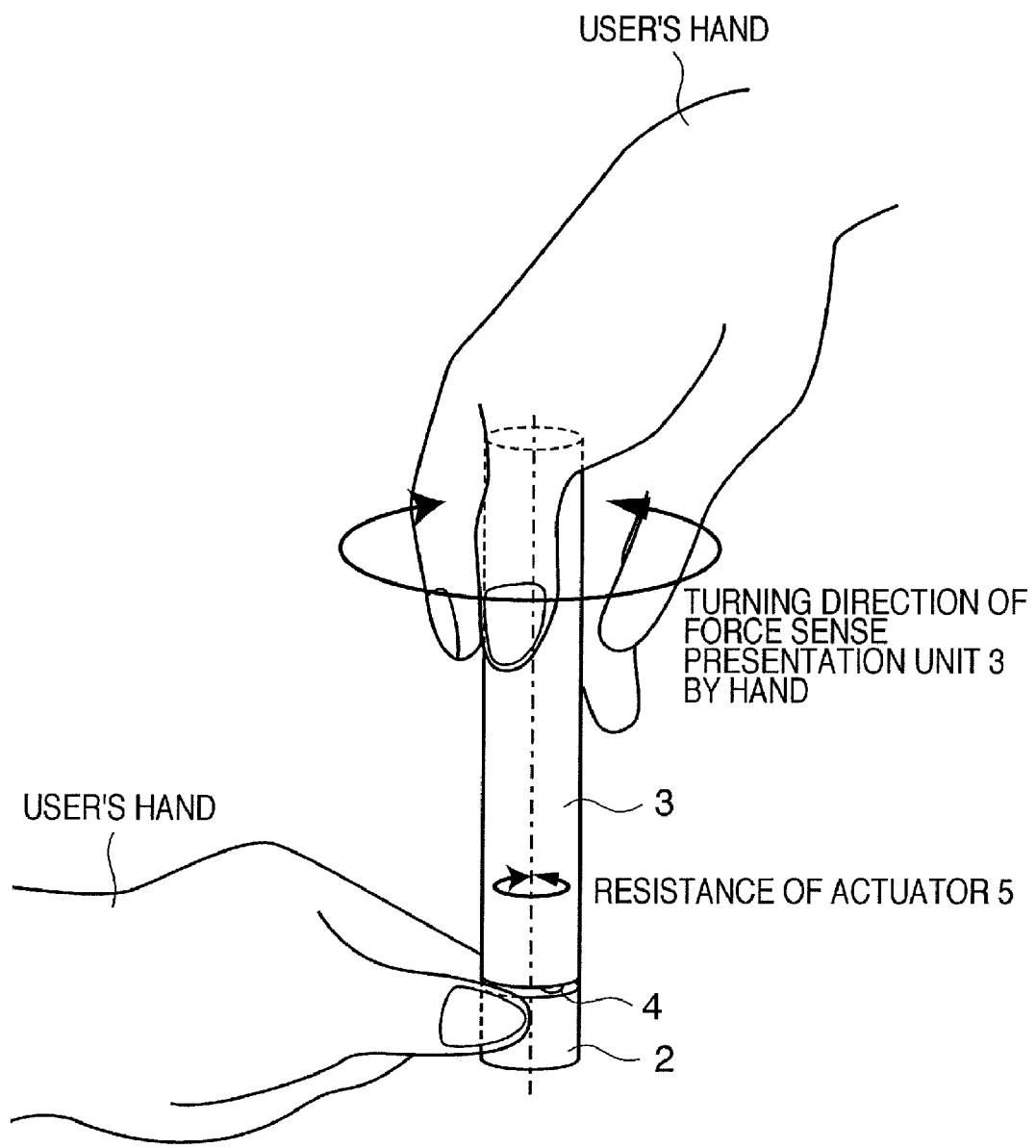
FIG. 31 is a view showing a state wherein a user holds a fixed unit with the fingertips of the left hand and wraps a force sense presentation unit with multiple fingers of the right hand.

The user grips the fixed unit 2 of the force sense presentation device 1 with the hand corresponding to the hand holding the screw and wraps the end of a force sense presentation unit 3 on the opposite side of the fixed unit 2 with the other hand. FIG. 31 is a view showing a state wherein the user holds the force sense presentation device 1. FIG. 31 shows a state wherein the user holds the fixed unit 2 with the fingertips of the left hand and wraps the force sense presentation unit 3 with multiple fingers of the right hand.

Figure 32A:
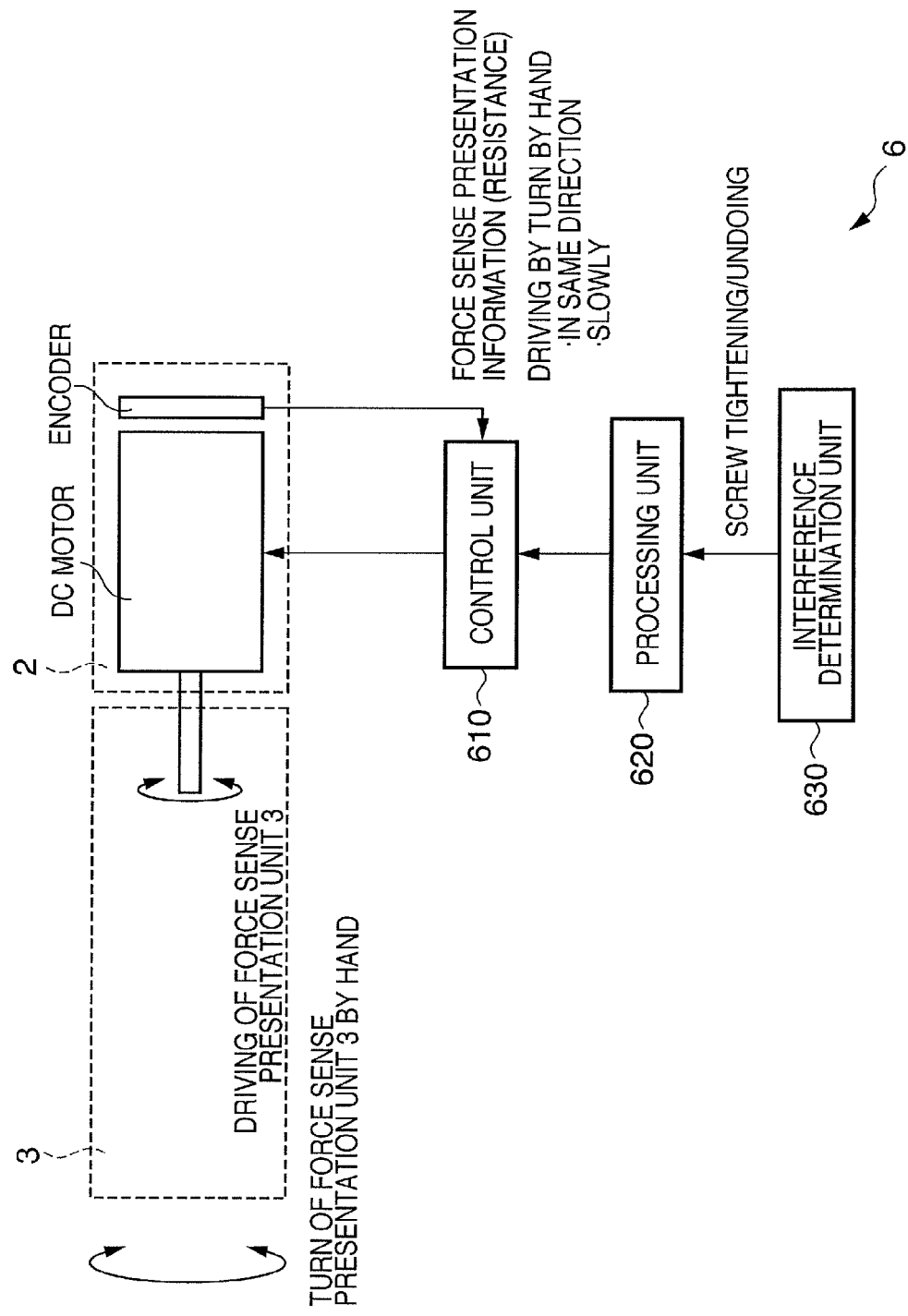
FIGS. 32A and 32B are views schematically showing an active control actuator.
Figure 32B:
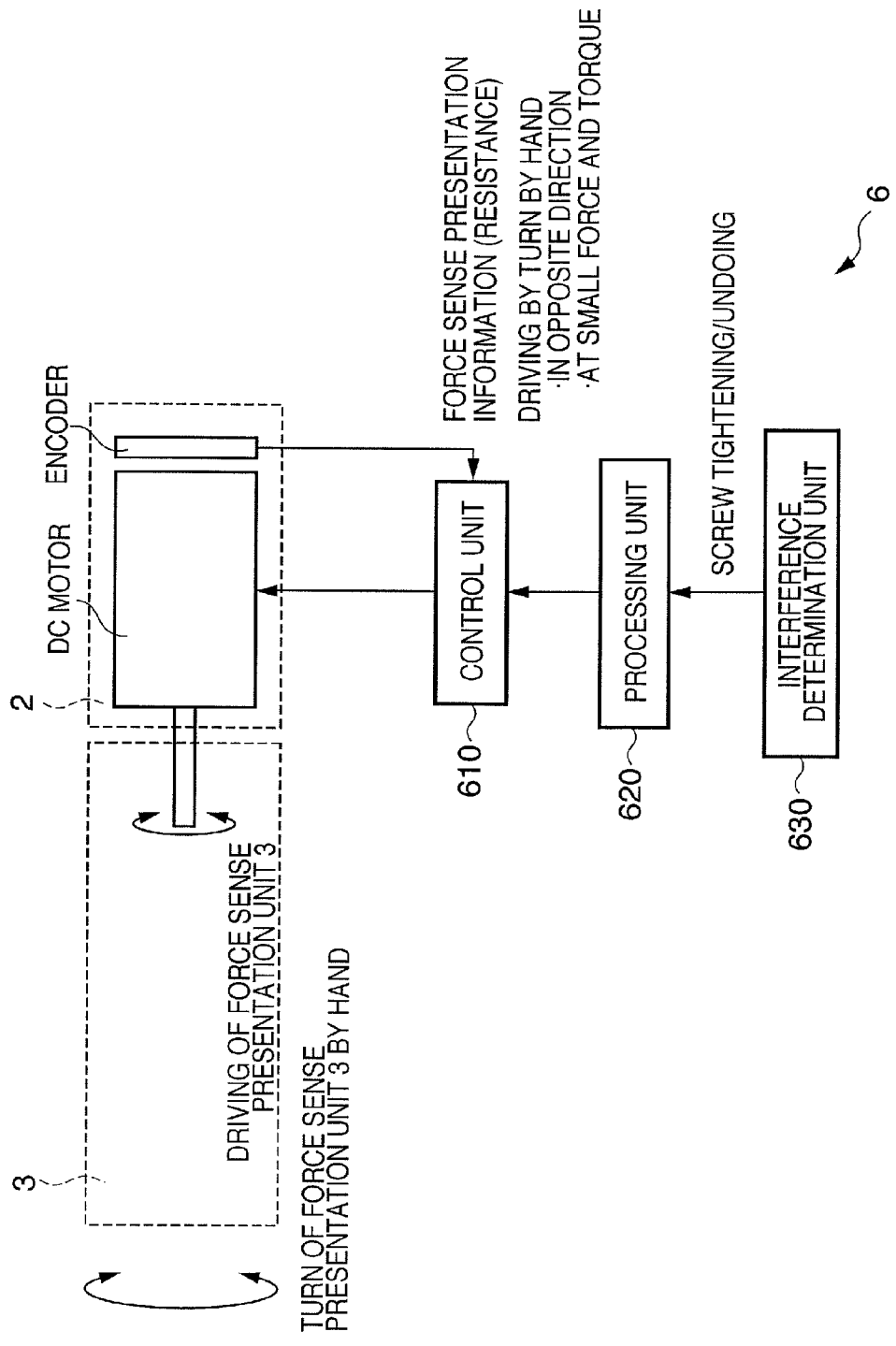

A force sense presentation method in manipulating a machine tool to tighten or undo a virtual screw will be described next with reference to FIG. 31. To tighten the screw, the user turns the force sense presentation unit 3 in the direction of the wedge-shaped arrow with the fingertips of the right hand. To undo the virtual screw, the user turns the force sense presentation unit 3 in the direction of the triangle. Force sense presentation in manipulating the machine tool will be explained below assuming virtual screw tightening. To undo the screw, the direction is reversed. For example, when an actuator 5 uses a DC motor, force sense presentation information calculated by a processing unit 620 drives the force sense presentation unit 3 in the same direction as the direction in which the fingertips turn it at a speed lower than the turning speed (FIG. 32A). This makes it possible to present a sense of screw tightening force in the direction of the wedge-shaped arrow in FIG. 31 by the resistance generated by the actuator 5. This also applies to an arrangement using an AC motor, stepping motor, electrostatic motor, or ultrasonic motor. Alternatively, the force sense presentation information calculated by the processing unit 620 may drive the force sense presentation unit 3 in a direction opposite to the direction in which the fingertips turn it at a force and torque smaller than the force and torque of the fingertips turning the force sense presentation unit 3 to output a resistance, thereby presenting a force sense of screw tightening (FIG. 32B). FIGS. 32A and 32B are views schematically showing an active control actuator.

Figure 33B:
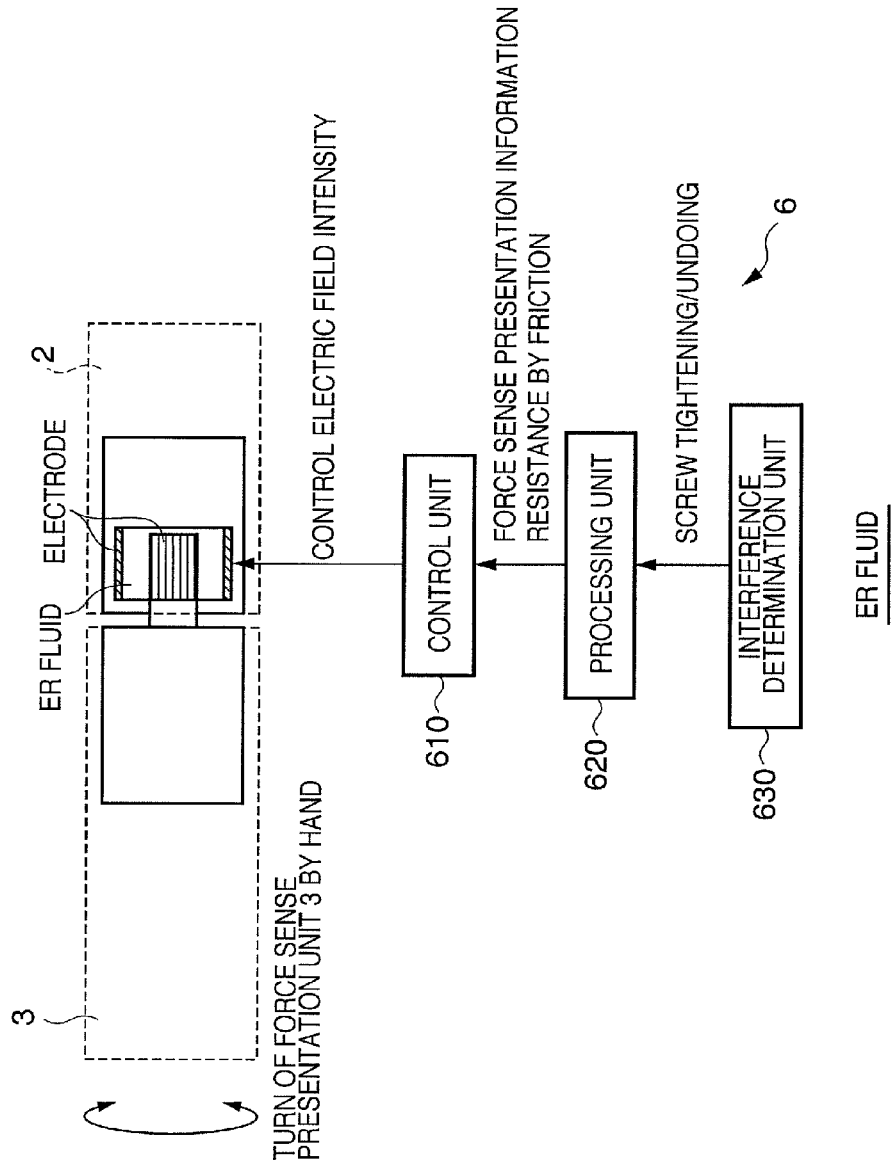

When the actuator 5 uses a brake or clutch, the tight contact between the disks is loosened so that the user can turn the force sense presentation unit 3 relative to the fixed unit 2 with the fingers, thereby presenting a resistance by friction (FIG. 33A). When the actuator 5 uses an ER fluid, the electric field intensity between the electrodes is decreased. When the actuator 5 uses an MR fluid, the magnetic field intensity is decreased. This controls the shearing force which the ER fluid or MR fluid generates on, for example, the wall surface of the electrode so that the user can turn the force sense presentation unit 3 relative to the fixed unit 2 with the fingers. The resistance by friction may be output to present a sense of screw tightening force (FIG. 33B shows the case of ER fluid). FIGS. 33A and 33B are views schematically showing a passive control actuator.

The configuration of a system that incorporates, in mixed reality (MR), the above-described force sense presentation device and a force sense presentation method thereof will be described with reference to FIG. 34. FIG. 34 is a view schematically showing the configuration of a mixed reality system incorporating the force sense presentation device.

Referring to FIG. 34, an arithmetic processing unit 7 is formed from a calculator such as a computer. The arithmetic processing unit 7 includes a CPU 701, RAM 702, image output device 703, system bus 704, disk device 705, input device 706, and image input device 707.

The CPU 701 has an interference determination unit 630 (not shown) for force sense presentation, the processing unit 620 (not shown) to calculate a sense of force, and a function of controlling image processing. The CPU 701 connected to the system bus 704 can communicate with the control unit 610 to control the actuator 5 for force sense presentation, and also with the RAM 702, image output device 703, disk device 705, input device 706, and image input device 707.

The control unit 610 for force sense presentation transmits the driving information of the actuator 5 of the force sense presentation device 1. Information from the interference determination unit 630 (not shown) and processing unit 620 (not shown) executed on the CPU 701 is transmitted to the control unit 610 via the system bus 704.

The RAM 702 is implemented by a main storage device such as a memory. The RAM 702 temporarily holds, via the system bus 704, the program codes of an interference determination program, force sense calculation program, and image processing program, the control information of the programs, and real image data input from the image input device 707. The RAM 702 also temporarily holds various kinds of data, including virtual space data such as CG models and layout information, sensor measurement values, and sensor calibration data. The virtual space data includes virtual object models, machine tool grip models, and virtual index CG models. Position and orientation information laid out in virtual space is also included in the virtual space data.

The image output device 703 is implemented by a device such as a graphics card. Generally, the image output device 703 holds a graphics memory (not shown). Image information generated by a program executed on the CPU 701 is written in the graphics memory held by the image output device 703 via the system bus 704. The image output device 703 converts the image information written in the graphics memory into an appropriate image signal and sends it to a display device 801. The graphics memory need not always be held by the image output device 703. The RAM 702 may implement the function of the graphics memory.

The system bus 704 serves as a communication path which connects to the devices included in the arithmetic processing unit 7 and enables them to communicate with each other.

The disk device 705 is implemented by an auxiliary storage device such as a hard disk or ROM. The disk device 705 stores program codes for force sense rendering, the program codes of the image processing program, control information of each program, virtual space data, sensor calibration data, virtual object models, and machine tool grip models. The program codes for force sense rendering include, for example, the interference determination program and force sense calculation program.

The input device 706 is implemented by various kinds of interface devices. The input device 706 receives, as data, signals from an external device connected to the arithmetic processing unit 7 and writes the data in the RAM 702 via the system bus 704. The input device 706 also includes a device such as a keyboard or a mouse and receives operation inputs from the user (operator) of this device.

The image input device 707 is implemented by a device such as a capture card. The image input device 707 receives a real image sent from an image sensing device 802 and writes the image data in the RAM 702 via the system bus 704. When the display device 801 is an optical see-through display device, the image input device 707 need not be provided.

A head mounted unit 8 is implemented by, for example, a video see-through HMD which the user of the device wears on the head to experience the system of the embodiment. The head mounted unit 88 includes the display device 801, image sensing device 802, and position and orientation sensor 803. In this embodiment, the user is assumed to wear the device of the head mounted unit 8 on the head. However, the user need not always wear the head mounted unit 8 if he/she can experience mixed reality.

The display device 801 is implemented by the display provided on the video see-through HMD. The display device 801 is used to display an image signal sent from the image output device 703 and present a mixed reality image to the user of the device. The display device 801 is included in the head mounted unit 8, though the user need not always wear the display device 801. If the user can confirm the image, for example, a tabletop or handheld display device may be used as the display device 801.

The image sensing device 802 is implemented by at least one image sensing device such as a CCD camera. The image sensing device 802 is used to sense a real image of the physical world seen from the viewpoint of the user of the device. For this purpose, the user preferably wears the image sensing device 802 on a part of the head close to the viewpoint position. However, the present invention is not limited to this if an image seen from the viewpoint of the user can be acquired. The optical axis of the image sensing device 802 may be made to coincide with the central axis of the display device 801 by using a half mirror or a prism. A real image (including an analog signal or a digital signal of IEEE1394 standard) sensed by the image sensing device 802 is sent to the image input device 707 as an image signal. If a optical see-through display device is used as the display device 801, the user of the device directly observes the physical world through the display device 801. Hence, the image sensing device 802 need not be provided.

The position and orientation sensor 803 measures the viewpoint (position and orientation sensor 803) of the user of the device and the position and orientation of the force sense presentation device 1 and sends the measured data to the input device 706 of the arithmetic processing unit 7. The position and orientation sensor 803 is implemented by a position and orientation measurement device including, for example, a magnetic sensor, an acceleration sensor and gyro, or an optical sensor including an infrared sensor. The position and orientation sensor 803 can also serve as a sensor to measure the angular velocity (speed) of rotation of the force sense presentation device 1.

The user uses the force sense presentation device 1 by gripping it. A positioning sensor 550 in the force sense presentation device 1 is implemented by, for example, an encoder. The positioning sensor 550 measures the relative position and orientation between the fixed unit 2 and the force sense presentation units 3 and sends the measured position and orientation to the input device 706 of the arithmetic processing unit 7.

The force sense presentation device 1 and its force sense presentation method explained in Arrangement Example 6 allow force sense presentation in a wide manipulation range. The force sense presentation device eliminates the cumbersomeness in attachment/detachment and the sense of incongruity in operation. The device can also be compact and light-weight. A mixed reality system incorporating the device can present a sense of force in actually tightening or undoing a screw using a machine tool. Combined with image display, the reality increases. This also increases the efficiency in verifying the operability in assembly or maintenance by inserting a jig or tool in a virtually displayed product. Even when the arrangement is applied not to mixed reality but to virtual reality (VR), the same effect can be obtained.

Arrangement Example 7

In Arrangement Example 6, a force sense presentation device which presents a sense of force of machine tool manipulation in virtually tightening or undoing a screw and a force sense presentation method thereof have been described. In Arrangement Example 7, force sense presentation for interference to verify whether there is space to allow virtual screw tightening or undoing will be described.

In tightening a screw by using a machine tool, an interference determination unit 630 calculates the interference and interference depth between the user's hand (machine tool grip model) and a virtual object. That is, the interference determination unit 630 calculates the interference and interference depth between a virtual object and the user's hand corresponding to the hand (right hand in FIG. 31) which wraps a force sense presentation unit 3 with multiple fingers and turns a force sense presentation device 1 simulating a machine tool. A processing unit 620 obtains force sense presentation information in accordance with the interference. A control unit 610 drives an actuator 5. If the hand actually interferes with an object, the user cannot turn the machine tool any more. Hence, drive control of the actuator 5 is done to inhibit the force sense presentation unit 3 from turning relative to a fixed unit 2.

For example, when the actuator 5 uses a DC motor, AC motor, or stepping motor, an encoder is mounted. Servo control is executed such that the output value of the encoder is held within a predetermined tolerance, thereby inhibiting the force sense presentation unit 3 from turning relative to the fixed unit 2. When the actuator 5 uses an electrostatic motor, a pressure is applied between the electrodes. When an ultrasonic motor is used, a pressure is applied between the stator and the rotor. The pressure is generated by a magnet which is provided on part of the stator. In this case, the force of the fingers turning the force sense presentation unit 3 is set to be larger than the frictional force generated by the pressure and the contact area. When driving stops, the frictional force inhibits the force sense presentation unit 3 from turning relative to the fixed unit 2. When the actuator 5 uses a brake or a clutch, the disks are brought into tight contact with each other to increase the frictional force, thereby inhibiting the force sense presentation unit 3 from turning relative to the fixed unit 2. When the actuator 5 uses an ER fluid, the electric field intensity between the electrodes is increased. When the actuator 5 uses an MR fluid, the magnetic field intensity is increased. The intensities are determined by the type of the ER fluid or MR fluid or the gap between the electrodes. In this case, an electric field intensity or a magnetic field intensity to make the resistance larger than the force of the fingers turning the force sense presentation unit 3 is set. This increases the shearing force which the ER fluid or MR fluid generates on, for example, the wall surface of the electrode so that the force sense presentation unit 3 is inhibited from turning relative to the fixed unit 2. As described above, turning of the force sense presentation unit 3 relative to the fixed unit 2 is inhibited by drive control of the actuator 5, thereby presenting a force sense of interference between the hand and the virtual object.

Figure 35:
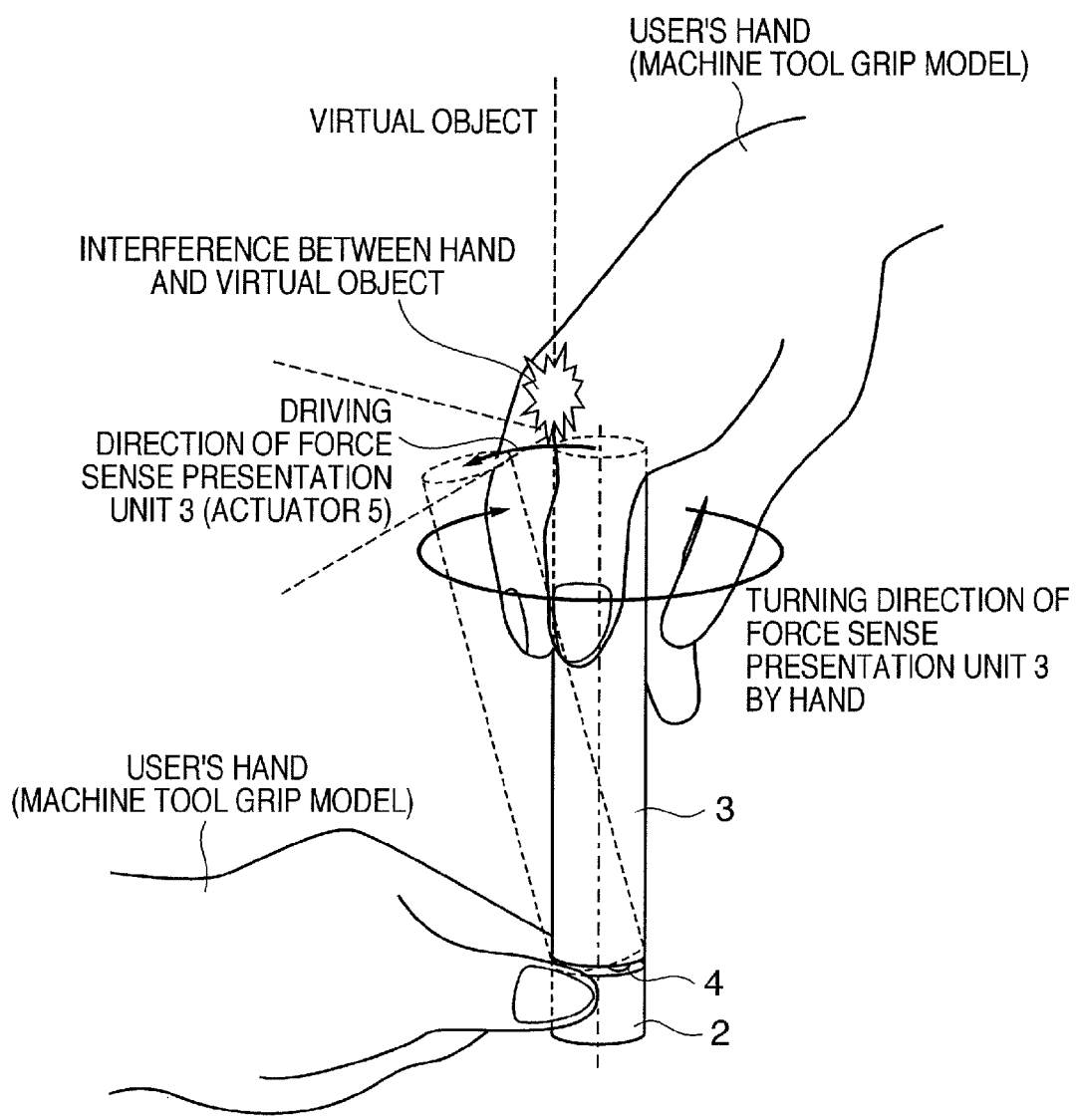
FIG. 35 is a view for explaining force sense presentation for interference when a driving axis in an oscillation direction is provided with respect to the longitudinal axis of a force sense presentation device.

A reaction force may be presented in accordance with the interference depth. At this time, the actuator 5 must be capable of active control. Hence, at least one of a hydraulic/pneumatic actuator, solenoid, DC motor, AC motor, stepping motor, linear motor, electrostatic motor, ultrasonic motor, polymer actuator, and shape memory alloy is used as the actuator. The user preferably perceives the position of the hand (machine tool grip model) that interferes with the virtual object. Hence, the driving axis preferably includes the axis in the oscillation direction or perpendicular direction with respect to the longitudinal axis of the force sense presentation device 1. FIG. 35 is a view for explaining force sense presentation for interference when a driving axis in the oscillation direction is provided with respect to the longitudinal axis of the force sense presentation device 1. The force sense presentation unit 3 is driven in accordance with the interference depth in the direction of the position of the hand (machine tool grip model) that interferes with the virtual object. At this time, the force sense presentation information must include not only the driving direction but also driving information of the driving amount, speed, force, and torque.

To define the reference of the driving direction of the force sense presentation units 3 and enhance the force of restricting the fixed unit 2 with respect to the hand or palm, the fixed unit 2 has a ring. Alternatively, a three-dimensional pattern for easy grip of the gripping region or a mark serving as a guide for grip may be formed, although none are illustrated in FIG. 35. The force sense presentation units 3 may be driven in advance to the position of the reference for grip.

The direction of the sense of force actually perceived in interference is different from the direction of the virtually presented sense of force. To solve this, the user needs training before use to perceive the alternative presentation. If the user trains to perceive the alternative presentation, the interference force sense presentation direction is not limited to the direction of the position of the hand (machine tool grip model) that interferes with the virtual object. The force sense presentation unit may be driven to the opposite side of the position of the hand (machine tool grip model) that interferes with the virtual object.

Arrangement Example 7 allows force sense presentation for interference between a virtual object and the hand (machine tool grip model) that interferes with the virtual object so that more real force sense presentation is possible. This also increases the efficiency in verifying the operability in assembly or maintenance by inserting a jig or tool in a virtually displayed product.

Third Embodiment

Figure 15B:
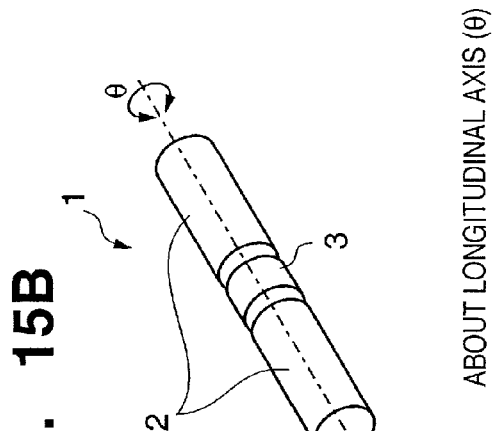
FIGS. 15A to 15D are views schematically showing the degrees of freedom of the force sense presentation device.
Figure 15D:
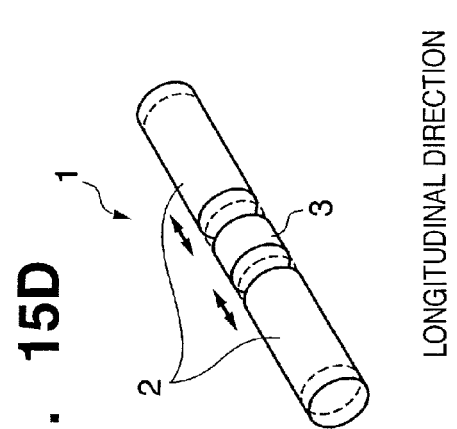
Figure 15A:
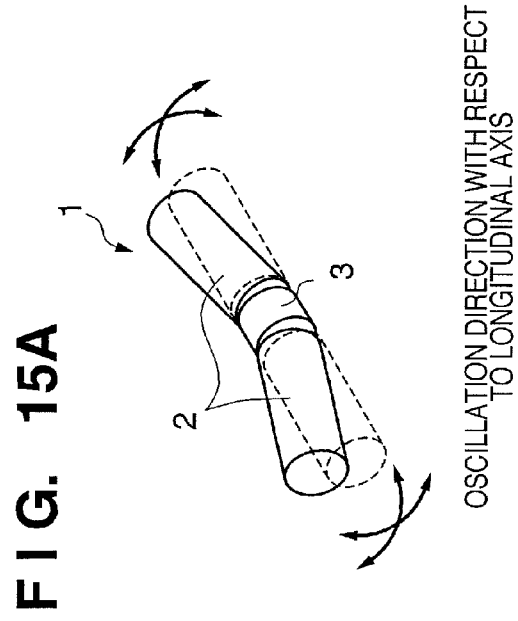

In the first and second embodiments, a case wherein the force sense presentation unit 3 is driven in the oscillation direction with respect to the longitudinal axis of the force sense presentation device 1, as shown in FIG. 15A, has been exemplified. However, the driving axis is not limited to this. For example, the force sense presentation unit 3 may be driven in the following directions.

Figure 15C:
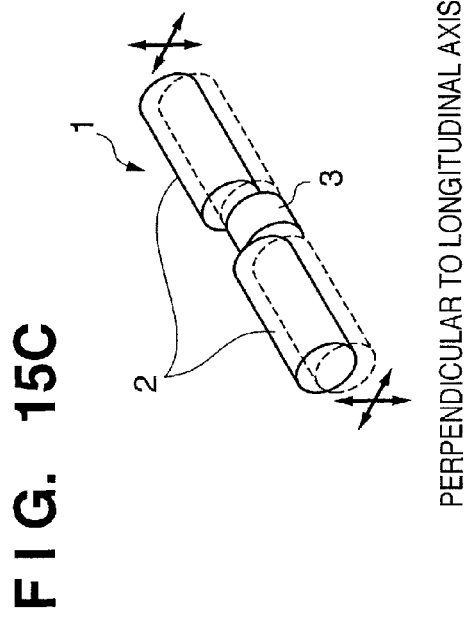

FIG. 15B: in a direction about the longitudinal axis ($\theta$) of the force sense presentation device 1
FIG. 15C: in a direction perpendicular to the longitudinal axis of the force sense presentation device 1
FIG. 15D: in the longitudinal direction of the force sense presentation device 1

By combining them, the force sense presentation device 1 can have a maximum of six degrees of freedom. FIGS. 15A to 15D are views schematically showing the degrees of freedom of the force sense presentation device.

Actuators described in the first embodiment are usable as an actuator to implement this driving. For example, a hydraulic/pneumatic actuator such as an air cylinder or solenoid can suitably be used for driving in the longitudinal direction of the force sense presentation device 1, as shown in FIG. 15D, for a purpose of reducing the mechanical components. When a motor (DC servo motor, DC motor, AC motor, stepping motor, linear motor, electrostatic motor, or ultrasonic motor) is combined with a mechanical element component such as a gear and a link mechanism, hexaxial driving can be executed.

An actuator capable of direct driving such as a multi-degree-of-freedom ultrasonic motor, polymer actuator, or shape memory alloy has an excellent driving characteristic in the bending direction. Hence, driving in the oscillation direction with respect to the longitudinal axis as shown in FIG. 15A is preferable, as described with reference to FIG. 8 or 9. However, the multi-degree-of-freedom ultrasonic motor described with reference to FIG. 8 is also capable of driving in the direction about the longitudinal axis ($\theta$) of the force sense presentation device 1, as shown in FIG. 15B.

As described above, an actuator is selected and driven for each axis. For example, the multi-degree-of-freedom ultrasonic motor described with reference to FIG. 8 is used for driving in the direction of oscillation with respect to the longitudinal axis, as shown in FIG. 15A, and driving in the direction about the longitudinal axis ($\theta$) of the force sense presentation device 1, as shown in FIG. 15B. A DC servo motor, mechanical element, and link mechanism are used for driving in the direction perpendicular to the longitudinal axis of the force sense presentation device 1, as shown in FIG. 15C, and in the longitudinal direction of the force sense presentation device 1, as shown in FIG. 15D.

When a plurality of kinds of actuators is used, force sense presentation of a maximum of six degrees of freedom is possible. The combinations of the driving axis and actuator described above are merely examples, and any arbitrary combination can be used.

Fourth Embodiment

Figure 16:
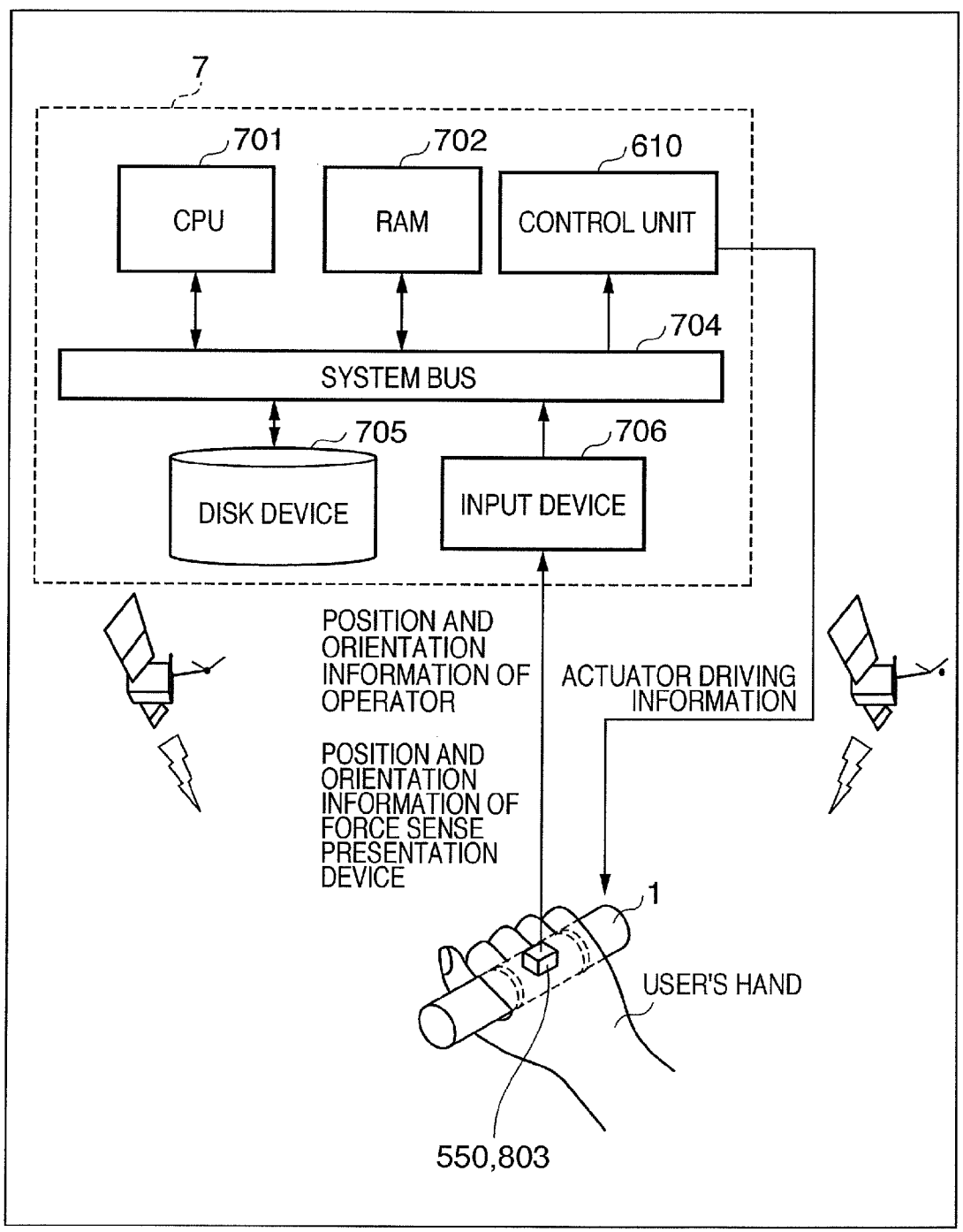
FIG. 16 is a view schematically showing a walking navigation system using a force sense presentation device.
Figure 18:
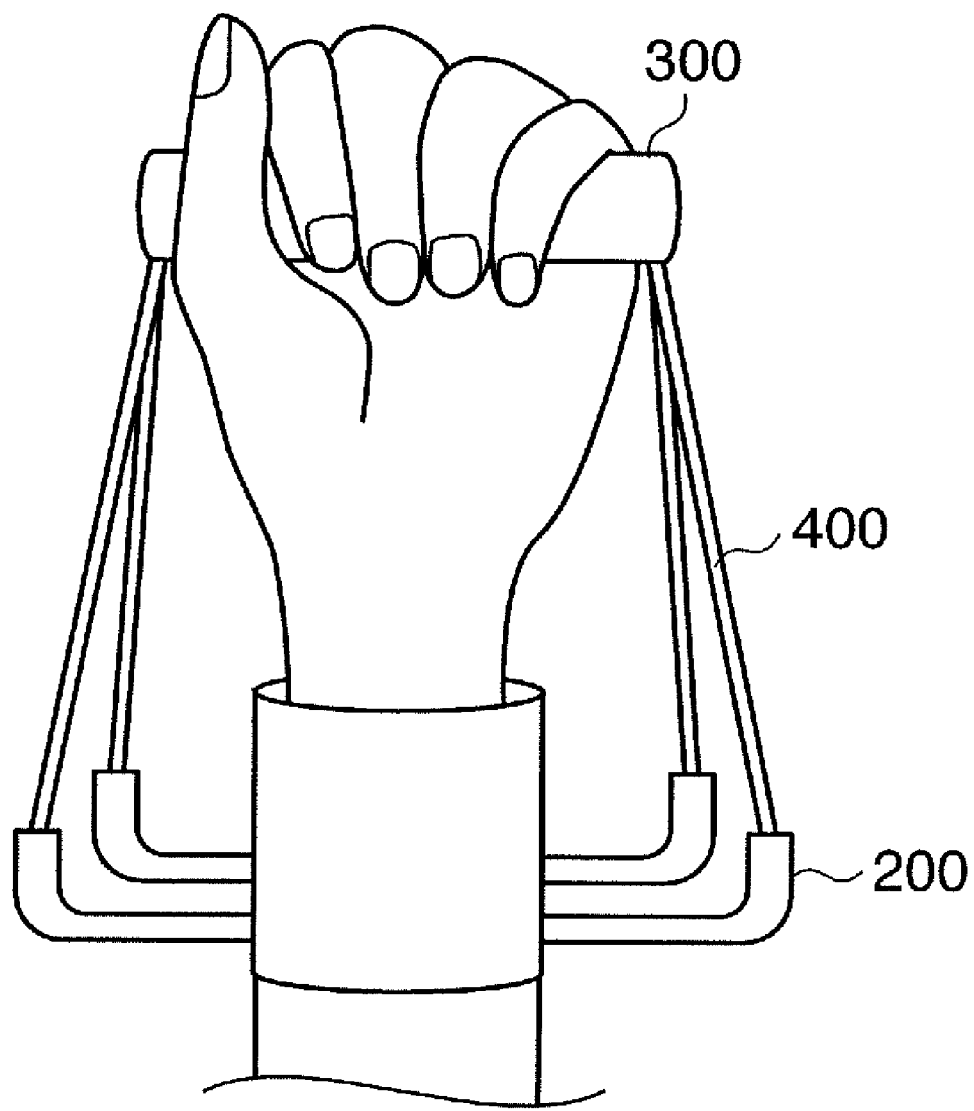
FIG. 18 is a view showing the arrangement of another prior art.

In the first embodiment, a system configuration that applies the force sense presentation device 1 to mixed reality or virtual reality has been described in detail. However, the system to which the force sense presentation device 1 is applicable is not limited to this. The force sense presentation device can also be applied to a walking navigation system mainly for a visually handicapped person by causing a user to carry the device and presenting a sense of force to the gripping hand. A walking navigation system will be described with reference to FIG. 16. FIG. 16 is a view schematically showing a walking navigation system using a force sense presentation device 1.

Referring to FIG. 16, an arithmetic processing unit 7 is formed from a calculator such as a computer. The arithmetic processing unit 7 includes a CPU 701, RAM 702, image output device 703, system bus 704, disk device 705, input device 706, and image input device 707.

The CPU 701 executes a program which calculates a route to guide the user to a desired location based on his/her position. The CPU 701 connected to the system bus 704 can communicate with the control unit 610 to control the actuator for force sense presentation, and also with the RAM 702, disk device 705, and input device 706.

The control unit 610 for force sense presentation transmits the driving information of the actuator of the force sense presentation device 1. The control unit 610 drives the actuator in the force sense presentation device 1 in the direction of the route calculated by the CPU. The RAM 702 is implemented by a main storage device such as a memory. The RAM 702 temporarily holds, via the system bus 704, the program codes of the program for calculating the guide route, map data stored in the disk device 705, or information measurement values from the force sense presentation device 1 or a hand position and orientation sensor 803.

The system bus 704 serves as a communication path which connects to the devices included in the arithmetic processing unit 7 and enables them to communicate with each other. The disk device 705 is implemented by an auxiliary storage device such as a hard disk or ROM. The disk device 705 stores the program codes for route calculation, program codes for obtaining the position and orientation of the force sense presentation device 1 based on information from the force sense presentation device 1 or hand position and orientation sensor 803, and map data.

The input device 706 is implemented by various kinds of interface devices. The input device 706 receives, as data, signals from an external device connected to the arithmetic processing unit 7 and writes the data in the RAM 702 via the system bus 704. The input device 706 also includes a device such as a keyboard or a mouse and receives operation inputs from the user (operator) of this device. The position and orientation sensor 803 is implemented by a position and orientation measurement device including, for example, a GPS sensor or a gyro.

The user uses the force sense presentation device 1 by gripping it. A positioning sensor 550 in the force sense presentation device 1 is implemented by, for example, an encoder. The positioning sensor 550 measures the relative position and orientation between a fixed unit 2 and the force sense presentation units 3 and sends the measured position and orientation to the input device 706 of the arithmetic processing unit 7. The control unit 610 drives the actuator such that the force sense presentation device 1 presents a force sense in the direction of the guide route to the user's palm gripping the device.

In the first embodiment, the position reference of the force sense presentation device 1 must be obtained, as described above. To do this, for example, it is effective to provide a ring 201 on the fixed unit 2, as shown in FIG. 11A, as described above. The surface of the fixed unit 2 or force sense presentation unit 3 may be formed into a three-dimensional pattern conforming to fingers, as shown in FIG. 11B, so that the user can grip the device by fitting the fingers to the pattern. A mark (guide) may be put on the surface of the fixed unit 2 or force sense presentation unit 3 so that the user can grip the device with the mark in contact with the bases of, for example, the index finger and middle finger. Alternatively, the force sense presentation device 1 may be initially driven (driven to the grip position) by the actuator before grip, as shown in FIG. 11C. The user grips the force sense presentation device 1 while making, for example, one of the force sense presentation units 3 contact the bases of the thumb and index finger and the other contact with the base of the little finger.

The above-described arrangement allows use of the force sense presentation device 1 of this embodiment even for a navigation system. That is, route guidance can be done by causing the force sense presentation device 1 to present a sense of force.

As described above, the present invention can provide a technique capable of presenting an appropriate sense of force to the user while improving the operability in virtual space.

Preferred embodiments of the present invention will be described below in detail with reference to the accompanying drawings.

Fifth Embodiment

As described in "Technical Field", in operation verification of an industrial product or device by using a virtual reality presentation technology or mixed reality presentation technology, it is sometimes verified by inserting a jig or tool into a virtually displayed product whether an operation such as assembly or maintenance is possible.

FIG. 36 is a view showing a state wherein a user tightens a virtual screw by using a virtual machine tool. Referring to FIG. 36, a virtual object 11 simulates a machine tool. A virtual object 12 simulates a user's hand. The virtual object 11 of the machine tool is arranged as if it were gripped by the virtual object 12 of the hand. A virtual object 14 simulates a table. An internal thread portion (virtual object) is provided on the virtual object 14 of the table. In FIG. 36, a virtual object 13 of a hexagon head screw (bolt) serving as an external thread is inserted into the internal thread portion. FIG. 36 shows a state wherein the position of the virtual object 12 of the hand is manipulated so that the virtual object 11 of the machine tool pinches the virtual object 13 of the hexagon head screw and tightens the screw into the internal thread portion on the virtual object 14 of the table.

Figure 46:
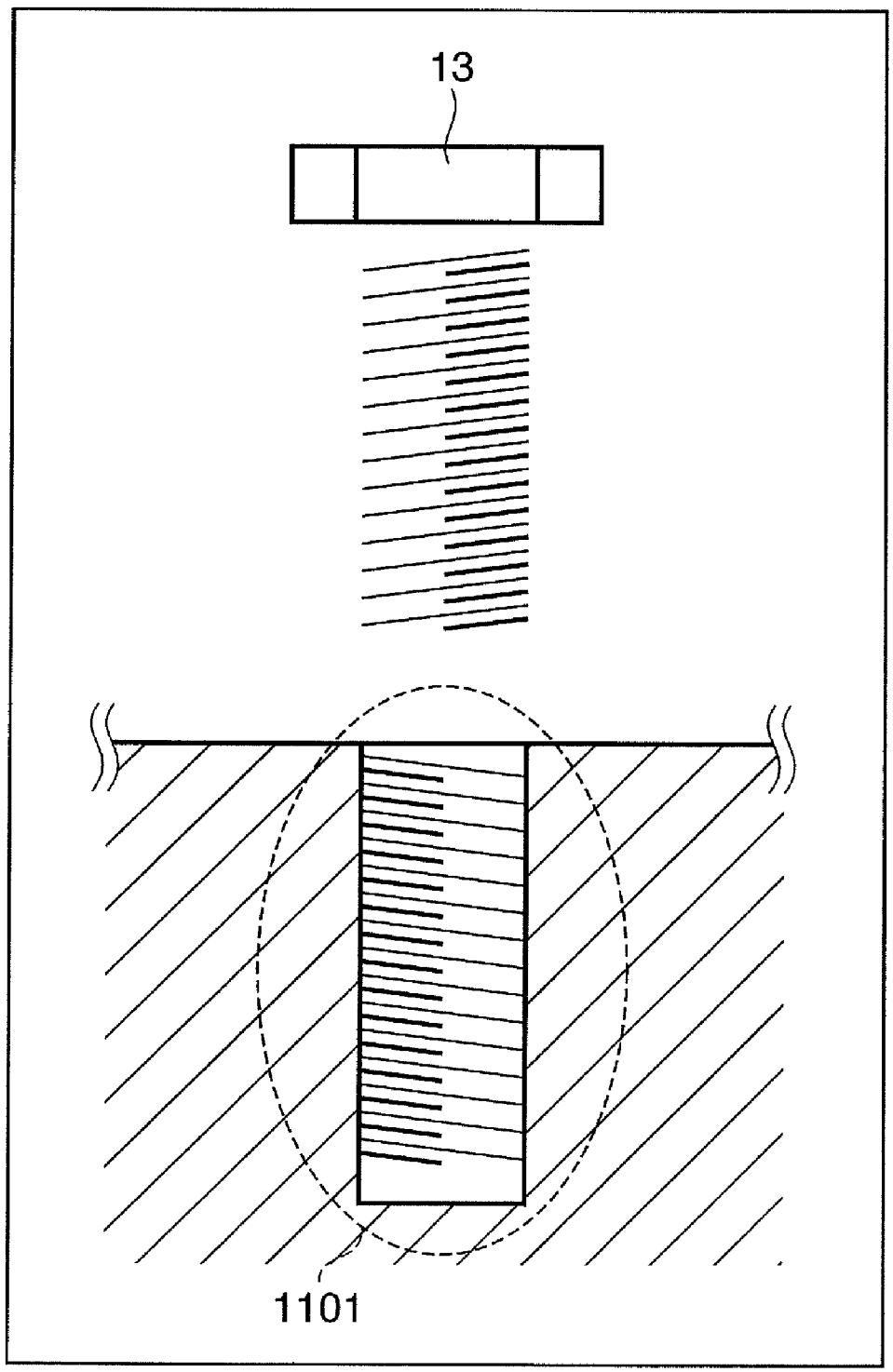
FIG. 46 is a sectional view of a virtual object 13 serving as an external thread and a virtual object serving as an internal thread portion.

FIG. 46 is a sectional view of the virtual object 13 serving as an external thread and the virtual object serving as the internal thread portion. Referring to FIG. 46, a internal thread portion 1101 is provided on the virtual object 14 of the table. Hence, the internal thread portion 1101 is a virtual object, too. In this embodiment, the virtual object 13 serving as an external thread is inserted into the internal thread portion 1101 and tightened.

In the embodiment to be described below, the type of the machine tool, the shape of the bolt, and the like are not limited to those described below. That is, the bolt can be a screw of any type such as a hexagon socket head cap screw, hexagon nut, wood screw, or taper screw. The machine tool can be any tool for turning a screw such as a hexagon wrench, wrench, ratchet wrench, or screwdriver.

FIG. 38 is a view showing a functional arrangement of a system according to this embodiment. As shown in FIG. 38, the system according to this embodiment includes a force sense presentation device 1 and an information processing apparatus 350.

The force sense presentation device 1 will be described first. The force sense presentation device 1 manipulates the position of the virtual object of a machine tool (machine tool virtual object) as a target of manipulation by the user. If the machine tool virtual object interferes with a virtual object of some kind, the force sense presentation device 1 presents a sense of force corresponding to a force calculated by a calculation process in the succeeding stage based on the interference.

Figure 37A:
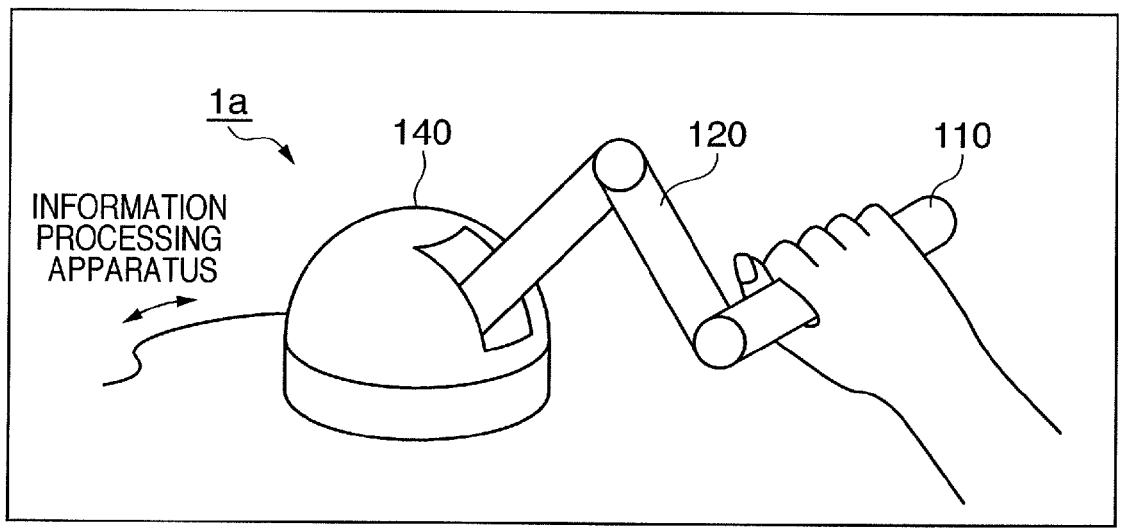
FIG. 37A is a view showing the outer appearance of a force sense presentation device.

FIGS. 37A and 37B are views showing the outer appearances of different force sense presentation devices. The force sense presentation device shown in FIG. 37A will be described.

A force sense presentation device 1a shown in FIG. 37A includes an end effector 110, robot arm 120, and frame 140.

The user grips the end effector 110 and moves it to an arbitrary position. The robot arm 120 has a plurality of joints and connects the end effector 110 to the frame 140. Even when the user moves the end effector 110 to an arbitrary position, the robot arm 120 can follow and deform.

When the user moves the end effector 110 to an arbitrary position, the frame 140 outputs a signal corresponding to the position to the information processing apparatus 350 in the succeeding stage and provide, to the end effector 110, a force sense corresponding to a control value received from the information processing apparatus 350. The frame 140 incorporates an actuator for force sense presentation. The actuator realizes a force based on the control value received from the information processing apparatus 350 and provides the force to the end effector 110 via the robot arm 120.

The force sense presentation device shown in FIG. 37B will be described next. A force sense presentation device 1b shown in FIG. 37B includes an end effector 190, actuators 192, frame 191, and strings 130.

The user grips the end effector 190 connected to the plurality of strings 130. The user can move the end effector 190 within the range of the tensile force of the strings 130.

Each actuator 192 includes, for example, a DC servo motor and an encoder. When the end effector 190 moves and pulls the strings 130, the actuators 192 detect the change and obtains the position of the end effector 190 on the basis of the detected change. The obtained position is sent to the information processing apparatus 350 as a signal. The actuators 192 provide, to the end effector 190, a sense of force corresponding to a control value received from the information processing apparatus 350.

Both force sense presentation devices shown in FIGS. 37A and 37B are usable as the force sense presentation device 1 of this embodiment. However, the force sense presentation devices usable as the force sense presentation device 1 are not limited to those described above, and various kinds of devices are usable.

For example, when an exoskeleton type force sense presentation device which can present a force sense of virtually gripping a machine tool is used, the end effector simulating a machine tool is unnecessary.

The actuator 192 using a DC motor actively outputs a torque. This control method is called active control. However, the present invention is not limited to this. Passive control may be executed in which the actuator 192 using a brake, clutch, MR fluid, or ER fluid presents a resistance corresponding to the force or torque of end effector movement by the user.

As described above, this embodiment uses, as the force sense presentation device 1, a device capable of manipulating the position of a machine tool virtual object and presenting a force sense corresponding to a force calculated by the calculation process in the succeeding stage based on interference if the machine tool virtual object interferes with a virtual object of some kind. Hence, a device having any arrangement is usable as the force sense presentation device 1 if it has the above-described functions.

Referring back to FIG. 38, a force sense rendering unit 21 includes an interference determination unit 211, force sense calculation unit 221, and control unit 231.

The interference determination unit 211 acquires the position of the end effector from the force sense presentation device 1 as a position X of the machine tool virtual object. By using the acquired position X and the position of an object (in this embodiment, a hexagon head screw which will be referred to as a hexagon head screw virtual object hereinafter) as the manipulation target of the machine tool, the interference determination unit 211 obtains the interference state between them. The interference state indicates whether the machine tool virtual object interferes with the hexagon head screw virtual object, that is, whether the machine tool virtual object engages with the hexagon head screw virtual object. The state wherein the machine tool virtual object engages with the hexagon head screw virtual object indicates a state wherein the machine tool is fitted into the hexagon head screw so that the machine tool (virtual object) turns the hexagon head screw (virtual object).

Additionally, the interference determination unit 211 checks whether the hexagon head screw virtual object engages with the internal thread portion. If they engage with each other, the interference determination unit 211 obtains the degree of insertion (interference depth S) of the hexagon head screw virtual object into the internal thread portion.

Note that the virtual object interference determination process by the interference determination unit 211 is a known technique, and a description thereof will be omitted.

If the interference determination unit 211 determines as the result of the above-described process that the machine tool virtual object engages with the hexagon head screw virtual object, and the hexagon head screw virtual object engages with the internal thread portion (the external thread is inserted into the internal thread ($S \geqq \theta$)), a screw turning force sense mode is set. Every time the machine tool virtual object interferes with the hexagon head screw virtual object, the interference determination unit 211 checks the current degree of turn of the hexagon head screw virtual object. If the interference determination unit 211 detects no interference between the machine tool virtual object and the hexagon head screw virtual object, or the hexagon head screw virtual object does not engage with the internal thread portion, the screw turning force sense mode is canceled.

The interference determination unit 211 sends the interference depth S, the position X of the machine tool virtual object, and a revolution count N of the hexagon head screw virtual object (the screw tightening revolution count of the hexagon head screw virtual object) to the force sense calculation unit 221.

If no interference between the machine tool virtual object and the hexagon head screw virtual object is detected, or the hexagon head screw virtual object does not engage with the internal thread portion, the interference determination unit 211 obtains the interference state between the machine tool virtual object and another virtual object (e.g., the virtual object 14 of the table shown in FIG. 36). The interference state is sent to the force sense calculation unit 221.

When the screw turning force sense mode is set, the force sense calculation unit 221 obtains a force (torque) Td applied to the machine tool virtual object based on the revolution count N. The calculation process by the force sense calculation unit 221 will be described later.

When the screw turning force sense mode is not set, and information representing that the machine tool virtual object interferes with another virtual object is received from the interference determination unit 211, the force sense calculation unit 221 obtains a force Fd applied to the machine tool virtual object by the interference.

The force sense calculation unit 221 sends the torque Td or force Fd to the control unit 231 and a simulation engine 311.

The control unit 231 obtains a control value Fr or Tr to control the actuator in the frame 140 of the force sense presentation device 1 so that the actuator provides the force Fd or torque Td to the end effector. The obtained control value Fr or Tr is sent to the force sense presentation device 1.

A simulation unit 31 has the simulation engine 311. The simulation engine 311 simulates the deformation, rotation, and movement of the hexagon head screw virtual object based on the torque Td calculated by the force sense calculation unit 221. The simulation engine 311 also simulates the deformation, rotation, and movement of, for example, the virtual object 14 of the table based on the force Fd calculated by the force sense calculation unit 221. The simulation result is immediately sent to the interference determination unit 211. The interference determination unit 211 determines the interference between the hexagon head screw virtual object and the machine tool virtual object or the interference between the machine tool virtual object and, for example, the virtual object 14 of the table based on the simulation result. The simulation result is also sent to a graphics engine 411 in the succeeding stage.

An image rendering unit 41 has the graphics engine 411. The graphics engine 411 generates an image of the virtual object group including the machine tool virtual object and hexagon head screw virtual object seen from a given viewpoint. These virtual objects move or deform based on the simulation result.

The technique of generating an image of a virtual object (virtual space) seen from a given viewpoint is a known technique used in the virtual reality technology or mixed reality presentation technology, and a description thereof will be omitted.

An image display unit 51 is a flat panel display or an HMD including a CRT or a liquid crystal screen. The image display unit 51 displays the image generated by the graphics engine 411. The image generated by the graphics engine 411 need not always be displayed. The image may be stored or output to an external device via a network.

The process executed by the force sense calculation unit 221 will be described next. When the hexagon head screw virtual object is not tightened by the machine tool virtual object, the hexagon head screw virtual object engages with the internal thread portion, and the screw tightening operation is done by using the end effector, the interference determination unit 211 sets a screw tightening mode of the screw turning force sense modes. The force sense calculation unit 221 obtains the torque Td, as described above. For the screw tightening operation, for example, the end effector is reciprocally moved in the screw tightening direction. The process of calculating the torque Td will be described with reference to FIG. 39A.

Figure 39A:
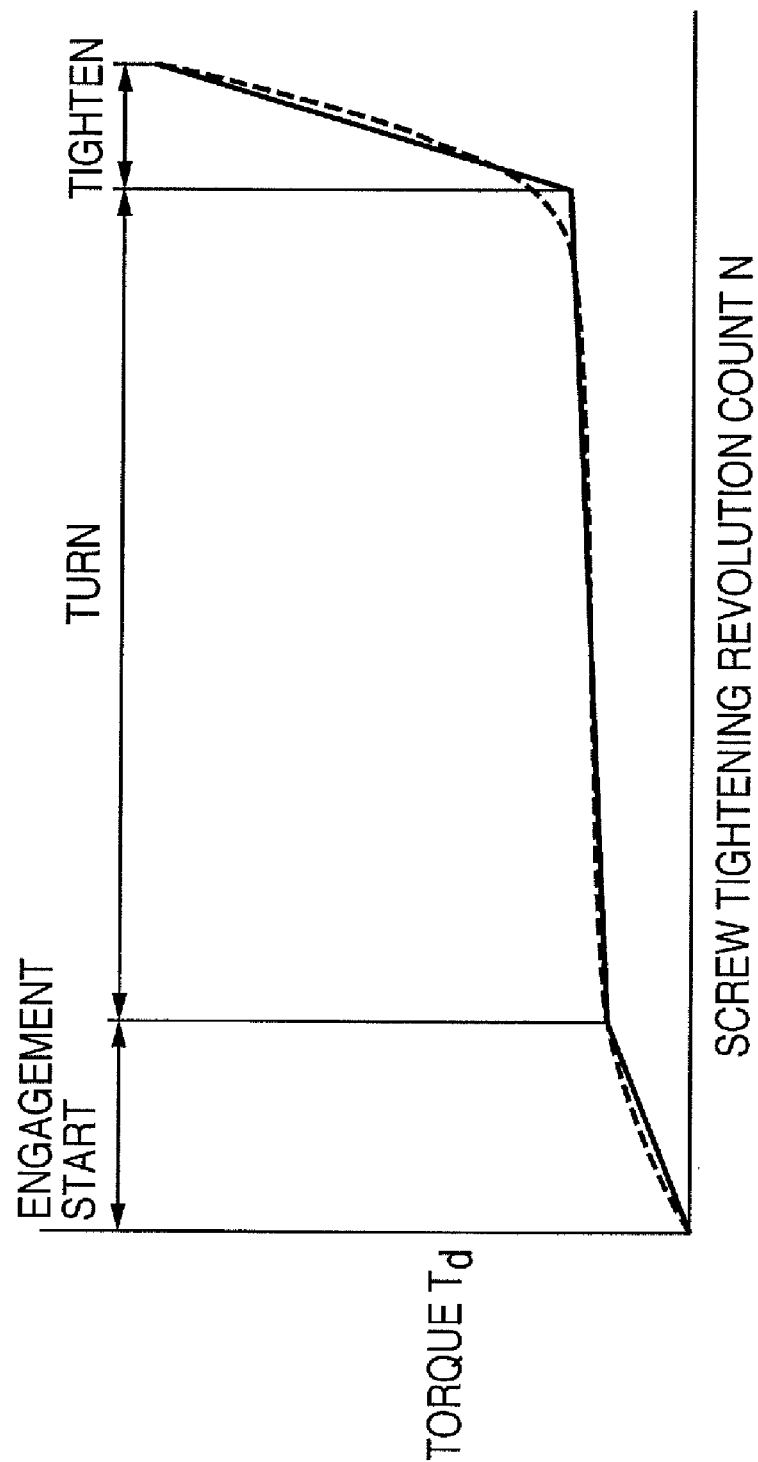
FIG. 39A is a graph with the abscissa representing a screw tightening revolution count N and the ordinate representing a torque Td.

FIG. 39A is a graph with the abscissa representing the screw tightening revolution count N and the ordinate representing the torque Td. This graph shows a state wherein the torque Td increases with respect to the screw tightening revolution count N from the start to the end of the screw tightening operation. The range from the minimum (start) to the maximum (end) of the screw tightening revolution count N is defined as a total turn region.

The force sense calculation unit 221 refers to the screw tightening revolution count N acquired from the interference determination unit 211 and determines which is the current screw tightening state of the hexagon head screw virtual object, "engagement start state", "turning state", or "tightening state".

In the engagement start state, the internal thread and external thread engage with each other for the first time. In force sense calculation, the torque Td linearly increases in accordance with the screw tightening revolution count N. When the threads engage to some extent, for example, one revolution and a half (1.5 revolutions), the turning state starts.

In the turning state, kinetic friction acts between the internal thread and the external thread, and the contact area between them increases in accordance with the screw tightening revolution count N. For this reason, in force sense calculation, the torque Td linearly increases in accordance with the screw tightening revolution count N at a gradient gentler than in the engagement start state. The screw tightening revolution count N in the turning state is determined by the screw length.

In the tightening state, the contact area between them abruptly increases, and the torque Td linearly increases in accordance with the screw tightening revolution count N at a steep gradient.

The gradient of the torque Td with respect to the screw tightening revolution count N in each state is determined by the screw type and screw diameter. The force sense calculation unit 221 manages parameters about the hexagon head screw virtual object such as the screw type and screw diameter.

In the above description, the torque Td linearly increases with respect to the screw tightening revolution count N in each state. However, the present invention is not limited to this. For example, the torque Td may continuously increase, as indicated by the broken line in the graph of FIG. 39A. Alternatively, the torque Td may increase nonlinearly as a high-order function.

Figure 39B:
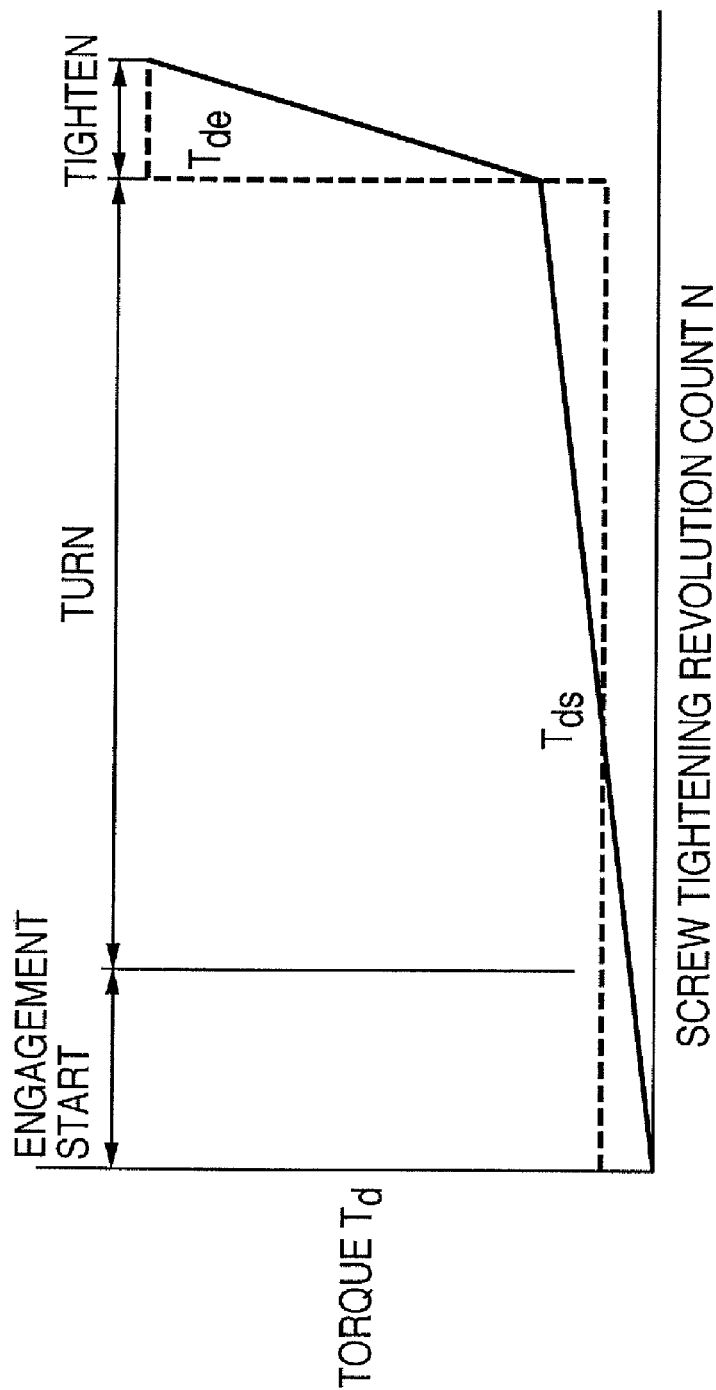
FIG. 39B is a graph with the abscissa representing a screw tightening revolution count N and the ordinate representing a torque Td.

As shown in FIG. 39B, the engagement start state and turning state may be defined as the same state. FIG. 39B is a graph with the abscissa representing the screw tightening revolution count N and the ordinate representing the torque Td. Let Tds be the torque at that time, and Tde be the torque in the tightening state. The torques Tds and Tde linearly increase in accordance with the screw tightening revolution count N. The gradients satisfy dTds/dN<dTde/dN (solid line in FIG. 39B). Alternatively, the torques Tds and Tde may be constant in accordance with the screw tightening revolution count N while satisfying Tds<Tde (broken line in FIG. 39B). As describe above, when the screw turning force sense mode is set, the presented torque Td need only have a plurality of gradients or a plurality of magnitudes in at least a partial section of the screw turning region.

As described above, when the torque Td is applied to the machine tool in accordance with the operation state, that is, the screw tightening revolution count N in the screw tightening operation, the reality can greatly be enhanced. To do this, it is necessary to prepare a force sense mode which changes the torque Td in at least a partial section of the total turn region. In the screw tightening start state and screw tightening finishing state, the change rate of the torque Td with respect to the revolution is changed. This allows presentation of enhanced reality to the user.

Figure 40A:
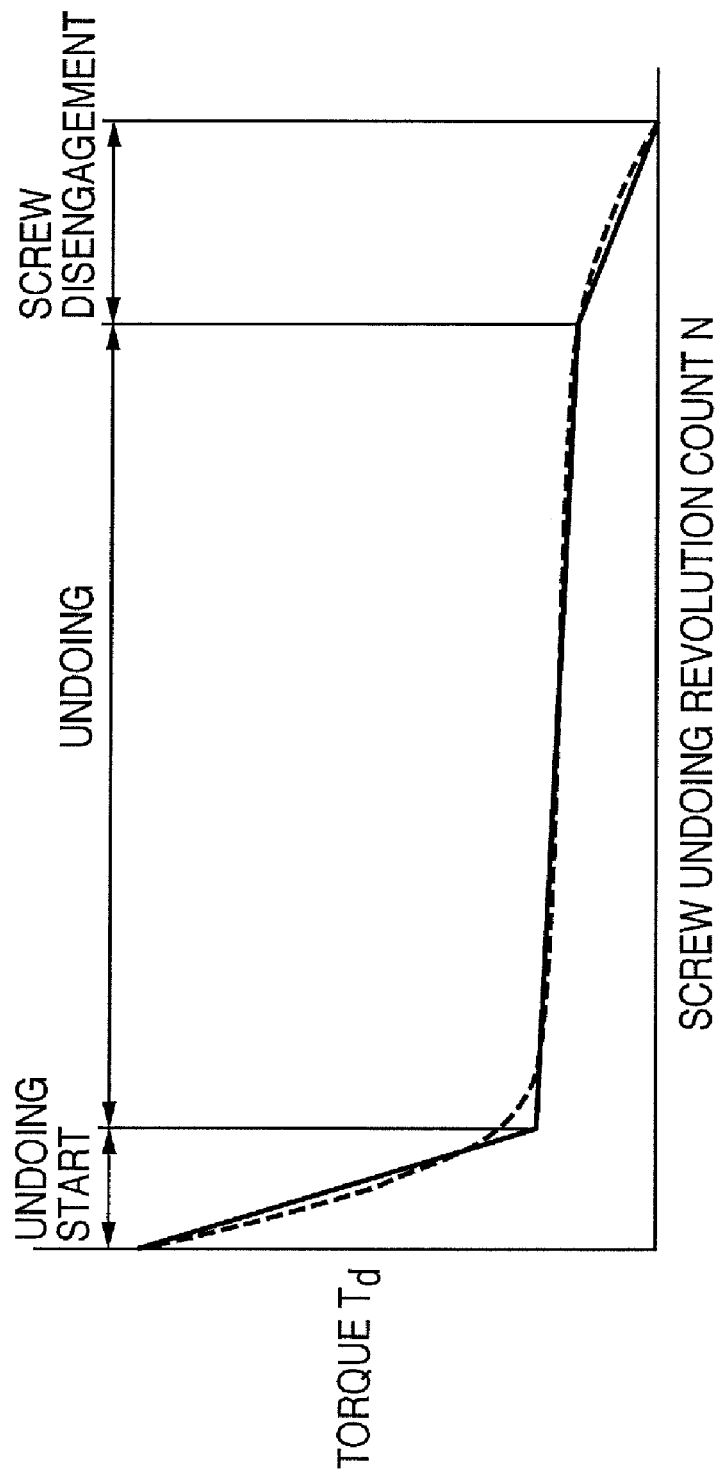
FIG. 40A is a graph with the abscissa representing a screw tightening revolution count N and the ordinate representing a torque Td.
Figure 40B:
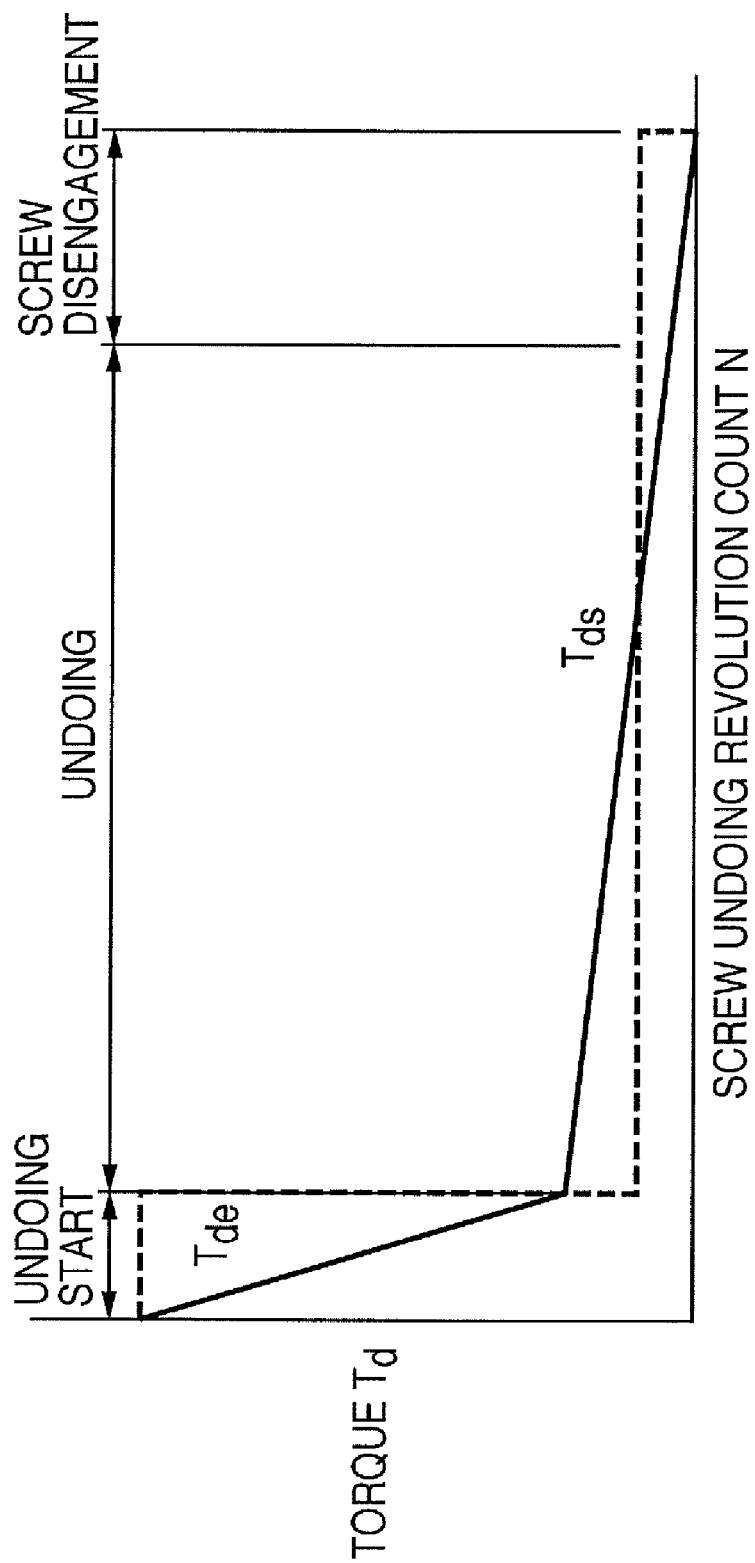
FIG. 40B is a graph with the abscissa representing a screw tightening revolution count N and the ordinate representing a torque Td.

When machine tool virtual object contacts the tightened hexagon head screw virtual object, and a screw undoing operation is executed, the interference determination unit 211 sets a screw undoing mode of the screw turning force sense modes. For the screw undoing operation, for example, the end effector is reciprocally moved in the screw undoing direction. In this case, as shown in FIGS. 40A and 40B, the force sense calculation unit 221 for calculating the torque Td employs a method reverse to the screw tightening mode described with reference to FIGS. 39A and 39B. FIGS. 40A and 40B are graphs with the abscissa representing the screw tightening revolution count N and the ordinate representing the torque Td.

The force sense calculation unit 221 refers to the screw tightening revolution count N acquired from the interference determination unit 211 and determines which is the current undoing state of the hexagon head screw virtual object, "undoing start state", "undoing state", or "screw disengagement state".

As indicated by the solid line in FIG. 40A, in the undoing start state, the internal thread and external thread strongly engage with each other, and static friction acts between them. In force sense calculation, the torque Td linearly decreases in accordance with the screw undoing revolution count N.

In the undoing state, kinetic friction acts between the internal thread and the external thread, and the contact area between them decreases in accordance with the screw undoing revolution count N. For this reason, in force sense calculation, the torque Td linearly decreases in accordance with the screw undoing revolution count N at a gradient gentler than in the undoing start state. The screw undoing revolution count N in the undoing state is determined by the screw length.

Finally, in the screw disengagement state, the contact area between the internal thread and the external thread becomes zero so that they disengage from each other. Hence, the torque Td linearly decreases in accordance with the screw undoing revolution count N with a gradient steeper than in the undoing state.

The gradient of the torque Td with respect to the screw tightening revolution count N in each state is determined by the screw type and screw diameter.

In the above description, the torque Td linearly decreases with respect to the screw undoing revolution count N in each state. However, the present invention is not limited to this. For example, the torque Td may continuously decrease, as indicated by the broken line in the graph of FIG. 40A. Alternatively, the torque Td may decrease nonlinearly as a high-order function. As shown in FIG. 40B, the undoing state and screw disengagement state may be defined as the same state. Let Tds be the torque at that time, and Tde be the torque in the undoing start state. The torques Tds and Tde linearly decrease in accordance with the screw undoing revolution count N. The gradients satisfy dTds/dN<dTde/dN (|dTds/dN|>|dTde/dN|) (solid line in FIG. 40B). Alternatively, the torques Tds and Tde may be constant in accordance with the screw undoing revolution count N while satisfying Tds>Tde (broken line in FIG. 40B). As described above, when the screw undoing mode is set, the presented torque Td need only have a plurality of gradients or a plurality of magnitudes in at least a partial section of the screw turning region.

The force sense calculation unit 221 may calculate the torque Td by using equations based on the graphs in FIGS. 39A and 39B or FIGS. 40A and 40B. Alternatively, a table may be generated from the graphs so that the force sense calculation unit 221 specifies the torque Td corresponding to the revolution count N by looking up the table.

To obtain the torque Td, not only the screw tightening revolution count and screw undoing revolution count but also the screw type, screw diameter, and screw length are used. These parameters need not always be contained in equations, and a table may be formed. In this case, parameters corresponding to the type of the hexagon head screw virtual object are acquired from the table and used to obtain the torque Td.

Figure 41:
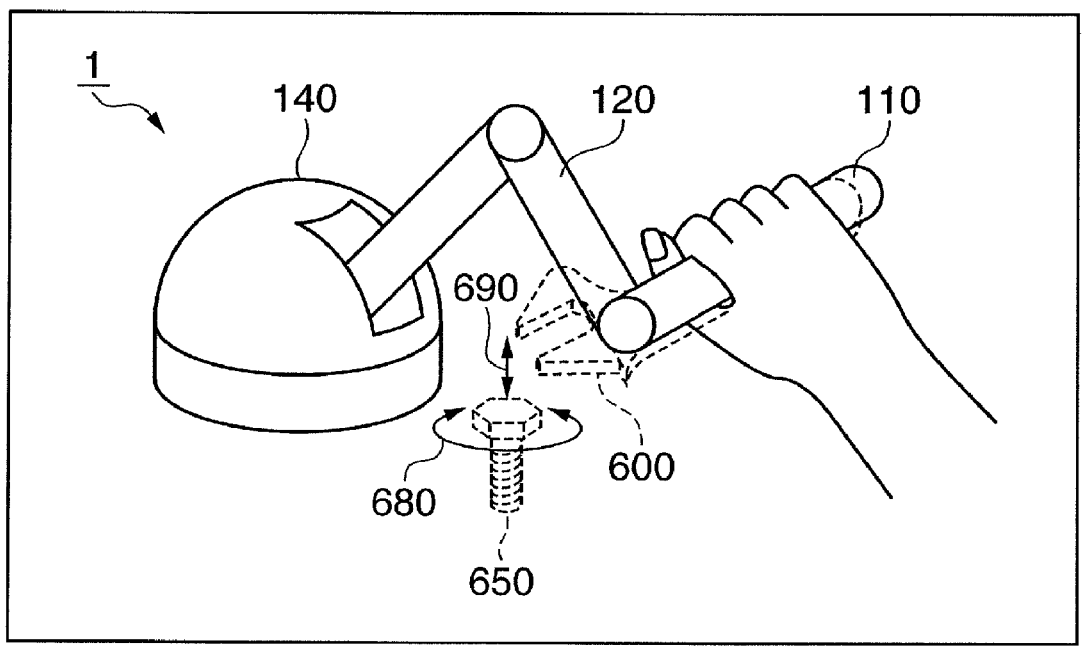
FIG. 41 is a view showing a display example when a machine tool virtual object 600 and a hexagon head screw virtual object 650 are superimposed on a force sense presentation device 1 in the state shown in FIG. 37A.

When the screw turning force sense mode is set, the force sense presentation device 1 preferably restricts at least the translation and inclination directions of the screw axis. For example, examine a case wherein this system is applied to a mixed reality presentation system. FIG. 41 is a view showing a display example when a machine tool virtual object 600 and a hexagon head screw virtual object 650 are superimposed on the force sense presentation device 1 in the state shown in FIG. 37A. In this display, when the machine tool virtual object 600 is superimposed on the hexagon head screw virtual object 650, the interference determination unit 211 sets the screw turning force sense mode. The user moves the end effector 110 simulating the machine tool in the turning direction. At this time, the end effector 110 is restricted such that it moves only in directions 680 and 690 in FIG. 41 but not in any other direction. This restriction condition is preferably applied not only to the force sense presentation device 1 but also to the image display unit 51.

When the screw turning force sense mode is provided, a sense of screw turning force can be presented through simple calculation or by looking up a table. This reduces the amount of calculation. It is therefore possible to present a smooth and natural sense of force in real time.

Figure 44:
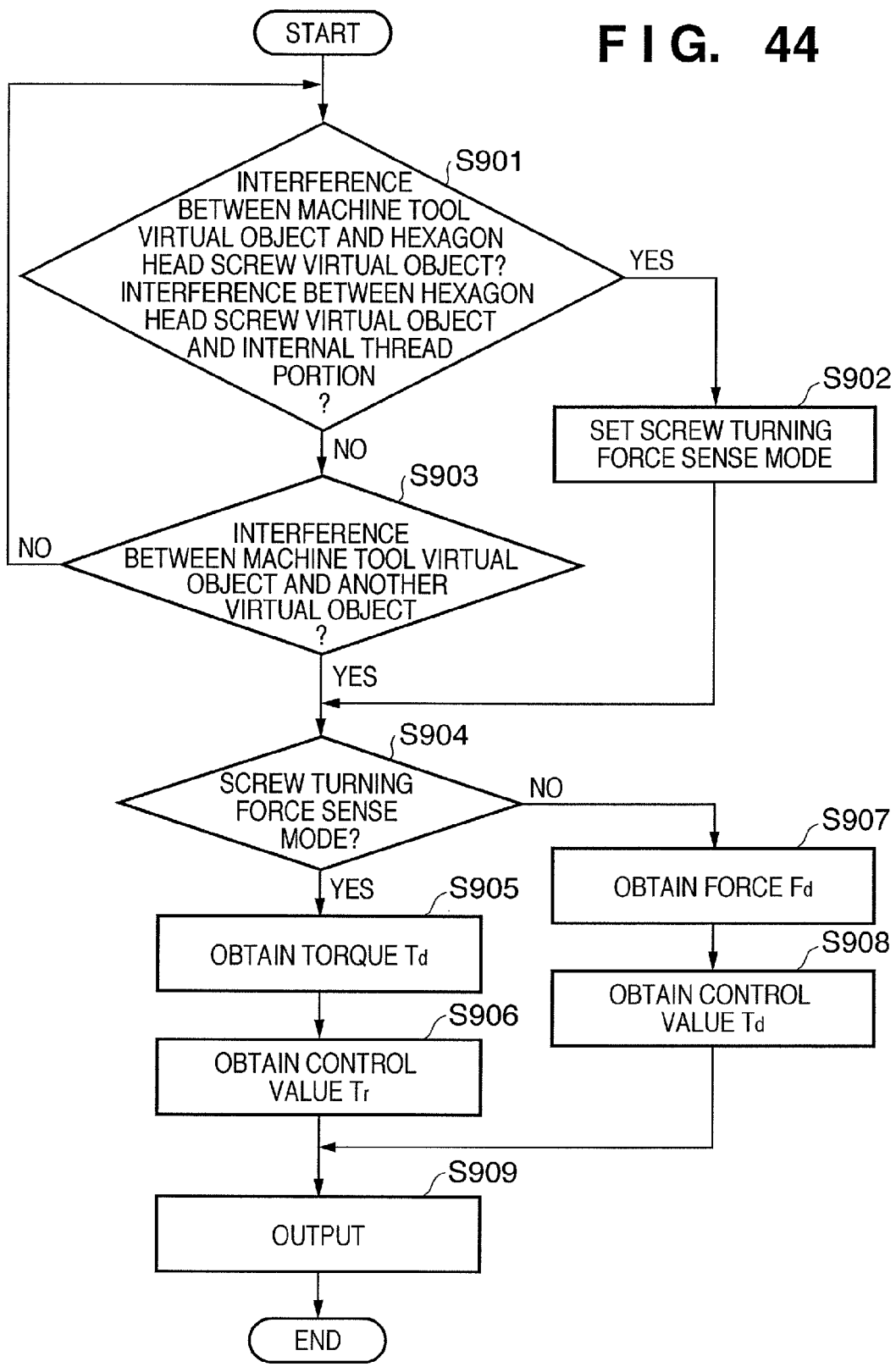
FIG. 44 is a flowchart of a process of causing an information processing apparatus 350 to control a force sense presentation device 1.

FIG. 44 is a flowchart of a process of causing the information processing apparatus 350 to control the force sense presentation device 1.

In step S901, the interference determination unit 211 acquires the position of the end effector from the force sense presentation device 1 as the position X of the machine tool virtual object. By using the acquired position X and the position of the hexagon head screw virtual object, the interference determination unit 211 obtains the interference state between them.

The interference determination unit 211 also checks whether the hexagon head screw virtual object engages with the internal thread portion. If it is determined by the process that the machine tool virtual object engages with the hexagon head screw virtual object, and the hexagon head screw virtual object engages with the internal thread portion, the process advances to step S902. The interference determination unit 211 sets the screw turning force sense mode. The interference determination unit 211 sends the interference state S, the position X of the machine tool virtual object, and the revolution count N of the hexagon head screw virtual object to the force sense calculation unit 221. The process advances to step S904.

If the interference determination reveals that no interference between the machine tool virtual object and the hexagon head screw virtual object is detected, or the hexagon head screw virtual object does not engage with the internal thread portion, the screw turning force sense mode is canceled. The process advances from step S901 to step S903. In step S903, the interference determination unit 211 obtains the interference state between the machine tool virtual object and another virtual object. If the interference state indicates that the machine tool virtual object does not interfere with any virtual object, the process returns to step S901. If the machine tool virtual object interferes with a virtual object of some kind except the hexagon head screw virtual object, the process advances to step S904.

In step S904, the force sense calculation unit 221 checks whether the screw turning force sense mode is set. If it is determined by this check that the screw turning force sense mode is set, the process advances from step S904 to step S905. If the screw turning force sense mode is not set, the process advances from step S904 to step S907.

In step S905, the force sense calculation unit 221 obtains the force (torque) Td applied to the machine tool virtual object based on the revolution count N. The force sense calculation unit 221 sends the torque Td to the control unit 231 and simulation engine 311. In step S906, the control unit 231 obtains the control value Tr to control the actuator in the frame 140 so that the actuator provides the torque Td to the end effector.

In step S907, the force sense calculation unit 221 obtains the force Fd applied to the machine tool virtual object by the interference between the machine tool virtual object and the virtual object except the hexagon head screw virtual object. The force sense calculation unit 221 sends the force Fd to the control unit 231 and simulation engine 311. In step S909, the control unit 231 obtains the control value Fr to control the actuator in the frame 140 so that the actuator provides the control value Fr to the end effector.

In step S909, the control unit 231 sends the obtained control value Fr or Tr is sent to the force sense presentation device 1.

Sixth Embodiment

In this embodiment, an abnormal mode is provided in addition to the screw turning force sense mode described in the fifth embodiment.

If actual screw tightening is done without engaging an internal thread with an external thread, it is impossible to screw in, and an abnormal torque is generated. Reasons for this are, for example, intrusion of foreign substances, residual burrs in screw working, and insertion of screws of different standards. An abnormal torque is also generated when a screw tilts with respect to the screw axis and engages. In this embodiment, as an abnormal torque presentation method, a force sense presentation method will be described in which a tilt from the screw axis is detected, an abnormal mode is set in accordance with the detection result, and an abnormal torque is calculated.

Only parts added to the fifth embodiment will be described below. In the system shown in FIG. 38, the tile of the external thread with respect to the internal thread is obtained by using a positioning sensor such as an encoder of a force sense presentation device 1 or a position detection sensor (not shown). If the tilt falls within the tolerance (allowable range), an interference determination unit 211 sets the screw turning force sense mode described in the fifth embodiment.

However, if the tilt of the external thread with respect to the internal thread falls outside the tolerance, the interference determination unit 211 sets an abnormal mode. The tolerance of the tilt of the external thread with respect to the internal thread is set based on, for example, the screw type and screw diameter. The screw type and screw diameter determine the screw pitch as a standard. As the tolerance, the angle of one revolution of the spiral ridge of the screw is obtained based on the pitch. The tolerance is predetermined in accordance with the screw type or attachment place and registered in advance in a table to be used for torque determination. The tolerance may be changed in accordance with the skill level of the user or the specifications of the entire system.

Figure 42:
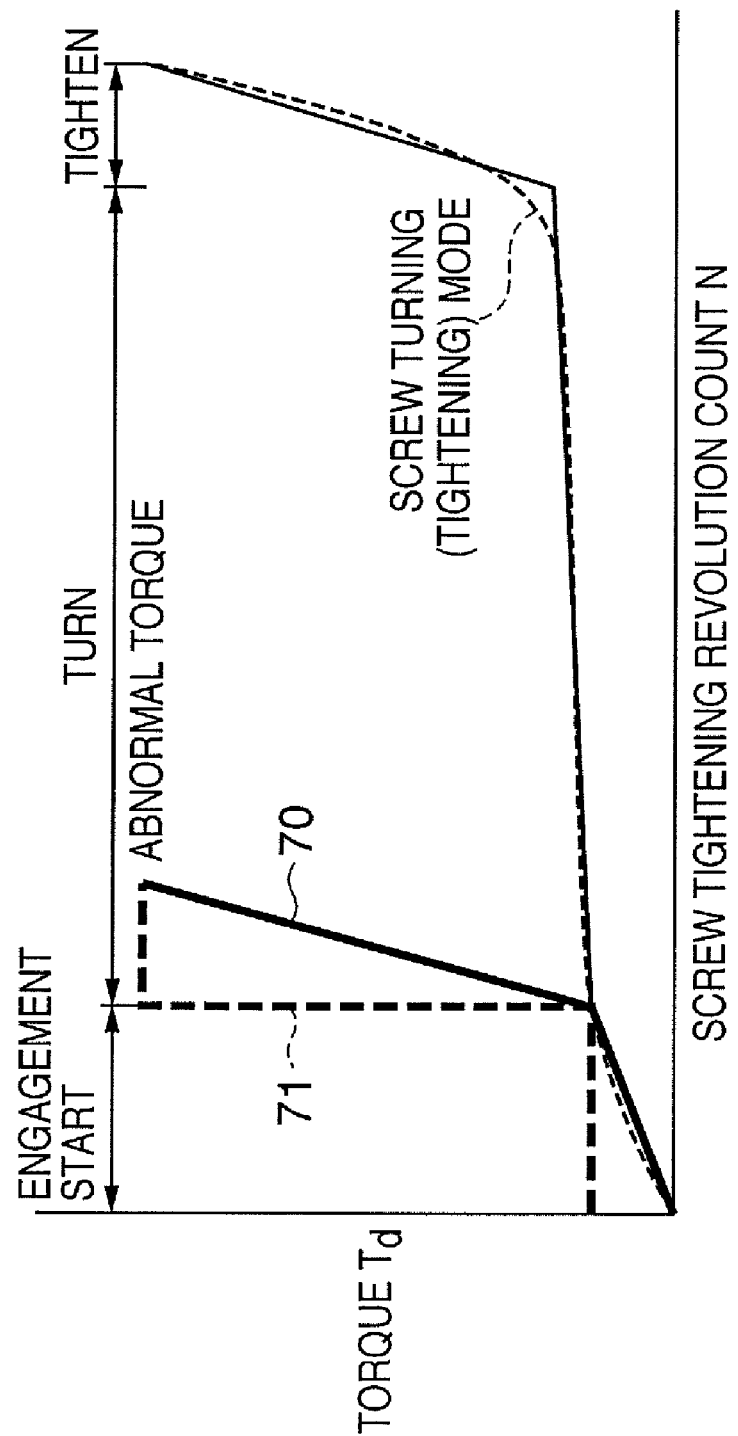
FIG. 42 is a graph with the abscissa representing a screw tightening revolution count N and the ordinate representing a torque Td.
Figure 43:
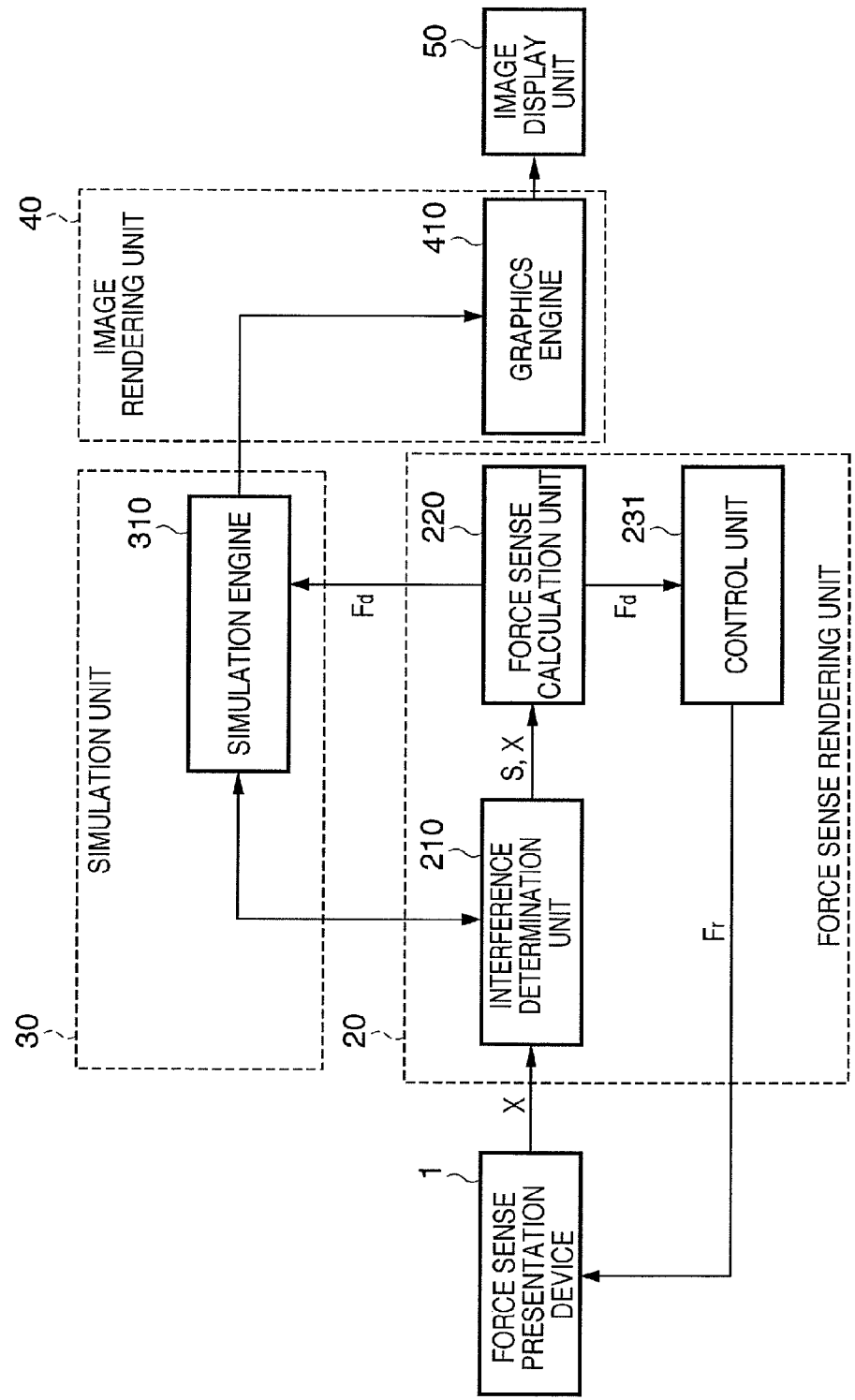
FIG. 43 is a block diagram showing the functional arrangement of a conventional system for implementing force sense presentation in virtual reality.

The abnormal torque calculated by the force sense calculation unit 221 in the abnormal mode will be described with reference to FIG. 42. FIG. 42 shows the relationship between a torque Td and a screw tightening revolution count N in the abnormal mode and in the screw turning force sense mode. FIG. 42 is a graph with the abscissa representing the screw tightening revolution count N and the ordinate representing the torque Td.

When the interference determination unit 211 sets the abnormal mode, the force sense calculation unit 221 determines which is the current screw tightening state of the hexagon head screw virtual object, "engagement start state" or "turning state". In the engagement start state and turning state, the torque Td linearly increases with respect to the screw tightening revolution count N, as indicated by a solid line 70 in FIG. 42. The gradient of the torque Td with respect to the screw tightening revolution count N is larger in the turning state than in the engagement start state.

The gradient of the torque Td with respect to the screw tightening revolution count N in each state is determined by the screw type and screw diameter. The torque Td linearly increases with respect to the screw tightening revolution count N in each state. However, the present invention is not limited to this. For example, the torque Td may increase not linearly but nonlinearly as a high-order function. Alternatively, the torque Td may be calculated as a continuous function by eliminating the discontinuity between the engagement start state and the turning state by interpolation. The torque Td may be calculated stepwise, as indicated by a broken line 71 in FIG. 42.

Let Td1 be the torque in the engagement start state, and Td2 be the torque in the screw turning state. A value obtained by differentiating the torque Td by the screw tightening revolution count N need only satisfy $dTd1/dN < dTd2/dN$ (solid line 70 in FIG. 42). Alternatively, the torques Td1 and Td2 may be constant in accordance with the screw tightening revolution count N while satisfying $Td1 < Td2$ (broken line 71 in FIG. 42). As described above, when the abnormal mode is set, the presented torque Td need only have a plurality of gradients or a plurality of magnitudes in at least a partial section of the screw turning region.

In the above-described abnormal mode, the force sense calculation unit 221 may calculate the torque Td by using equations based on the graph in FIG. 42. Alternatively, a table may be generated from the graph so that the force sense calculation unit 221 specifies the torque Td corresponding to the revolution count N by looking up the table.

To obtain the torque Td, not only the screw tightening revolution count and screw undoing revolution count but also the screw type, screw diameter, and screw length are used. These parameters need not always be contained in equations, and a table may be formed. In this case, parameters corresponding to the type of the hexagon head screw virtual object are acquired from the table and used to obtain the torque Td.

When the abnormal mode is provided, a sense of force of an abnormal torque can be presented through simple calculation or by looking up a table. This reduces the amount of calculation. It is therefore possible to present a smooth and natural sense of force in real time.

Seventh Embodiment

In the above embodiments, the units included in the information processing apparatus 350 have been described as hardware. However, the same objects may be achieved by implementing some of the units as software and causing a computer such as a PC (personal computer) to execute the software.

Figure 45:
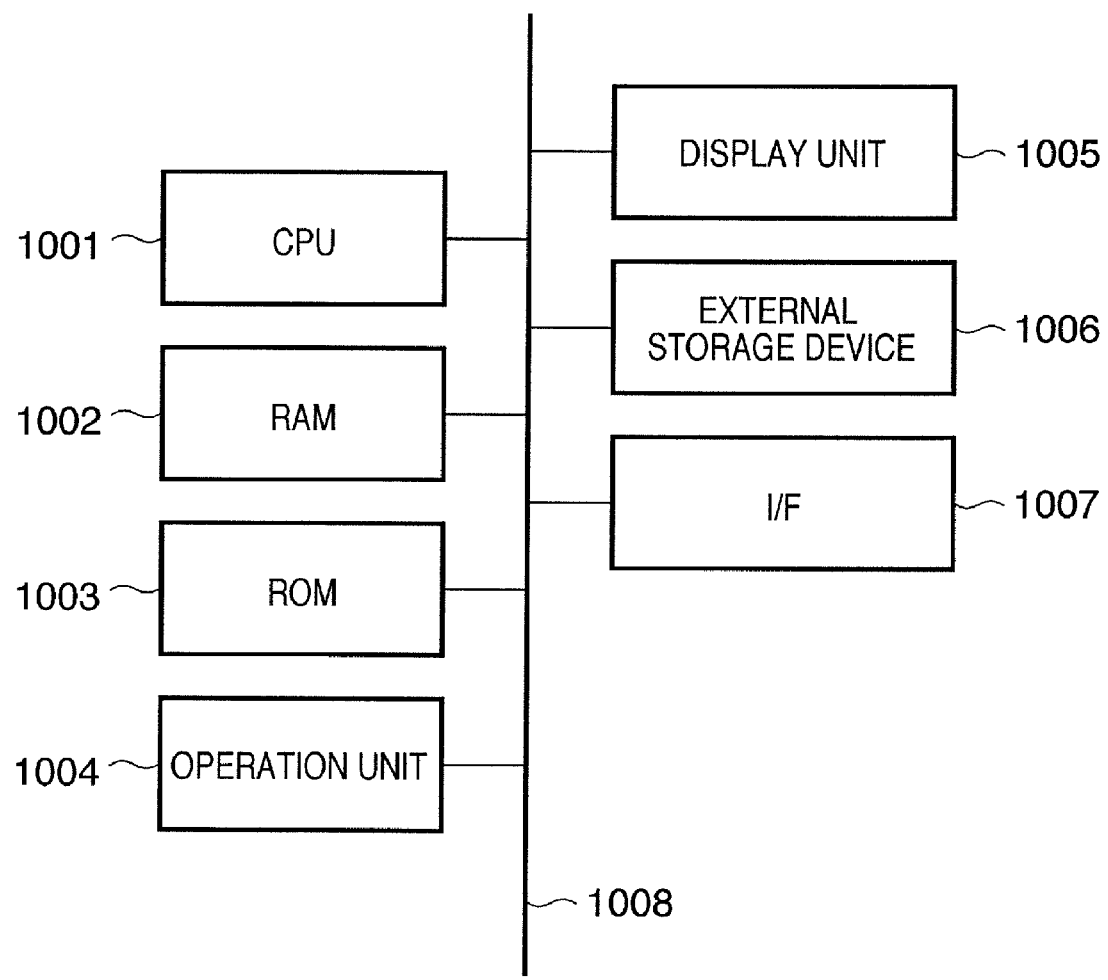
FIG. 45 is a block diagram showing the hardware configuration of a computer.

FIG. 45 is a block diagram showing the hardware configuration of a computer.

A CPU 1001 controls the overall computer by using programs and data stored in a RAM 1002 and a ROM 1003 and executes the processes described as processes executed by the information processing apparatus 350.

The RAM 1002 has an area to temporarily store programs and data loaded from an external storage device 1006 and an area to temporarily store various kinds of information acquired from the force sense presentation device 1 via an I/F (interface) 1007. The RAM 1002 also has a work area to be used by the CPU 1001 to execute various kinds of processes. That is, the RAM 1002 can provide various kinds of areas.

The ROM 1003 stores the setting data and boot program of the computer.

The user of the computer operates an operation unit 1004 including a keyboard and a mouse, thereby inputting various kinds of instructions to the CPU 1001.

A display unit 1005 including a CRT or a liquid crystal screen can display a process result by the CPU 1001 as an image or text. The display unit 1005 may be an HMD.

The external storage device 1006 is a mass storage device represented by a hard disk drive device. The external storage device 1006 saves an OS (Operating System) and programs and data to make the CPU 1001 execute the processes described as processes executed by the information processing apparatus 350. The external storage device 1006 saves, for example, a program and data to make the CPU 1001 execute a process corresponding to the flowchart in FIG. 44. When tables are generated from the graphs shown in FIGS. 39A, 39B, 40A, 40B, and 42 and the above-described parameters, the external storage device 1006 saves the data of the tables. Various kinds of information saved in the external storage device 1006 are loaded to the RAM 1002 as needed under the control of the CPU 1001 and processed by it.

The I/F 1007 connects the force sense presentation device 1 to the computer. The computer executes data communication with the force sense presentation device 1 via the I/F 1007.

A bus 1008 connects the above-described units to each other.

Other Embodiments

The objects of the present invention are also achieved by the following method. A recording medium (or storage medium) which records software program codes to implement the functions of the above-described embodiments is supplied to a system or an apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

The computer executes the readout program codes. The operating system (OS) running on the computer partially or wholly executes actual processing based on the instructions of the program codes, thereby implementing the functions of the above-described embodiments.

The program codes read out from the recording medium are written in the memory of a function expansion card inserted into the computer or a function expansion unit connected to the computer. The CPU of the function expansion card or function expansion unit partially or wholly executes actual processing based on the instructions of the program codes, thereby implementing the functions of the above-described embodiments.

The recording medium to which the present invention is applied stores program codes corresponding to the above-described flowchart.

As described above, according to the arrangement of the present invention, a force sense can be presented more easily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-232813, filed Aug. 29, 2006, and Japanese Patent Application No. 2006-303379, filed Nov. 8, 2006, which are hereby incorporated by reference herein in their entirety.

What is claimed is:

1. A force sense presentation device for presenting a sense of force in virtual space to a user, comprising:
a fixed unit which is gripped by the user;
a force sense presentation unit which presents a sense of force;
an actuator which supplies a driving force and operates said force sense presentation unit relative to said fixed unit;
a joint unit which is provided between said fixed unit and said force sense presentation unit, and guides the relative operation of said force sense presentation unit; and
a force sense rendering unit which controls the relative operation of said force sense presentation unit by said actuator,
wherein the force sense presentation device simulates a device which is gripped and used by the user, and
said force sense rendering unit controls the relative operation of said force sense presentation unit based on a position and orientation of the device in the virtual space.

2. The force sense presentation device according to claim 1, wherein said actuator includes at least one of a hydraulic/pneumatic actuator, a solenoid, a DC motor, an AC motor, a stepping motor, a linear motor, an electrostatic motor, an ultrasonic motor, a polymer actuator, a shape memory alloy, a brake, a clutch, an ER fluid, and an MR fluid.

3. The force sense presentation device according to claim 1, wherein said joint unit includes at least one of a guide, a bearing, a hinge, and a link mechanism.

4. The force sense presentation device according to claim 1, wherein said actuator relatively operates said force sense presentation unit in at least one of an oscillation direction, a perpendicular direction, and a parallel direction with respect to a longitudinal direction of the force sense presentation device, and a direction about an axis of the force sense presentation device.

5. The force sense presentation device according to claim 1, further comprising at least one of a ring, a three-dimensional pattern conforming to fingers, and a mark serving as a reference of user's grip of the force sense presentation device.

6. The force sense presentation device according to claim 1, wherein said force sense rendering unit comprises:
an interference determination unit which determines interference between the virtual device and a virtual object in the virtual space;
a force sense calculation unit which calculates a sense of force to be presented based on the interference determined by said interference determination unit; and
a control unit which calculates driving information of said actuator based on the calculated sense of force and controls the relative operation of said force sense presentation unit by said actuator based on the driving information.

7. The force sense presentation device according to claim 6, wherein
the virtual object is a virtual thread member, and
said force sense rendering unit controls to virtually present a sense of force in an operation of threadably engaging the thread member by using a machine tool.

8. The force sense presentation device according to claim 7, wherein said force sense rendering unit relatively operates said force sense presentation unit in a direction reverse to a direction in which the user moves the force sense presentation device.

9. The force sense presentation device according to claim 8, wherein said force sense rendering unit controls the relative operation based on a speed at which the user moves the force sense presentation device.

10. The force sense presentation device according to claim 6, wherein
the virtual object is a virtual internal thread, and
said force sense rendering unit controls to virtually present a sense of force in an operation of threadably engaging a thread member by using a wrench.

11. The force sense presentation device according to claim 6, wherein
the virtual object is a virtual thread member,
said fixed unit is gripped by one hand of the user,
said force sense presentation unit is gripped by the other hand of the user, and
said force sense rendering unit controls to virtually present a sense of force in an operation of threadably engaging the thread member by using a machine tool.

12. The force sense presentation device according to claim 1, further comprising a measuring unit which measures a relative position and orientation in the virtual space between the device and the virtual object in the virtual space,
wherein said force sense rendering unit further controls the relative operation of said force sense presentation unit based on the position and orientation measured by said measuring unit.

13. The force sense presentation device according to claim 12, further comprising an image output unit which outputs, to a display, an image representing positions and orientations of the virtual object and the device in the virtual space based on the position and orientation measured by said measuring unit.

14. The force sense presentation device according to claim 12, wherein said measuring unit includes at least one of an image sensing unit, an image processing unit, a magnetic sensor, an acceleration sensor, a gyro, a GPS, and an optical sensor.

15. A mixed reality system including a force sense presentation device for presenting a sense of force in virtual space to a user, an information processing apparatus, and a display, wherein said force sense presentation device comprises:

a fixed unit which is gripped by the user;

a force sense presentation unit which presents a sense of force;

an actuator which supplies a driving force and operates said force sense presentation unit relative to said fixed unit; and a joint unit which is provided between said fixed unit and said force sense presentation unit and guides the relative operation of said force sense presentation unit, the system comprising:

a force sense rendering unit which controls the relative operation of said force sense presentation unit by said actuator;

a measuring unit which measures a relative position and orientation in the virtual space between the device and a virtual object in the virtual space; and an image output unit which outputs, to said display, an image representing positions and orientations of the virtual object and the device in the virtual space based on the position and orientation measured by said measuring unit, wherein said force sense presentation device simulates a device which is gripped and used by the user, and said force sense rendering unit controls the relative operation of said force sense presentation unit based on the position and orientation measured by said measuring unit.

16. The system according to claim 15, further comprising a read unit which reads out map information from a storage unit, wherein said force sense rendering unit calculates a guide route to guide the user based on the map information and the position and orientation measured by said measuring unit and controls the relative operation based on the guide route.

* * * * *